US012523674B2

(12) United States Patent
Flanagan et al.

(10) Patent No.: US 12,523,674 B2
(45) Date of Patent: Jan. 13, 2026

(54) AUTOMATED CENTRIFUGE LOADER

(71) Applicant: Babson Diagnostics, Inc., Austin, TX (US)

(72) Inventors: Mark S. Flanagan, Saugus, MA (US); James Paolino, Reading, MA (US); David George Sorenson, Chelsea, MA (US); Nicholas Robert Monaco, Saugus, MA (US)

(73) Assignee: Babson Diagnostics, Inc., Austin, TX (US)

( * ) Notice: Subject to any disclaimer, the term of this patent is extended or adjusted under 35 U.S.C. 154(b) by 0 days.

(21) Appl. No.: 18/747,355

(22) Filed: Jun. 18, 2024

(65) Prior Publication Data

US 2024/0337673 A1 Oct. 10, 2024

Related U.S. Application Data

(63) Continuation of application No. 18/300,757, filed on Apr. 14, 2023, now Pat. No. 12,025,629, which is a (Continued)

(51) Int. Cl.
*G01N 35/04* (2006.01)
*G01N 35/00* (2006.01)

(52) U.S. Cl.
CPC ...... *G01N 35/04* (2013.01); *G01N 2035/00495* (2013.01); *G01N 2035/0449* (2013.01); (Continued)

(58) Field of Classification Search
CPC ......... G01N 35/04; G01N 2035/00495; G01N 2035/0449; G01N 2035/0465; G01N 2035/0477; G01N 2035/0493
See application file for complete search history.

(56) References Cited

U.S. PATENT DOCUMENTS 1,892,884 A 1/1933 Grauman et al.
2,110,237 A 3/1938 Parsons
(Continued)

FOREIGN PATENT DOCUMENTS

CA 2058917 A1 7/1993
CN 1501080 A 6/2004
(Continued)

OTHER PUBLICATIONS

Chinese Office Action for Application No. CN201780083377 dated Mar. 4, 2022, 21 pages.
(Continued)

*Primary Examiner* — James Lin
*Assistant Examiner* — Austin Q Le
(74) *Attorney, Agent, or Firm* — COOLEY LLP

(57) ABSTRACT

A processing unit for automated preparation of biological samples included in specimen tubes is described herein. The processing unit includes a removable sample preparation component configured to receive specimen tubes, read identifiers associated with the biological samples contained in the specimen tubes, mix reagents included in the specimen tubes, and transfer the specimen tubes to at least one of a centrifuge or a storage compartment. The processing unit further includes a centrifuge loader for automatic loading and unloading of the specimen tubes onto a centrifuge. The automated centrifuge loader includes a magnetic brake that can stop the centrifuge rotor at a precise position to facilitate loading and unloading of a specimen tube. The centrifuge includes a swing bucket designed to pivot around an axis and slide vertically to enable moving the bucket to a position in which the swing bucket can engage with the port where the specimen tube resides.

26 Claims, 23 Drawing Sheets

Related U.S. Application Data continuation of application No. PCT/US2023/065465, filed on Apr. 6, 2023.

(60) Provisional application No. 63/384,370, filed on Nov. 18, 2022, provisional application No. 63/328,177, filed on Apr. 6, 2022.

(52) U.S. Cl.
CPC ............... *G01N 2035/0465* (2013.01); *G01N 2035/0477* (2013.01); *G01N 2035/0493* (2013.01)

(56) References Cited

U.S. PATENT DOCUMENTS

| | | |
|---|---|---|
| 2,240,101 A | 4/1941 | Fred et al. |
| 2,722,257 A | 11/1955 | Lockhart |
| 2,775,350 A | 12/1956 | Jones |
| 2,896,502 A | 7/1959 | Nordin |
| 2,912,895 A | 11/1959 | Houston et al. |
| 3,081,029 A | 3/1963 | Kjetil et al. |
| 3,300,051 A | 1/1967 | Mitchell |
| 3,326,400 A | 6/1967 | Jacques et al. |
| 3,419,179 A | 12/1968 | Fritz et al. |
| 3,420,107 A | 1/1969 | Rowett et al. |
| 3,434,859 A | 3/1969 | Benjamin et al. |
| 3,478,889 A | 11/1969 | Fessler et al. |
| 3,481,712 A | 12/1969 | Bernstein et al. |
| 3,508,653 A | 4/1970 | Coleman et al. |
| 3,525,254 A | 8/1970 | Milanes et al. |
| 3,539,300 A | 11/1970 | Stone et al. |
| 3,611,403 A | 10/1971 | Gilford et al. |
| 3,615,222 A | 10/1971 | Mead |
| 3,626,929 A | 12/1971 | Sanz et al. |
| 3,654,925 A | 4/1972 | Holderith |
| 3,684,455 A | 8/1972 | Vacirca et al. |
| 3,701,434 A | 10/1972 | Moore |
| 3,706,305 A | 12/1972 | Berger et al. |
| 3,706,306 A | 12/1972 | Berger et al. |
| 3,733,179 A | 5/1973 | Guehler et al. |
| 3,750,645 A | 8/1973 | Bennett et al. |
| 3,761,408 A | 9/1973 | Jae et al. |
| 3,768,979 A | 10/1973 | Mead et al. |
| 3,780,935 A | 12/1973 | Lukacs et al. |
| 3,786,985 A | 1/1974 | Blaivas |
| 3,814,248 A | 6/1974 | Lawhead |
| 3,818,188 A | 6/1974 | Hertel et al. |
| 3,849,072 A | 11/1974 | Ayres |
| 3,852,194 A | 12/1974 | Zine, Jr. |
| 3,862,042 A | 1/1975 | Ayres |
| 3,879,295 A | 4/1975 | Glover et al. |
| 3,920,549 A | 11/1975 | Gigliello et al. |
| 3,926,521 A | 12/1975 | Ginzel |
| 3,928,139 A | 12/1975 | Dorn |
| 3,929,646 A | 12/1975 | Adler |
| 3,931,010 A | 1/1976 | Ayres et al. |
| 3,938,953 A | 2/1976 | Paschalis et al. |
| 3,939,822 A | 2/1976 | Markowitz |
| 3,942,717 A | 3/1976 | Robison |
| 3,958,944 A | 5/1976 | Wong |
| 3,972,812 A | 8/1976 | Gresl, Jr. |
| 3,985,649 A | 10/1976 | Eddelman |
| 3,999,868 A | 12/1976 | Sanz et al. |
| 4,012,325 A | 3/1977 | Columbus |
| 4,046,699 A | 9/1977 | Zine, Jr. |
| 4,050,451 A | 9/1977 | Columbus |
| 4,052,320 A | 10/1977 | Jakubowicz |
| 4,055,501 A | 10/1977 | Cornell |
| D246,800 S | 12/1977 | Wong |
| 4,081,356 A | 3/1978 | Zierdt |
| 4,083,788 A | 4/1978 | Ferrara |
| 4,088,582 A | 5/1978 | Murty et al. |
| 4,092,113 A | 5/1978 | Hardy |
| 4,131,512 A | 12/1978 | Dorn |
| 4,131,549 A | 12/1978 | Ferrara |
| 4,132,225 A | 1/1979 | Whattam |
| 4,136,036 A | 1/1979 | Columbus |
| 4,147,628 A | 4/1979 | Bennett et al. |
| 4,154,690 A | 5/1979 | Ballies |
| 4,164,449 A | 8/1979 | Dorn et al. |
| 4,169,060 A | 9/1979 | Columbus |
| 4,180,465 A | 12/1979 | Murty |
| 4,227,620 A | 10/1980 | Conway |
| 4,235,725 A | 11/1980 | Semersky |
| 4,257,886 A | 3/1981 | Kessler |
| 4,294,707 A | 10/1981 | Ikeda et al. |
| 4,295,974 A | 10/1981 | Cornell |
| 4,308,232 A | 12/1981 | Crouther et al. |
| 4,358,425 A | 11/1982 | Finney et al. |
| 4,369,117 A | 1/1983 | White |
| 4,417,981 A | 11/1983 | Nugent |
| 4,425,235 A | 1/1984 | Cornell et al. |
| 4,426,290 A | 1/1984 | Ichikawa et al. |
| 4,443,408 A | 4/1984 | Mintz |
| 4,513,522 A | 4/1985 | Selenke |
| 4,591,486 A | 5/1986 | Eberle |
| 4,671,939 A | 6/1987 | Mintz |
| 4,678,559 A | 7/1987 | Szabados |
| 4,735,904 A | 4/1988 | Starr |
| 4,755,356 A | 7/1988 | Robbins et al. |
| 4,762,798 A | 8/1988 | Deutsch |
| 4,775,626 A | 10/1988 | Armenta et al. |
| 4,799,358 A | 1/1989 | Knopf et al. |
| 4,805,772 A | 2/1989 | Shaw et al. |
| 4,811,866 A | 3/1989 | Golias |
| 4,832,678 A | 5/1989 | Sheeran |
| 4,957,707 A | 9/1990 | Hofelich et al. |
| 5,019,243 A | 5/1991 | McEwen et al. |
| 5,030,341 A | 7/1991 | McEwen et al. |
| 5,090,420 A | 2/1992 | Nielsen |
| 5,103,651 A | 4/1992 | Coelho et al. |
| 5,104,533 A | 4/1992 | Szabados |
| 5,151,184 A | 9/1992 | Ferkany |
| 5,236,604 A | 8/1993 | Fiehler |
| 5,275,731 A | 1/1994 | Jahn |
| 5,290,703 A | 3/1994 | Hsu et al. |
| 5,316,146 A | 5/1994 | Graff |
| 5,352,410 A | 10/1994 | Hansen et al. |
| 5,501,841 A | 3/1996 | Lee et al. |
| 5,556,544 A | 9/1996 | Didier |
| 5,614,236 A | 3/1997 | Klang |
| 5,632,905 A | 5/1997 | Haynes |
| 5,665,309 A | 9/1997 | Champseix et al. |
| 5,683,659 A | 11/1997 | Hovatter |
| 5,830,154 A | 11/1998 | Goldstein et al. |
| 5,882,318 A | 3/1999 | Boyde |
| 5,882,943 A | 3/1999 | Aldeen |
| 5,975,313 A | 11/1999 | Sarstedt |
| 6,043,878 A | 3/2000 | Gratzl et al. |
| 6,132,353 A | 10/2000 | Winkelman et al. |
| 6,171,261 B1 | 1/2001 | Niermann et al. |
| 6,221,655 B1 | 4/2001 | Fung et al. |
| 6,234,948 B1 | 5/2001 | Yavilevich |
| 6,270,728 B1 | 8/2001 | Wijnschenk et al. |
| 6,296,763 B1 | 10/2001 | Hicks |
| 6,344,331 B1 | 2/2002 | Ball et al. |
| 6,471,069 B2 | 10/2002 | Lin et al. |
| 6,497,325 B1 | 12/2002 | DiCesare et al. |
| 6,730,071 B1 | 5/2004 | Dassa |
| 6,793,885 B1 | 9/2004 | Yokoi et al. |
| 7,176,034 B2 | 2/2007 | Efthimiadis et al. |
| 7,638,342 B2 | 12/2009 | Samsoondar |
| 7,736,593 B2 | 6/2010 | Dastane et al. |
| 8,343,426 B2 | 1/2013 | Song |
| 8,550,273 B2 | 10/2013 | Levin et al. |
| 8,632,740 B2 | 1/2014 | Dastane et al. |
| 8,852,505 B2 | 10/2014 | Dupoteau et al. |
| 9,251,393 B2 | 2/2016 | Pollack |
| 9,279,760 B2 | 3/2016 | Imazu et al. |
| 9,488,563 B2 | 11/2016 | Halverson et al. |
| 9,604,219 B2 | 3/2017 | Mortillaro et al. |
| 10,336,539 B2 | 7/2019 | Caveney et al. |
| 10,870,110 B2 | 12/2020 | Olson |

(56) References Cited

U.S. PATENT DOCUMENTS

| | | |
|---|---|---|
| 11,697,114 B2 | 7/2023 | Olson |
| 12,025,629 B2 | 7/2024 | Flanagan et al. |
| 12,050,052 B1 | 7/2024 | Olson |
| 2001/0025818 A1 | 10/2001 | Warner |
| 2002/0040872 A1 | 4/2002 | Bogoev et al. |
| 2002/0066712 A1 | 6/2002 | Brockwell |
| 2002/0155619 A1 | 10/2002 | Kurihara et al. |
| 2003/0091701 A1 | 5/2003 | Yahav |
| 2003/0209091 A1 | 11/2003 | Fattinger et al. |
| 2004/0005246 A1 | 1/2004 | Efthimiadis et al. |
| 2004/0059255 A1 | 3/2004 | Manoussakis et al. |
| 2004/0129631 A1 | 7/2004 | Anraku et al. |
| 2005/0014273 A1 | 1/2005 | Dahm et al. |
| 2005/0059163 A1 | 3/2005 | Dastane et al. |
| 2005/0123444 A1 | 6/2005 | Tomasso et al. |
| 2005/0132775 A1 | 6/2005 | Laugharn, Jr. et al. |
| 2006/0009713 A1 | 1/2006 | Flaherty |
| 2006/0142669 A1 | 6/2006 | Morimoto et al. |
| 2006/0168985 A1 | 8/2006 | Gano |
| 2007/0020629 A1 | 1/2007 | Ross et al. |
| 2007/0048185 A1 | 3/2007 | Dupoteau et al. |
| 2007/0073187 A1 | 3/2007 | Thomson et al. |
| 2007/0083131 A1 | 4/2007 | Escutia et al. |
| 2007/0110627 A1 | 5/2007 | Nagai et al. |
| 2007/0231834 A1 | 10/2007 | Hale |
| 2008/0003148 A1 | 1/2008 | Dause |
| 2008/0096282 A1 | 4/2008 | Samsoondar |
| 2008/0185349 A1 | 8/2008 | Willliams |
| 2008/0213377 A1 | 9/2008 | Bhatia et al. |
| 2008/0237115 A1 | 10/2008 | Shintani et al. |
| 2008/0286150 A1 | 11/2008 | Pankow |
| 2008/0313877 A1 | 12/2008 | Campbell |
| 2009/0257922 A1 | 10/2009 | Baker |
| 2010/0062415 A1 | 3/2010 | Schwoebel et al. |
| 2010/0111773 A1 | 5/2010 | Pantelidis |
| 2010/0114056 A1 | 5/2010 | Nagai |
| 2010/0261988 A1 | 10/2010 | Tamir |
| 2010/0288060 A1 | 11/2010 | Ronsick et al. |
| 2010/0291619 A1 | 11/2010 | Robinson et al. |
| 2010/0294050 A1 | 11/2010 | Massaro |
| 2010/0297659 A1 | 11/2010 | Yoo |
| 2010/0303688 A1 | 12/2010 | Andersen |
| 2011/0263408 A1 | 10/2011 | Suto et al. |
| 2012/0048002 A1 | 3/2012 | Mallet |
| 2012/0048827 A1 | 3/2012 | Levin |
| 2012/0053041 A1 | 3/2012 | Ihm et al. |
| 2012/0058027 A1 | 3/2012 | Song |
| 2012/0258531 A1 | 10/2012 | Seubert et al. |
| 2013/0045477 A1 | 2/2013 | Harder et al. |
| 2013/0045852 A1 | 2/2013 | Chapman et al. |
| 2013/0125628 A1 | 5/2013 | Kitagawa et al. |
| 2013/0167768 A1 | 7/2013 | Smith et al. |
| 2013/0209985 A1 | 8/2013 | Hoke et al. |
| 2013/0224851 A1 | 8/2013 | Ljungmann et al. |
| 2013/0260412 A1* | 10/2013 | Tatsutani ......... G01N 35/00732 435/34 |
| 2013/0280130 A1 | 10/2013 | Sarwar et al. |
| 2013/0323711 A1 | 12/2013 | Singh et al. |
| 2014/0065018 A1 | 3/2014 | Imazu et al. |
| 2014/0073990 A1 | 3/2014 | Holmes et al. |
| 2014/0096598 A1 | 4/2014 | Halverson et al. |
| 2014/0105796 A1 | 4/2014 | Nagy |
| 2014/0113278 A1 | 4/2014 | Thomas et al. |
| 2014/0241957 A1 | 8/2014 | Serhan et al. |
| 2014/0255254 A1 | 9/2014 | Yamaguchi et al. |
| 2014/0273242 A1 | 9/2014 | Ochranek et al. |
| 2014/0296089 A1 | 10/2014 | Holmes et al. |
| 2014/0356254 A1 | 12/2014 | Lee et al. |
| 2014/0374480 A1 | 12/2014 | Pollack |
| 2015/0018715 A1 | 1/2015 | Walterspiel |
| 2015/0056689 A1* | 2/2015 | DeWitte ............... G01N 30/72 422/65 |
| 2015/0056716 A1 | 2/2015 | Oyler et al. |
| 2015/0072346 A1 | 3/2015 | Gellibolian et al. |
| 2015/0111299 A1 | 4/2015 | Watabe et al. |
| 2015/0151294 A1 | 6/2015 | Cho et al. |
| 2015/0289856 A1 | 10/2015 | Saqi et al. |
| 2015/0316532 A1 | 11/2015 | Makino et al. |
| 2016/0018427 A1 | 1/2016 | Streibl et al. |
| 2016/0097049 A1 | 4/2016 | Qian |
| 2016/0271015 A1 | 9/2016 | Wengreen et al. |
| 2018/0028102 A1 | 2/2018 | George et al. |
| 2018/0259251 A1 | 9/2018 | Poorte et al. |
| 2018/0326413 A1 | 11/2018 | Walkowiak et al. |
| 2018/0353952 A1 | 12/2018 | Olson |
| 2019/0072578 A1 | 3/2019 | Buschke |
| 2019/0145688 A1 | 5/2019 | Tsuno |
| 2019/0320960 A1 | 10/2019 | Olson et al. |
| 2019/0331703 A1 | 10/2019 | Olson et al. |
| 2019/0350808 A1 | 11/2019 | Olson et al. |
| 2020/0150005 A1 | 5/2020 | Slutter et al. |
| 2020/0363116 A1 | 11/2020 | Van Bokkelen et al. |
| 2021/0039088 A1 | 2/2021 | Olson |
| 2021/0063062 A1 | 3/2021 | Alexander et al. |
| 2021/0123936 A1 | 4/2021 | Swanson et al. |
| 2021/0239725 A1* | 8/2021 | Hu ........................ G01N 35/04 |
| 2022/0049890 A1 | 2/2022 | Alexander et al. |
| 2022/0349910 A1 | 11/2022 | Silbert et al. |
| 2023/0074188 A1 | 3/2023 | Luo et al. |
| 2023/0324425 A1 | 10/2023 | Flanagan et al. |
| 2024/0042427 A1 | 2/2024 | Olson |
| 2024/0302397 A1* | 9/2024 | Yoon ..................... G01N 35/04 |
| 2024/0345113 A1 | 10/2024 | Olson et al. |
| 2024/0382949 A1 | 11/2024 | Olson |

FOREIGN PATENT DOCUMENTS

| | | |
|---|---|---|
| CN | 1690714 A | 11/2005 |
| CN | 1826530 A | 8/2006 |
| CN | 1856366 A | 11/2006 |
| CN | 1863495 A | 11/2006 |
| CN | 101311700 A | 11/2008 |
| CN | 101312689 A | 11/2008 |
| CN | 101454665 A | 6/2009 |
| CN | 101678931 A | 3/2010 |
| CN | 201454557 U | 5/2010 |
| CN | 102033007 A | 4/2011 |
| CN | 102209896 A | 10/2011 |
| CN | 102764133 A | 11/2012 |
| CN | 102933949 A | 2/2013 |
| CN | 103123317 A | 5/2013 |
| CN | 103308376 A | 9/2013 |
| CN | 103354765 A | 10/2013 |
| CN | 103393427 A | 11/2013 |
| CN | 103608658 A | 2/2014 |
| CN | 103674672 A | 3/2014 |
| CN | 104034672 A | 9/2014 |
| CN | 104107054 A | 10/2014 |
| CN | 203965173 U | 11/2014 |
| CN | 104768516 A | 7/2015 |
| CN | 105600468 A | 5/2016 |
| EP | 0494845 A1 | 7/1992 |
| EP | 1005910 A2 | 6/2000 |
| EP | 1161923 A1 | 12/2001 |
| EP | 1542020 A2 | 6/2005 |
| EP | 1884188 A1 | 2/2008 |
| EP | 2726842 A1 | 5/2014 |
| EP | 3603813 A2 | 2/2020 |
| FR | 2582013 A1 | 11/1986 |
| JP | S4851686 A | 7/1973 |
| JP | S4841632 B1 | 12/1973 |
| JP | H03181852 A | 8/1991 |
| JP | H0526883 A | 2/1993 |
| JP | H0821839 A | 1/1996 |
| JP | H09166591 A | 6/1997 |
| JP | H1033507 A | 2/1998 |
| JP | H10243940 A | 9/1998 |
| JP | H10277019 A | 10/1998 |
| JP | H1183864 A | 3/1999 |
| JP | H11318870 A | 11/1999 |
| JP | 2000084389 A | 3/2000 |
| JP | 2001502595 A | 2/2001 |
| JP | 2001264344 A | 9/2001 |
| JP | 2007503580 A | 2/2007 |

(56) References Cited

FOREIGN PATENT DOCUMENTS

| | | | |
|---|---|---|---|
| JP | 2007271388 A | 10/2007 | |
| JP | 2008506128 A | 2/2008 | |
| JP | 2008099991 A | 5/2008 | |
| JP | 2008191070 A | 8/2008 | |
| JP | 2009507237 A | 2/2009 | |
| JP | 2009089759 A | 4/2009 | |
| JP | 2012527613 A | 11/2012 | |
| JP | 2014048112 A | 3/2014 | |
| JP | 2014173904 A | 9/2014 | |
| JP | 2015509202 A | 3/2015 | |
| WO | WO-8505048 A1 | 11/1985 | |
| WO | WO-9839650 A1 | 9/1998 | |
| WO | WO-0170403 A1 | 9/2001 | |
| WO | WO-2005014173 A1 | 2/2005 | |
| WO | WO-2008027319 A2 | 3/2008 | |
| WO | WO-2008119947 A1 | 10/2008 | |
| WO | WO-2013003308 A1 | 1/2013 | |
| WO | WO-2014050021 A1 | 4/2014 | |
| WO | WO-2017100798 A1 | 6/2017 | |
| WO | WO-2018090023 A1 | 5/2018 | |
| WO | WO-2018090027 A1 | 5/2018 | |
| WO | WO-2018090030 A2 | 5/2018 | |
| WO | WO-2023196922 A1 | 10/2023 | |

OTHER PUBLICATIONS

European Communication for Application No. 17870446.6 dated Dec. 5, 2023, 6 pages.
Final Office Action for U.S. Appl. No. 16/349,925 dated Sep. 26, 2023, 55 pages.
Final Office Action for U.S. Appl. No. 18/300,971 dated Mar. 8, 2024, 30 pages.
International Search Report and Written Opinion mailed Sep. 8, 2023 in corresponding PCT Application No. PCT/US2023/065465, 9 pages.
International Search Report mailed Feb. 2, 2018 in corresponding PCT Application No. PCT/US2017/061596, 3 pages.
Non-Final Office Action for U.S. Appl. No. 16/349,925, dated Mar. 10, 2023, 40 pages.
Non-Final Office Action for U.S. Appl. No. 18/300,757 dated Nov. 15, 2023, 20 pages.
Non-Final Office Action for U.S. Appl. No. 18/300,971 dated Aug. 30, 2023, 27 pages.
Non-Final Office Action for U.S. Appl. No. 18/300,971 dated Nov. 28, 2023, 24 pages.
Notice of Allowance for U.S. Appl. No. 18/300,757 dated Feb. 28, 2024, 13 pages.
Office Action for Chinese Application No. 201780083377, mailed Sep. 1, 2022, 18 pages.
Office Action for Japanese Application No. JP2019525902, mailed Jan. 20, 2022, 5 pages with English Translation.
Restriction Requirement for U.S. Appl. No. 18/300,757 dated Sep. 1, 2023, 7 pages.
Restriction Requirement for U.S. Appl. No. 18/300,971 dated Jun. 28, 2023, 7 pages.
International Preliminary Report on Patentability for International Application No. PCT/US2023/065465 mailed Oct. 17, 2024, 8 pages.
Notice of Allowance for U.S. Appl. No. 18/300,971 mailed Sep. 25, 2024, 12 pages.

\* cited by examiner

AUTOMATED CENTRIFUGE LOADER

CROSS REFERENCE TO RELATED APPLICATIONS

This application is a continuation of U.S. patent application Ser. No. 18/300,757, entitled "Automated Centrifuge Loader," filed Apr. 14, 2023, now U.S. Pat. No. 12,025,629, which is a continuation of International Application No. PCT/US2023/065465, entitled "Automated Centrifuge Loader," filed Apr. 6, 2023, which claims the benefit of U.S. Provisional Application No. 63/328,177, entitled "Automated Centrifuge Loader," filed Apr. 6, 2022, and U.S. Provisional Application No. 63/384,370, entitled "Automated Centrifuge Loader," filed Nov. 18, 2022, the disclosure of each of which is incorporated by reference herein in its entirety.

TECHNICAL FIELD

The present disclosure relates to sample preparation devices, and in particular to devices and methods for automatically preparing biological samples, including capillary blood samples, and automatically loading and unloading the biologicals samples on a centrifuge.

BACKGROUND

Biological samples including blood samples are routinely collected and analyzed to assess the overall physical well-being of patients. Blood samples can be obtained from a patient via venipuncture or capillary blood sampling methods at a collection site. The samples can then be subjected to multiple preparation and/or processing steps including sorting, clotting, centrifuging and/or storing in order stabilize the blood components until the samples can be transferred to a laboratory for analysis. These sample processing steps may involve elaborate and detailed instructions such as for example, adding precise amounts of a specific chemical reagents depending on the type of blood analysis needed, manipulating the samples to mix blood with the chemical reagents added, incubating the samples for a specific period of time to facilitate chemical or physical reactions to take place, and centrifuging following specific profiles to separate blood components. Medical professionals are routinely tasked with conducting the sample processing steps, which provide a number of opportunities for introducing errors that can adversely impact the outcome, accuracy and/or reproducibility of the diagnostic tests. Consequently, there is a need to develop devices and methods that can automate such processes, overcoming the limitations of currently available devices.

SUMMARY

Systems, devices, and methods for processing biological samples including capillary blood samples, including the automatic loading and unloading the biologicals samples on a centrifuge are described herein. In some embodiments, a system includes: a housing; a centrifuge disposed within the housing; a storage compartment disposed within the housing; a sample preparation component removably coupleable to the housing; and a transferring component. The sample preparation component includes: an enclosure configured to receive a specimen container containing a blood sample; a scanner disposed within the enclosure, the scanner configured to read an identifier of the specimen container; and a controller operably coupled to the scanner and the mixer, the controller configured to receive the identifier read by the scanner. The transferring component is mechanically coupled to the centrifuge and the storage compartment, the transferring component configured to (1) receive the specimen container from the sample preparation component when the sample preparation component is coupled to the housing, and (2) direct the specimen container to the storage compartment for storing the blood sample, or to the centrifuge for centrifuging the blood sample and then to the storage compartment for storing the blood sample based on the information of the identifier.

In some embodiments, a system includes a housing; a centrifuge disposed within the housing and including a rotor, a sample preparation component removably coupleable to the housing; a transferring component mechanically coupled to the centrifuge and the storage compartment, and a positioning component. The transferring component is configured to receive a blood sample contained in a specimen container. The positioning component includes: a receptacle configured to receive the specimen container from the transferring component; and a magnetic device configured to engage a portion of the rotor such that the rotor can be moved to a predetermined position to load the specimen container from the receptacle into the centrifuge for centrifuging the blood sample.

In some embodiments, a system includes: a centrifuge, a positioning component, and a transferring component. The centrifuge is disposed within the housing and includes a rotor. The rotor of the centrifuge includes a portion made of a ferromagnetic material. The positioning component has a motor and an alignment magnet. The motor is coupled to the alignment magnet and is configured to transition between a first position in which the alignment magnet and the portion of the rotor are separated by a first distance, and a second position in which the alignment magnet and the portion of the rotor are separated by a second distance, smaller than the first distance, to initiate magnetic engagement between the alignment magnet and the portion of the rotor to align the portion of the rotor with the alignment magnet.

In some embodiments, an apparatus includes: an enclosure comprising: an inlet port configured to receive a specimen container containing a blood sample; an outlet port; an interface configured to be removably couplable to a processing unit having at least one of a centrifuge or a storage compartment, a scanner configured to read an identifier of the specimen container; a mixer configured to actuate the specimen container to mix one of an additive or a reagent included in the specimen container; and a controller. The controller is operably coupled to the scanner and the mixer, and is configured to: receive the identifier read by the scanner, send a set of instructions to the mixer to actuate the specimen container, the set of instructions associated with information included in the identifier, and transfer, via the outlet port, the specimen container to the processing unit for at least one of centrifugation or storage.

DETAILED DESCRIPTION

Figure 1:
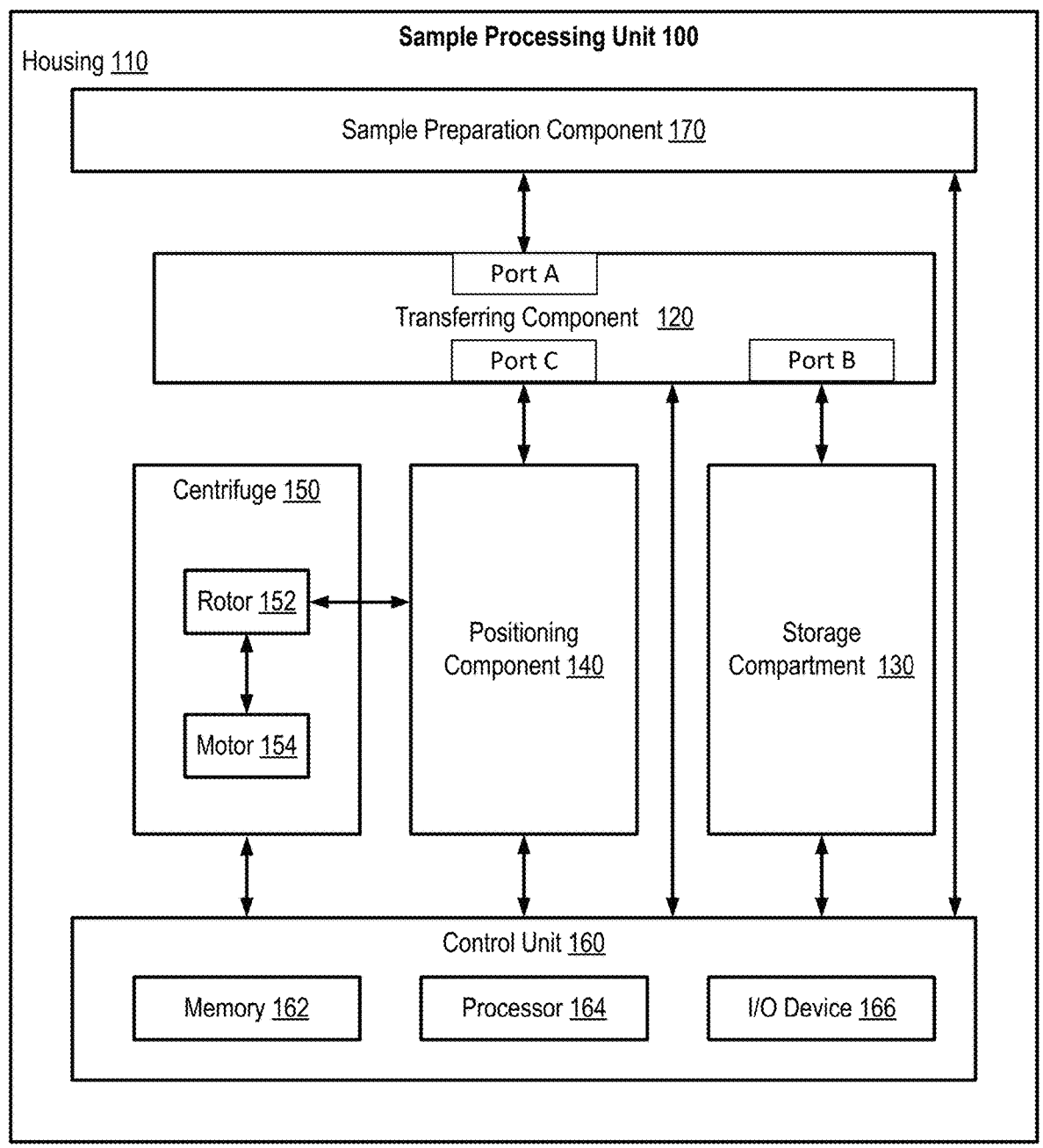
FIG. 1 is a schematic illustration of a sample processing unit for the automatic processing of blood samples, according to an embodiment.

The embodiments described herein related generally to sample preparation and/or processing devices, and more particularly to devices that enable automated processing of biological samples including blood samples, facilitating sample identification, loading and unloading of samples in a centrifuge to separate blood components, and/or sample storage.

Collection and processing blood samples for use in clinical diagnostics can be complex. Blood samples can be drawn from patients and then be immediately subjected to multiple processing steps performed by medical professionals and/or technicians to prepare and stabilize blood sample specimens until they are transferred to a laboratory for analysis. For example, blood samples need to be labeled to identify all pertinent information such as patient identification, date and time of sample collection, volume of sample required, and type of blood analysis required. Blood samples may also need to be mixed with adequate amounts of chemical reagents and/or additives such as anticoagulants, preservatives, and clot activators (e.g., Ethylenediaminetetraacetic acid (EDTA) heparin, potassium oxalate and/or trisodium citrate). The samples with the added reagents and/or additives may then need to be manipulated in any suitable manner such as for example, stirring, agitating, rocking, inverting, vortexing, sonicating the sample fora specific number of times and/or for a specific time period in order to mix the blood with specific chemical reagents and/or additives. Blood samples may also be required to be centrifuged following very specific centrifugation protocols comprising multiple steps (e.g., providing predetermined time intervals prior to centrifugation to allow clotting of samples, centrifuging samples at different rotational speed profiles, ramped acceleration profiles, centripetal force, and time intervals). These protocols can vary significantly depending on the type of laboratory analysis to be performed on the blood sample, and thus can be susceptible to confusion and/or errors.

In some instances, blood sample processing may include adding a specific amount of blood to a sample tube containing a fixed amount of anticoagulant, such that the blood to anticoagulant ratio in the sample tube is adequate (e.g., common blood sample processing protocols require a 9:1 blood to anticoagulant ratio). Addition of inadequate amounts of blood to the sample tube can lead to inaccurate results. This type of errors can be more pronounced and difficult to avoid when processing small sample volumes. Moreover, in some instances a technician and/or medical professional may accidentally select an incorrect sample tube (e.g., a sample tube containing a reagent used in a test different from the required test) and add blood to the incorrect sample tube which contains an erroneous additive. In other instances, blood sample processing may include waiting specific amounts of time for certain processes to take place. For example, some sample processing protocols require waiting for serum tubes to clot prior to centrifugation. The technician conducting the sample processing protocol can become impatient and centrifuge too early, causing inadequate latent fibrin formation that may lead to medical diagnostic errors. Excessive agitation or vigorous shaking can also lead to erroneous analysis results due to induced hemolysis and/or platelet clumping. Cross-contamination of samples during processing can also lead to inaccurate results by introducing undesired chemicals and/or pathogens in the sample.

The sample processing steps described above can be subject to multiple human errors that may render the analysis invalid or undetermined and can cause significant costs. Consequently, healthcare providers are required to use written procedures and formal employee trainings to reduce the likelihood and impact of sample processing errors described above. In some cases, the complexity of the procedures requires that the personnel collecting and processing the blood sample undergo formal phlebotomy training and/or licensing. Alternative and/or complementary strategies to mitigate the potential for errors during blood sample processing include use of visual aids to remind technicians how to handle each sample tube type, use of poster size flow charts, color coded samples and/or labels, and custom information systems designed to remind the technician how to prepare each blood sample specimen, and use of timers to measure required time intervals for each individual step in the case of time sensitive sample preparation methods. All this complexity leads to elevated costs and higher risk for errors.

System and devices described herein address the limitation of existing technologies by providing a sample processing unit that automates the preparation, stabilization, centrifugation, and storage of biological samples including blood samples, to preserve the integrity of the samples until they are transferred, e.g., to a laboratory, for analysis. In some implementations, the systems and devices described herein can be configured to receive blood samples disposed in sample specimen containers (also referred to herein as specimen containers) that have identifiers and/or bar codes containing information specific to each sample, its donor, and/or the type of processing steps required for the sample. Such identifiers can be scanned to, for example, verify that the type of tube received matches the tube required for the intended test (and thus the reagent included in the tube is the correct reagent), and/or to receive specific information related to the intended sample processing steps such as type of mixing required, clotting time, and specific centrifugation instructions. Automated centrifugation of blood samples (e.g., centrifugation of samples without the intervention of a user, technician and/or medical professional) requires use of a centrifugation unit (e.g., a centrifuge) capable of automatic loading/unloading samples. The automatic loading and unloading of samples into a centrifuge typically requires the use of centrifuge motors capable of operating at low torque such that the rotor of the centrifuge can be accurately and reproducibly directed and/or moved to a predetermined position in which the sample can be loaded and/or unloaded form the centrifuge. The majority of motors capable of operating at low torque are not suitable for centrifugation applications due to their limited ability to produce the high torque output required during centrifugation to separate components of complex biological samples. Consequently, the systems that automate centrifugation processes using low torque motors suffer from inadequate and/or very limited performance. Alternatively, in some instances systems can use a brushless DC motor coupled to an encoder to translate position of the rotor, or sophisticated motors such as a servo or stepper motor and/or a high torque motor coupled to a variable frequency drive (VFD) that has very high resolution in order to control the movement of the rotor at low torque and low speed conditions However, these motors can be very large and/or prohibitively expensive, and therefore reduce their implementation to specific and/or niche applications in which cost is not a decisive factor, and/or the size and portability of the system is not required. The systems and devices described herein overcome these limitations by incorporating a positioning component operationally coupled to the rotor of a centrifuge. The positioning component enables directing and/or moving the rotor of the centrifuge automatically (e.g., without human intervention) to a predetermined position such that biological samples can be routinely loaded and unloaded. The positioning component allows the use of motors capable of producing high torque outputs without the need for expensive motors and/or high resolution VFDs, resulting in small footprint (compact) and portable systems that can be manufactured in high volumes at low cost, and installed and operated in retail environments, as further described herein.

The sample processing unit described herein can automate one or more processing steps such as sample identification, clotting, centrifugation, and/or sample storage, therefore reducing the risk for potential errors, simplifying and expediting sample preparation, and ultimately reducing ample preparation costs.

As used in this specification and/or any claims included herein, the singular forms "a," "an," and "the" include plural referents unless the context clearly dictates otherwise. Thus, for example, the term "a member" is intended to mean a single member or a combination of members, "a material" is intended to mean one or more materials, and/or the like.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance (e.g., plus or minus 10% of the value or characteristic stated). For example, a value of about 0.01 can include 0.009 and 0.011, a value of about 0.5 can include 0.45 and 0.55, a value of about 10 can include 9 to 11, and a value of about 1000 can include 900 to 1100. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

FIG. 1 show a schematic illustration of a sample processing unit 100 for the automatic processing of samples, including blood samples, according to an embodiment. The sample processing unit 100 (also referred to herein as "processing unit") can be configured to receive and process biological samples, including capillary blood samples collected from patients at a traditional collection site or at a retail collection site and contained and/or stored inside sample specimen containers. The processing unit 100 can be configured to process biological samples by conducting and/or executing one or more procedure and/or steps including (1) scanning and reading a label and/or an identifier disposed on the sample specimen containers to identify information associated with the biological samples contained therein, (2) executing any suitable procedure such as shaking, rocking, inverting, sonicating or the like, to adequately mix and/or disperse reagents and/or additives included with the biological samples, (3) holding the sample specimen containers in a predetermined position and/or orientation for a set period of time to allow the biological samples to undergo a desired physical and/or chemical transformation, (4) centrifuging the biological samples disposed within the sample specimen containers, and/or (5) storing the biological samples at a predetermined temperature until the biological samples are transferred to a laboratory for analysis. For example, in some implementations the processing unit 100 can be configured to store the biological samples at a temperature between about 2° C. and about 8° C. until the biological samples are transferred to a laboratory for analysis. In other implementations the processing unit 100 can be configured to store the biological samples at room temperature (e.g., 25° C.). The processing unit 100 includes a housing 110, a transferring component 120, a storage compartment 130, a positioning component 140, a centrifuge 150, a control unit 160, and a sample preparation component 170, housed, contained, or otherwise disposed within the housing 110. Although the processing unit 100 is shown and described as including the sample preparation component 170 within the housing 110, in some embodiments the sample preparation component 170 can be configured to be a standalone device, and/or unit that can be removably coupled to a sample processing unit to process biological samples, as further described herein. In such embodiments, the processing unit 100 could be used to process biological samples such capillary blood samples, collected at a site different from a technical laboratory (e.g., a home or a retail collection site). In some instances, the sample preparation component 170 can be used to collect samples in remote and/or hard to reach locations that do not facilitate moving the entire processing unit 100 due to space and/or time constraints. For example, the processing unit 100 can be located and/or disposed in a vehicle, and the sample preparation component 170 can be carried by a technician or medical professional to a home for an in-home sample collection. The sample preparation component 170 containing the in-home collected samples can then be coupled to the processing unit 100 to complete the sample processing and store the sample. In other instances, a collection site may concentrate a large number of patients and thus generate large volumes of samples for processing. The samples may require a rapid collection and initial processing to at least, identify the samples, ensure adequate mixing of reagents and/or additives included with the samples, and/or hold the samples for a period of time to make sure they undergo a desired physical and/or chemical transformation. The sample preparation component 170 can be used to expedite collection of samples and their rapid initial processing. The sample preparation component 170 can then be coupled to the processing unit 100 to transfer the collected samples to complete their processing. Upon transferring the samples to the processing unit 100, the samples preparation component 170 can be used to continue collecting new samples. In that way, the sample preparation component 170 can facilitate reducing the time a patient may need to wait to have his/her sample being collected and initially processed, while the processing unit 100 can complete the processing steps and store the samples until they are transferred to laboratory for analysis. Alternatively, in some embodiments a processing unit may be configured to be coupled to one or more standalone sample preparation components 170, providing high flexibility and high throughput needed for such applications. For example, a processing unit 100 could be deployed at a retail collection site and multiple technicians and/or medical professionals could collect samples and initiate their processing in parallel, using multiple standalone sample preparation components 170. The standalone sample preparation components 170 would enable the technicians and/or medical professionals to be mobile and facilitate reaching more patients within a retail environment to collect the samples and initiate their processing. The sample preparation components 170 can then be coupled to the sample processing unit to finalize the sample processing and storage.

The processing unit 100 can receive biological samples contained in sample specimen containers and conduct one or more processing steps to stabilize and store the biological samples prior to their transfer to a laboratory for analysis. The processing unit 100 can include an opening, aperture, slot, and/or port disposed on an external surface of the housing 110, with the port being sized and configured to receive sample specimen containers directly from a user and/or technician and then transfer the received sample specimen containers to the sample preparation component 170 for processing. Alternatively, as described above in some embodiments a processing unit may not include a sample preparation component 170 and instead may be configured to be removably coupled to a separate standalone sample preparation component 170. In such embodiments, the processing unit can be removably coupled to the standalone sample preparation component 170 to receive automatically (e.g., without human intervention) sample specimen containers from the standalone sample preparation component 170. The sample specimen containers can be first introduced in the sample preparation component 170 via an opening, aperture, slot, and/or access port disposed on a surface of the sample preparation component 170. The sample specimen containers can be subject to one or more processing steps on the sample preparation component 170, and then be transferred and/or transported automatically (e.g., without human intervention) to the sample transferring component 120 for further processing, as described herein.

The sample preparation component 170 can be configured receive the sample specimen containers, conduct one or more sample processing steps, and then transfer the sample specimen containers automatically (e.g., without human intervention) to other components of the processing unit 100. For example, in some implementations the sample preparation component 170 can be configured to receive a sample specimen container. The received sample specimen container can be subjected to one or more processing steps such as, for example, scan and/or read a label and/or an identifier of the sample specimen containers to identify information associated with the biological sample contained in each sample specimen container, conduct any suitable procedure to adequately mix reagents and/or additives included in the sample specimen container including, for example, shaking, rocking, inverting, stirring, vibrating or the like, and/or hold the sample specimen container in a predetermined orientation for a predetermined amount of time to ensure that the biological sample contained in a sample specimen container can undergo one or more desired chemical and/or physical changes with the reagents/additives added, as further described herein. In some embodiments, the sample preparation component 170 described herein can be similar in form and/or function to the sample preparation units described in U.S. Patent publication No. US 2019/0331703, entitled "Sample Preparation Device," filed May 14, 2019, the disclosure of which is incorporated herein by reference in its entirety, and attached hereto as Exhibit A.

The transferring component 120 can be mechanically coupled to one or more portions and/or components of the processing unit 100 to receive sample specimen containers and facilitate transferring those sample specimen containers to other components of the processing unit 100 for their centrifugation and/or storage. For example, in some implementations the transferring component 120 can be coupled to the sample preparation component 170 to receive sample specimen containers. The transferring component 120 can also be mechanically coupled to the to the storage compartment 130 to transfer, direct and/or transport the received sample specimen containers directly to the storage compartment 130 for storage of the biological samples. In other instances, the transferring component 120 can receive a sample specimen container and be mechanically coupled to the positioning component 140 to facilitate the automatic (e.g., without human intervention) loading of the sample specimen container on the centrifuge 150. Moreover, the transferring component 120 can be further configured to receive a sample specimen container from the positioning component 140 after the biological sample contained in the sample specimen container has been centrifuged. The transferring component 120 can then transfer, direct and/or transport the centrifuged sample specimen container to the storage compartment 130 for storage of centrifuged the biological sample at a predetermined temperature, as further described herein.

The processing unit 100 can receive biological samples contained in sample specimen containers and centrifuge the biological samples. To that effect, the positioning component 140 of the processing unit 100 can be configured to facilitate automatic loading and unloading of biological samples on/from the centrifuge 150. The positioning component 140 is coupled to the transferring component 120 to receive a sample specimen container that requires centrifugation. The positioning component 140 is also operably coupled with the centrifuge 150, and more specifically with a rotor 152 of the centrifuge 150, as shown in FIG. 1. The positioning component 140 can be configured to engage and/or interact with the rotor 152 automatically (e.g., without the need for physical intervention of a technician) to move and/or direct the rotor 152 to a predetermined position, such that an interior volume, cavity, and/or compartment of the rotor 152 configured to receive and hold in place a sample specimen container during centrifugation becomes precisely aligned with at least a portion of the positioning component 140 to allow a sample specimen container to be transported and/or transferred from the transferring component 120 into the interior volume, cavity and/or compartment of the rotor 152, as further described herein. Furthermore, the positioning component 140 can be configured to engage and/or interact with the rotor 152 automatically after the sample specimen container has been centrifuged, to position the interior volume, cavity, and/or compartment of the rotor 152 back in the predetermined position automatically, such that the centrifuged sample specimen container can be transferred back from the interior volume, cavity, and/or compartment of the rotor 152 to the transferring component 120. In some implementations the rotor 152 can be a horizontal rotor including at least one swing bucket configured to receive and hold in place a sample specimen container during centrifugation. In other implementations, the rotor 152 can be any suitable type of rotor including a fixed angle rotor, a vertical rotor, a near vertical rotor, and/or a specialty rotor. The centrifuge 150 can be any suitable device configured to apply a centrifugal force to separate the contents of a biological sample contained in a sample specimen container. The centrifuged sample specimen containers can then be transported and/or transferred from the positioning component 140 to the transferring component 120 and then to the storage compartment 130 for storage at a predetermined temperature, as further described herein.

The processing unit 100 also includes a control unit 160 having a memory 162, a processor 164, and an input/output (I/O) device 166, as further described herein. The control unit 160 can be configured to activate and/or control the operation of one or more components of the processing unit 100, e.g., by receiving electrical signal(s) from and/or sending electrical signal(s) to other components of the processing unit 100. For example, in some implementations the control unit 160 can be electrically and/or operatively coupled to the transferring component 120, the positioning component 140, and/or the storage compartment 130, such that the control unit 160 can activate and/or control the operation of the positioning component 140 and the transferring component 120 to load and unload sample specimen containers to and/from the centrifuge, and to transfer, direct and/or transport the centrifuged sample specimen containers to the storage compartment 130 for storage at a predetermined temperature. In some implementations, the control unit 160 can be electrically and/or operatively coupled to the centrifuge 150 such that the control unit 160 can activate and/or control the operation of the centrifuge 150 to centrifuge the sample specimen containers according to specific instructions and/or conditions (e.g., centrifugation speed, run time, centripetal force, etc.).

The sample specimen containers described herein can be any suitable specimen tube often called a test tube, in which a biological sample including a blood sample, can be collected. The specimen tube can have a closed end, an open end, and lateral wall(s). The open end enables a liquid specimen to be inserted into the specimen tube. The closed end can have a round or conical bottom configured to minimize dead volume when pipetting from the bottom of the specimen tube. However, in some in some implementations the bottom of the specimen tube can be any suitable shape and/or form. The lateral wall(s) can be any suitable closed shape that defines an interior volume capable of accommodating a biological sample. For example, the lateral wall(s) can be a cylindrical shape and/or a tempered conical shape. The sample specimen tube can include a cap and/or any suitable closure that may be removed from the specimen tube to allow a biological sample to be introduce and/or extracted from the specimen tube via the open end of the specimen tube. The specimen tube and cap can have a mechanism by which the open end of the specimen tube may be secured with the cap to form a sample specimen container, such that a biological sample is contained within the specimen tube and the cap. The mechanism for securing the specimen tube and the cap can be any mechanism desired as long as the specimen tube and cap are secured to create a leak free fitting. In some embodiments, the sample specimen containers described herein can be similar in form and/or function to the specimen containers described in U.S. Pat. No. 10,870,110 entitled, "Specimen Container and Centrifugation Method for Separating Serum or Plasma from Whole Blood Therewith," filed Oct. 28, 2020, the disclosure of which is incorporated herein by reference in its entirety and attached hereto as Exhibit B.

The housing 110 can be any suitable structure configured to provide a protective enclosure that defines one or more interior volumes, compartments, and/or chambers suitable for accommodating (e.g., housing, containing, supporting, etc.) the components of the sample processing unit 100. For example, in some implementations, the housing 110 can define one or more interior volume, compartment, and/or chambers suitable for accommodating the transferring component 120, the storage compartment 130, the positioning component 140, the centrifuge 150, the control unit 160, and the sample preparation component 170. In some implementations the housing 110 can also define one or more interfaces that provide mechanical support to one or more external components, allowing coupling the external components with the processing unit 100. For example, as described above in some implementations the sample preparation component 170 can be a separate standalone component. In such implementations, the housing 110 can define one or more interfaces configured to receive and couple the sample preparation component 170 to the processing unit 100. The housing 110 can be any suitable shape or configuration for accommodating, housing, enclosing, and/or supporting the one or more components of the processing unit 100. For example, in some implementations the housing 110 be a cubic, cuboid, polyhedral and/or any other suitable geometrical shape. In some implementations the housing 110 can be a shape selected to maximize the interior volume for storing sample specimen containers and accommodating the components of the processing unit 100, while minimizing the processing unit 100 footprint (e.g., the area and/or volume occupied by the processing unit 100). In some implementations, the housing 110 can include multiple portions that can be coupled and/or assembled together to form one or more chambers and/or compartments for receiving the components of the processing unit 100. That is, in some implementations, the housing 110 can be modular. Alternatively, in other implementations, the housing 110 can be made of a monolithic structure.

The housing 110 can include one or more openings, apertures, slots, and/or loading ports disposed on one or more external surfaces of the housing 110, sized and configured to receive and/or load sample specimen containers comprising biological samples into the processing unit 100. For example, in some implementations the housing 110 can include at least one round and/or circular loading port disposed on an external surface of the housing 110 and characterized by a diameter that is at least slightly larger than a maximum diameter of the sample specimen containers, such that the sample specimen containers can be introduced in the housing 110 according to an orientation parallel to the major axis of the sample specimen tube (e.g., vertically). The loading port can be disposed on a visible external surface of the processing unit 100 such that a user and/or technician can manually introduce sample specimen containers into the processing unit 100 via the loading port. In some implementations, the loading port can be any suitable shape, and size including triangular, square, rectangular, polyhedral or the like. In some implementations the housing 110 can include one or more loading ports disposed on external surfaces of the processing unit 100, such that the loading port(s) can be aligned and coupled with an equally sized port of an external component such as the sample preparation component 170. In that way, the loading port of the housing 110 can facilitate the automatic (e.g., without human intervention) transporting, loading, and/or transferring of sample specimen containers from the external component such as the sample preparation component 170 to the processing unit 100. In some implementations the one or more loading ports of the housing 110 can include a gate configured to transition between a closed configuration in which the gate obstructs the loading port of the housing 110, preventing the transfer of sample specimen containers, and an open configuration in which the gate unobstructs the loading port of the housing 110 and facilitates introducing and/or loading sample specimen containers into the processing unit 100. In some implementations the gate of the housing 110 can be electrically and/or operatively coupled to the control unit 160 such that the control unit 160 can activate and/or control the operation of the gate, as further described herein.

As described above, the housing 110 can define one or more interior volumes, enclosures, and/or compartments suitable for accommodating (e.g., housing, containing, supporting, etc.) the components of the sample processing unit 100. These enclosures and/or compartments can include one or more walls, panels, divisions, barriers and/or the like that enclose and/or secure one or more component of the processing unit 100 supporting the weight, at least partially, of the components housed within the enclosure and/or compartment. For example, in some implementations the housing 110 can include a transferring component enclosure configured to accommodate the transferring component 120, a storage compartment enclosure configured to accommodate the storage compartment 130, and a positioning component enclosure configured to accommodate the positioning component 140. The enclosures and/or compartments of the housing 110 can also include one or more access openings, apertures, slots, and/or ports disposed on one or more walls of the enclosures and configured to facilitate coupling two or more components of the processing unit 100 to transport and/or transfer specimen containers. For example, the transferring component enclosure can include a first access port, a second access port, and a third access port (also referred to as transferring ports A, B and C, respectively, as shown in FIG. 1). The storage compartment enclosure can be configured such that a transferring port A aligns with at least a portion of the sample preparation component 170. In that way sample specimen containers can be transported and/or transferred from the sample preparation component 170 into the sample transferring component 120 via the transferring port A. Moreover, the storage compartment enclosure can be further configured such that a transferring port B aligns with at least a portion of the storage compartment 130. In that way sample specimen containers can be transported and/or transferred from the transferring component 120 into the storage compartment 130 via the transferring port B. Similarly, the positioning component enclosure can be configured such that the transferring port C aligns with at least a portion of the positioning component 140. In that way a sample specimen container can be transported and/or transferred between the transferring component 120 and the positioning component 140 via the transferring port C. In some implementations, the one or more access ports of the housing 110 can include gates configured to transition between a closed configuration in which the gates obstructs the access ports preventing the transport and/or transfer of sample specimen containers between components of the processing unit 100, and an open configuration in in which the gate unobstructs the access ports and facilitates the transport and/or transfer of sample specimen containers to and from the components of the processing unit 100 for centrifugation and/or storage at a predetermined temperature. Moreover, in some implementations the gates of the housing 110 can be electrically and/or operatively coupled to the control unit 160 such that the control unit 160 can activate and/or control the operation of the gates, as further described herein.

The housing 110 can be made of any suitable material or materials having sufficient structural strength and rigidity, including, for example, metal, glass, ceramic, and/or polymers. In some implementations, the housing 110 can include any suitable structure and/or component configured to provide thermal insulation to one or more portions of the processing unit 100. For example, in some implementations the housing 110 can include one or more insulating panel(s) made of any suitable insulating material or insulating structure configured to enhance and/or improve the thermal insulating properties of one or more components of the processing unit 100 such as the transferring component 120, the storage compartment 130, the positioning component 140, and/or the centrifuge 150. In such implementations, the insulating panel(s) may function as a thermal barrier to heat transfer when the sample processing unit 100 contains and/or houses sample specimen containers with biological samples. The insulating panel(s) can incorporate any suitable material and/or structure configured to reduce heat transfer. For example, the insulating panel(s) may include materials that have inherently low heat transfer characteristics including polyurethanes, polyisocyanurates, polyesters, polystyrene, polyethylene, polypropylene, cellulose, fiberglass and others. In some implementations, the housing 110 can include multiple portions made of and/or shaped as a structure that itself provides thermal insulating properties. For example, in some implementations portions of the housing 110 can include portions shaped as an open cell foam, a closed cell foam or combination thereof. The foam provides a plurality of internal voids and/or volumes filled with low heat transfer coefficient air, which reduces the thermal conductivity of the components contained within the housing 110.

In some implementations the housing 110 can include an electrical interface. The electrical interface can be any suitable connector, adapter, interface, etc. that can be coupled to an external power source. The electrical interface can be configured to be electrically coupled and/or connected to and/or otherwise placed in electric communication with the external power source to provide a flow of electric power to one or more components of the processing unit 100 such as the transferring component 120, the storage compartment 130, the positioning component 140, the centrifuge 150 and/or the control unit 160. In this context, the terms "electrically coupled," "electrically connected," and "electric communication" are intended to refer to any suitable direct or indirect connection, coupling, and/or mode of conveyance that allows a flow of electric power or current from the external power source to the electrical interface suitable for powering, at least partially, components of the processing unit 100. The electrical interface may be adaptable to a variety of international voltage and/or current standards. Alternatively, and/or optionally, in some implementations the housing 110 can accommodate and/or house an internal power source such as energy storage devices (batteries), a solar panel, and/or the like, configured to provide electric power to the one or more components of the processing unit 100

The housing 110 can also include one or more sensor(s) configured to detect whether the sample preparation component 170 is coupled or not to the housing 110 of the processing unit 100. For example, in some implementations the housing 110 can include one or more proximity sensor(s) disposed at one or more locations within the housing 110 adjacent to, or near to a surface and/or wall in which the sample preparation component 170 is received when the sample preparation component 170 is mechanically coupled and/or attached to the processing unit 100. The proximity sensor(s) can be configured to detect when the sample preparation component 170 is mechanically coupled, attached and/or docked to the processing unit 100. The proximity sensor(s) can include, for example, one or more hall effect sensors, capacitive sensors, inductive sensors, optical sensors and/or the like. The sensor(s) can be operably coupled to the control unit 160 and/or to the controller of the sample preparation component 170. The sensor(s) can be programmed to send one or more signal to the control unit 160 (and/or the controller of the sample preparation component 170) when the sensors sense and or detect that the sample preparation component 170 becomes mechanically coupled, attached and/or docked to the housing 110 of the processing unit 100. The control unit 160 (and/or the controller of the sample preparation unit 170) can receive the one or more signal from the sensors; and execute one or more processing steps in response to the received signals. For example, in some embodiments, the control unit 160 (or the controller) can receive the one or more signal from the sensors, and in response to receiving the signals, send a set of instructions to one or more subcomponents of the sample preparation component 170 (e.g., a mixer, and/or a transferrer) to execute processing steps such as mixing a reagent, holding a sample specimen container for a period of time, or transfer a sample specimen container to the transferring component 120, as further described herein.

The transferring component 120 can be any suitable structure configured to receive sample specimen containers and transport, direct and/or transfer the received sample specimen containers to and from one or more components of the processing unit 100. For example, in some implementations the transferring component 120 can include a conveyor, a carousel, and/or a rack configured to receive sample specimen containers and transport the received sample specimen containers to the storage compartment 130 and/or the positioning component 140. In some implementations the transferring component 120 can include one or more chambers, partitions, and/or slots capable of receiving and/or accommodating sample specimen containers. In some implementations, a chamber of the transferring component 120 can be configured to receive multiple sample specimen containers. In other implementations, a chamber of the transferring component 120 can be configured to receive a single sample specimen container. In some implementations a chamber can be configured to receive sample specimen containers in a specific orientation and keep the received sample specimen containers in that specific orientation while they are transported and/or transferred to and/from the one or more component of the processing unit 100.

As described above, in some implementations the transferring component 120 can be configured to receive and/or accommodate one or more sample specimen containers introduced automatically (e.g., without direct human intervention) from the sample preparation component 170 and/or from an external component. In such implementations, the transferring component 120 (or a portion thereof) can be configured to be aligned with a loading port of the housing 110 as well as with a port of the sample preparation component 170 (or the external component). In that way, the sample preparation component 170 (or the external component) can be actuated to transport and/or transfer sample specimen containers from the sample preparation component 170 (or the external component), through the loading port, and into the transferring component 120.

In some implementations, the transport of sample specimen containers from the sample preparation component 170 to the transferring component 120 can be driven by gravity. In such implementations, the loading port can be disposed on an external surface of the housing 110 located at higher position than the transferring component 120 (e.g., at an elevated position with respect to the ground and/or the surface in which the housing 110 is disposed). A portion and/or component of the sample preparation component 170 (e.g., a transferrer, not shown in FIG. 1) can be configured to hold and/or secure, at least temporarily, a sample specimen container. When the sample preparation component 170 is coupled to the processing unit 100 such that the port of the sample preparation component 170 is aligned with the loading port of the housing 110, the portion and/or component of the sample preparation component 170 and/or from the transferring component 120 can be actuated to release the sample specimen container into the transferring component 120. The released sample specimen container can then be moved driven by gravity through the opening and into the transferring component 120, effectively transporting and/or transferring the sample specimen container from the sample preparation component 170 to the processing unit 100. Alternatively, in other implementations the transport of sample specimen containers from the sample preparation component 170 to the transferring component 120 can be driven by an actuator configured to exert one or more force on one or more sample specimen container to move and/or displace the sample specimen container. In such implementations, an actuator disposed on the sample preparation component 170 can be mechanically coupled with the sample specimen containers to be transported, and then receive signals from a control unit to cause movement of the sample specimen containers to move the sample specimen containers through a port of the sample preparation component 170 aligned with a loading port of the housing 110 and the transferring component 120. In some implementations, the port of the sample preparation component 170 and/or the loading port of the housing 110 can include at least a gate configured to transition between a closed configuration in which the gate obstructs the loading port of the housing 110 and the port of the sample preparation component 170, preventing the transfer of sample specimen containers, and an open configuration in in which the gate unobstructs the loading port of the housing 110 and the port of the sample preparation component 170 facilitating introducing and/or loading sample specimen containers into the transferring component 120 of the processing unit 100. In some implementations the gate can be electrically and/or operatively coupled to the control unit 160 such that the control unit 160 can activate and/or control the operation of the gate, as further described herein.

The transferring component 120 can include one or more motors, and/or actuators (not shown in FIG. 1) configured to move one or more chambers of the transferring component 120 to transport, direct, and/or transfer a received sample specimen container to the storage compartment 130 and/or the positioning component 140. For example, in some implementations the transferring component 120 can include a brushless electric motor, a brushed electric motor, a direct drive motor, a linear motor, a servo motor, an actuator, a voice-coil motor or the like. The motor can be configured to move a chamber of the transferring component 120 to a first position in which the chamber can receive a sample specimen container form the sample processing unit 170 via the transferring component port A described above. In some instances, the motor of the transferring component 120 can receive one or more signals and/or instructions from the control unit 160 to move a predetermined chamber of the transferring component 120 to the first position. In the first position, the predetermined chamber becomes oriented and/or aligned with the transferring component port A, which is sized and configured to receive a sample specimen container from the sample preparation component 170.

The motor of the transferring component 120 can be further configured to move the chamber containing a sample specimen container received as described above, between the first position and a second position. For example, in some instances, the motor of the transferring component 120 can receive signals and/or instructions from the control unit 160 to move the chamber containing the received sample specimen container from the first position in which the chamber is aligned with the transferring component port A, to the second position. In the second position, the chamber of the transferring component 120 can interact with, be temporarily coupled to, and/or engage the positioning component 140 or a portion thereof to transport and/or transfer the sample specimen container between the chamber of the transferring component 120 and the positioning component 140. For example, in some implementations the chamber of the transferring component 120 can be moved from the first position to the second position. In the second position, the chamber can become aligned with the transferring component port C described above with respect to the housing 110. The transferring component access port C can facilitate transporting and/or transferring sample specimen containers between the transferring component 120 and the positioning component 140. The transferring component port C can be communicated with and/or mechanically coupled to a receptacle, conduit, and or channel of the positioning component 140 which comprises an interior volume suitable for receiving and accommodating, at least temporarily, the sample specimen container. For example, in some implementations the receptacle, conduit, and or channel of the positioning component 140 can be configured to accommodate, at least temporarily, a swing bucket of the centrifuge 150. The chamber of the transferring component 120 can be moved to the second position and a gate can be actuated via the control unit 160 to open and/or unobstruct the transferring component port C so that a sample specimen container disposed on the chamber can be transported and/or transferred via the transferring component port C to the swing bucket, effectively loading the sample specimen container in the rotor 152 of the centrifuge 150 as further described herein. In other instances, the chamber of the transferring component 120 can be moved to the second position so that a sample specimen container disposed on the receptacle of the positioning component 140 can be transported and/or transferred back to the chamber of the transferring component 120 via the transferring component port C after the sample specimen container has been centrifuged in the centrifuge 150. In some implementations, the sample specimen container can be disposed on a swing bucket of the centrifuge 150, which can then be temporarily disposed in the receptacle, conduit, and or channel of the positioning component 140, as further described herein. In some implementations the transferring component access port C can be coupled to a gate configured to transition between a closed configuration in which the gate obstructs the transferring component access port C, preventing the transfer of sample specimen containers, and an open configuration in which the gate unobstructs the transferring component access port C facilitating loading and/or unloading sample specimen containers between the transferring component 120 and the centrifuge 150. In some implementations that gate can be electrically and/or operatively coupled to the control unit 160 such that the control unit 160 can activate and/or control the operation of the gate, as further described herein.

The motor of the transferring component 120 can be further configured to move a chamber of the transferring component 120 to a third position. In the third position, the chamber of the transferring component 120 can interact with, be temporarily coupled to, and/or engage at least a portion of the storage compartment 130 to transport and/or transfer a sample specimen container disposed on the chamber of the transferring component 120 to the storage compartment 130 for storage at a predetermined temperature. For example, in some implementations the chamber of the transferring component 120 can be moved to a third position. In the third position the chamber can become aligned with the transferring component port B, which is also aligned and/or communicated with at least a portion of the storage compartment 130. In some instances, a chamber of the transferring component 120 can be moved to the first position to receive a sample specimen container form the sample processing unit 170 via the transferring component port A described above. The chamber with the received sample specimen container can then be directly moved from the first position to the third position such that the transferring component 120 can be coupled to the storage compartment 130 for transferring and/or directing the received sample specimen container to the storage compartment 130 for storage via the transferring component port B. Moreover, in some instances the location of the transferring component access port A of the processing unit 100 and the transferring component access port B can be aligned such that actuating simultaneously the gate of the transferring component access port A and the gate of the transferring component access port B (e.g., via the control unit 160) can facilitate transferring sample specimen containers directly into the storage compartment 130. In other instances, a chamber of the transferring component 120 can be moved to the second position to receive a sample specimen container from the sample positioning component 140 after the sample specimen container has been centrifuged. The chamber of the transferring component 120 containing the centrifuged sample specimen container can then be moved to the third position such that the transferring component 120 can be coupled to the storage compartment 130 for transferring and/or directing the centrifuged sample specimen container to the storage compartment 130 for storage. In some implementations, the transferring component ports A, B and C can include a gate configured to transition between a closed configuration in which the gate obstructs the transferring component ports preventing the transfer of sample specimen containers, and an open configuration in in which the gate unobstructs the transferring component ports facilitating introducing and/or loading sample specimen containers into the positioning component 140 and/or the storage compartment 130. In some implementations that gate can be electrically and/or operatively coupled to the control unit 160 such that the control unit 160 can activate and/or control the operation of the gate, as further described herein.

The storage compartment 130 can be any suitable structure configured to store sample specimen containers, such as, for example, specimen containers containing biological samples including capillary blood samples. In some implementations the storage compartment 130 can simply include a tank and/or other receptacle disposed inside the housing 110 and configured to define an interior volume suitable for storing multiple sample specimen containers. In some implementations the storage compartment 130 can be configured to be removably coupleable to a sample processing unit 100. In such implementations, the storage compartment 130 can include a temperature sensor and/or a communication module configured to measure and transmit data associated with the storage compartment 130 such as a temperature, a geographical location, and/or a particular sample processing unit 100 to which the storage compartment 130 is coupled to, as further described herein. In some implementations the storage compartment 130 can include one or more components configured to protect the biological samples stored inside the storage compartment 130 against external environment factors by ensuring controlled conditions such as constant temperature (or within a desired temperature range), e.g., below ambient temperature, to prevent the degradation of the biological material stored inside each one of the sample container specimens. In some implementations the storage compartment 130 can include an active cooling mechanism (not shown in FIG. 1) that facilitates maintaining a controlled temperature of the sample specimen containers disposed in the sample storage compartment 130. For example, in some implementations the storage compartment 130 can include a compressor and a work fluid (e.g., a refrigerant) operating in a refrigeration cycle that removes heat from the sample specimen containers stored in the sample storage compartment 130. In such implementations, the compressor can include a power source configured to provide energy to drive the compressor and other components of the refrigeration cycle, enabling uninterrupted cooling of the sample specimen containers disposed in the sample storage compartment 130. The power source can be any suitable energy source and/or energy storage device. In some implementations, the power source can include one or more replaceable and/or rechargeable batteries. In some implementations the processing unit 100 can include one or more ports that enable connection between an external power source (e.g., a AC or DC power supply) and the compressor of the storage compartment 130. The external power source can be used to directly power the compressor of the storage compartment 130 and/or recharge an onboard power source (e.g., a battery) of the storage compartment 130. In some implementations the storage compartment 130 can include thermoelectric device configured to remove heat from the sample specimen containers stored in the sample storage compartment 130. The thermoelectric device can be powered by a on board power source and/or by an external power source, as described above. In some implementations, the storage compartment 130 can include a passive cooling mechanism that ensures that the sample specimen containers disposed inside the storage compartment 130 remain at a controlled temperature or range of temperatures when the storage compartment 130 is not coupled to the processing unit 100 and/or in the event of a power outage affecting the processing unit 100. For example, in some implementations the storage compartment 130 can include a passive cooling mechanism comprising one or more external and/or outer shell(s), one or more internal and/or inner shell(s), and a phase change material (not shown in FIG. 1), as further described herein. The external shell can be configured to (1) define an interior volume and/or space inside the housing 110 and (2) provide a thermal barrier that limits and/or significantly reduces heat transfer from the environment surrounding the processing unit 100 to the interior space and/or volume defined by the outer shell(s) (e.g., the outer shell(s) can be configured to be thermally insulated). In some implementations, the outer shell(s) of the storage compartment 130 can be made of one or more layers of thermally insulating materials (e.g., materials having a low thermal conductivity coefficient) stacked together to form and/or provide a continuous barrier that reduces and/or minimizes the rate of heat transfer between one or more exterior surfaces of the outer shell(s) (e.g., the surfaces disposed outside the shell(s) and exposed to air and/or other environments surrounding the processing unit 100 and the housing 110) and one or more areas disposed inside the outer shell(s).

The storage compartment 130 can also include an inner shell disposed within the interior volume of the outer shell. The inner shell can occupy a fraction of the interior space defined by the outer shell(s) and define a region located inside the outer shell(s) and outside the inner shell (i.e., between the inner shell and outer shell(s)) in which one or more phase change material (PCM) packs can be accommodated. The inner shell can be made of a thermally conductive material and can be define a storage volume for storing biological samples. The PCM packs can be disposed in the region generated between the outer shell(s) and the inner shell, surrounding the inner shell. The storage volume can accommodate sample specimen containers and keep them refrigerated by removing heat from the sample specimen containers, through the thermally conductive inner shell, and to the PCM packs surrounding the inner shell.

In some embodiments, the outer shell(s) can be and/or form a three-dimensional shape having a length and any suitable cross-sectional area including for example, circular, oval, square, rectangular, and/or other polygonal cross-sectional area. As described above, in some implementations the outer shell(s) can be formed of any suitable insulating material or insulating structure configured to enhance and/or improve the thermal insulating properties of the storage compartment 130. That is, the outer shell(s) can be configured to reduce the rate of heat transfer between the one or more surfaces of the storage compartment 130 that are in contact with, or adjacent the exterior surfaces of the housing 110. In other words, the outer shell(s) may be configured to function as a thermal barrier to heat transfer between the interior and the exterior of the storage compartment 130.

In some implementations the outer shell can incorporate any suitable material and/or structure configured to reduce heat transfer. For example, the outer shell(s) may include one or more materials that have inherently low heat transfer characteristics including polyurethanes, polyisocyanurates, polyesters, polystyrene, polyethylene, polypropylene, cellulose, fiberglass and others. In some implementations the outer shell(s) can include materials having low heat transfer characteristics as well as suitable mechanical properties, such as being easy to form and/or machine. For example, in some implementations the outer shell(s) can include thermosetting or thermoplastics polymers and polymer formulations. The outer shell(s) can also be formed or shaped into a structure that itself provides additional thermal insulating properties. For example, in some implementations the outer shell(s) can be shaped as an open cell foam, a closed cell foam or combination thereof. The foam provides a plurality of internal voids and/or volumes filled with low heat transfer coefficient air, which reduces the thermal conductivity of the outer shell(s). Moreover, in some instances, the internal voids and/or volumes can be filed with a gas such as nitrogen, carbon dioxide, and/or argon among others. Alternatively, in some implementations, the internal voids can be evacuated (e.g., under vacuum) to enhance the thermal insulating properties of the outer shell(s). In some implementations, the internal voids and/or volumes can be arranged and/or organized forming any suitable configuration. For example, the voids can specific geometries such as spherical, cylindrical, hexagonal, cubical, ellipsoidal, and the like.

The inner shell of the storage compartment 130 can be any suitable structure configured to be disposed inside the outer shell(s) to receive and store sample specimen containers at a predetermined temperature until the biological samples are transferred to a laboratory for analysis. For example, in some implementations the processing unit 100 can be configured to store the biological samples at a temperature between about 2° C. and about 8° C. until the biological samples are transferred to a laboratory for analysis. In other implementations the processing unit 100 can be configured to store the biological samples at room temperature (e.g., 25° C.). The inner shell can be any suitable shape, form and/or configuration. In some embodiments, inner shell can be a three-dimensional shape having a length and any suitable cross-sectional area including for example, circular, oval, square, rectangular, and/or other polygonal cross-sectional area. The inner shell can include an open end, a closed end, and one or more lateral walls, which collectively define a storage volume and/or storage chamber suitable for storing the sample specimen containers. The opening of the inner shell can be configured to be mechanically coupled and/or aligned with the storage compartment 130 access port such that sample specimen containers can be transported and/or transferred into the storage volume and/or storage chamber of the inner shell. The opening of the inner shell can have any suitable shape characterized by dimensions large enough for receiving and/or facilitating transfer of sample specimen containers in and out of the storage component 130. For example, in some embodiments the opening of the inner shell can be any suitable geometrical shape characterized by a dimension (e.g., a diameter and/or a length) of no more than about 100 cm, no more than about 50 cm, no more than about 40 cm, no more than about 30 cm, no more than about 25 cm, no more than about 20 cm, no more than about 15 cm, no more than about 10 cm, no more than about 5 cm, inclusive of all values and ranges therebetween. In some embodiments, the opening of inner shell can be characterized by a dimension (e.g., a diameter, length, and/or side) of at least about 3 cm, at least about 5 cm, at least about 8 cm, at least about 10 cm, at least about 15 cm, at least about 25 cm, at least about 30 cm, at least about 40 cm, at least about 50 cm, inclusive of all values and ranges therebetween. Combinations of the above referenced ranges for the dimension of the opening of the inner shell are also possible (e.g., a diameter, length, and/or side) of at least about 5 cm to no more than about 40 cm, at least about 20 cm to no more than about 50 cm).

The storage volume and/or storage chamber of the inner shell can be sized and configured to store any suitable number of sample specimen containers. For example, in some implementations, the storage chamber of the inner shell can be sized and configured to store no more than about 1500 samples, no more than about 1000 samples, no more than about 800 samples, no more than about 500 samples, no more than about 250 samples, no more than about 100 samples, no more than about 80 samples, no more than about 60 samples, no more than about 50 samples, no more than about 40 samples, no more than about 30 samples, no more than about 20 samples, no more than about 10 samples, inclusive of all values and ranges therebetween. In some implementations, the storage chamber of the inner shell can be sized and configured to store at least about 10 samples, at least about 15 samples, at least about 20 samples, at least about 25 samples, at least about 30 samples, at least about 35 samples, at least about 40 samples, at least about 50 samples, at least about 60 samples, at least about 80 samples, at least about 120 samples, at least about 160 samples, at least about 200 samples, at least about 400 samples, at least about 800 samples, at least about 1600 samples, inclusive of all values and ranges therebetween.

In some implementations the inner shell can include multiple portions that can be coupled and/or assembled together to form the opening and the storage volume. That is, in some implementations, the inner shell can be modular. Alternatively, in other implementations, the inner shell can be made of a monolithic structure. The inner shell can be made of any suitable materials having sufficient structural strength and rigidity and high thermal conductivity including, metals, metal alloys, and/or selective metal oxides. For example, in some implementations, the inner shell can be made of silver, copper, aluminum, nickel, tungsten, zinc, silicon carbide, beryllium oxide, aluminum-bronze alloys, Nickel-chromium alloys and the like.

As described above, the outer shell(s) can house and/or contain include one or more PCM packs (not shown in FIG. 1) configured to absorb thermal energy at phase transition to provide cooling to the inner shell and the sample specimen containers disposed on the storage volume. The PCM packs can include a PCM configured to absorb heat by transitioning from a solid phase to a liquid phase. In other implementations, the PCM can be configured to absorb heat by transitioning from a first crystalline structure to a second crystalline structure different from the first crystalline structure. In some implementations, the PCM can be an organic (carbon-containing material) including chemical compounds derived from petroleum, plants, and/or animals. In some embodiments, the PCM can be an inorganic salt hydrate derived from mineral deposits. In some implementations the PCM can be an alkane hydrocarbon or a paraffin including, but not limited to n-decane, n-dodecane, n-tetradecane, n-hexadecane, n-octadecane, n-eicosane, n-docosane or a combination thereof. In some embodiments, the PCM can be a commercially available product such as BioPCM, PlusICE, RT-2HC, RT-3HC, RT-4, RT-5 and others.

In some implementations, the storage compartment 130 can optionally include one or more temperature sensors (not shown) configured to measure a temperature of at least a portion of the storage chamber defined by the inner shell. The temperature sensor can be any suitable sensor disposed on the storage compartment 130 and configured to sense and quantify a temperature representative of the temperature of the storage chamber of the inner shell. For example, the temperature sensor can include a thermocouple, a resistance temperature detector (RTD), a thermistor, one or more non-contact sensor(s) such as IR sensor(s), and/or a semiconductor based integrated circuit, disposed on the storage compartment 130 such that the temperature sensor can be in close proximity and thermal communication with the storage chamber of the inner shell. In some implementations, the temperature sensor can include one or more thermocouples including for example an E-type, J-Type, K-type, N-type, T-type, and/or R/S-type thermocouple. The thermocouple(s) can be disposed on the inner shell near to or adjacent to a closed end and/or a lateral wall of the inner shell, such that the thermocouple(s) can be in thermal communication with at least a portion of a storage chamber. Moreover, the thermocouple(s) can be disposed on a location of the inner shell such that the thermocouples are both in thermal communication with at least a portion of a storage chamber of the inner shell, and thermally insulated from any exterior surface of the processing unit 100 exposed to the exterior environment (e.g., air at ambient conditions). In that way, the temperature sensor can be used to sense and record a temperature representative of the temperature of the storage chamber of the inner shell. It is worth noticing that the thermocouple(s) can be considered to be in thermal communication with one or more components, for example a storage chamber of the inner shell, when a probe of the thermocouple (e.g., a joint of two metals with dissimilar thermal behavior such as in a K-type thermocouple) is in direct physical contact with at least a portion of the component that the thermocouple is configured to sense and measure temperature. In some instances, the thermocouple(s) can be considered to be in thermal communication with the storage chamber of the inner shell when the probe of the thermocouple is disposed physically in contact with a least a portion of the inner shell defining the storage chamber (e.g., a lateral wall or an close end of the inner shell that defines the boundaries of the storage chamber).

In some implementations, the temperature sensor can be integrated and/or disposed with other components of the storage compartment 130. For example, in some implementations the temperature sensor can be integrated with a cartridge, cassette and/or container that houses one or more components (not shown) including a communications module, a power source, and/or a control unit, as further described herein. In those implementations, the temperature sensor can include a thermocouple with a temperature probe (e.g., a Nickel Chromium-Nickel Aluminum K-type thermocouple probe) directly forming a/or constituting a portion of the cartridge. The cartridge can facilitate installing, inspecting, replacing, and/or removing one or more components of the storage compartment 130 such as a communications module. The cartridge can be disposed on the inner shell such that a portion of the cartridge which comprises the probe of the thermocouple can be in thermal communication with at least a portion of the storage chamber of the inner shell.

In some implementations, the temperature sensor can be electrically and/or mechanically coupled to a communications module (not shown). The temperature sensor can be configured to sense and/or measure a temperature and send and/or transmit a signal (for example a voltage) representative of the temperature sensed and/or measured by the probe of the temperature sensor to the communication module, which in turn can transmit that signal to one or more external devices and/or to the control unit 160. In some implementations, the temperature sensor can be configured to send signals representative of the temperature sensed and/or measured to the communication module for a predetermined period of time. In some implementations, the temperature sensor can be configured to send signals representative of the temperature sensed and/or measured to the communication module at constant time intervals, for example every thirty second, every minute, every two minutes, every ten minutes and so on. In some implementations, the temperature sensor can be configured to send signals representative of the temperature sensed and/or measured to the communication module every time the sensed temperature changes. In some implementations, the temperature sensor can be configured to send signals representative of the temperature sensed and/or measured to the communication module every time the temperature sensor receives a request from the communication module.

In some implementations, when the temperature sensor and/or the communications module are not operatively coupled to the control unit 160 (e.g., when the temperature sensor and/or the communications module are not disposed within the communication range of the control unit 160), the temperature sensor can be configured to store the temperatures sensed and/or measured at periodic time intervals in a memory (e.g., an on-board memory disposed on the cartridge cassette and/or container described above). The stored temperatures can then be sent and/or transmitted to the control unit 160 when the temperature sensor and/or the communications module becomes operatively coupled to the control unit 160 (e.g., when the communication with the control unit 160 becomes restored). Alternatively, and/or additionally, the stored temperatures can also be sent and/or transmitted to an external device such as a separate reading station, a mobile device, or a compute unit.

The positioning component 140 can be any suitable device configured to facilitate automatic loading and unloading of biological samples contained in sample specimen containers on/from the centrifuge 150. The positioning component 140 can be configured to engage and/or interact with a rotor 152 of the centrifuge 150 automatically (e.g., without the need for physical intervention of a technician) to move and/or direct an interior volume, cavity, and/or compartment of the rotor 152 to a predetermined position such that a sample specimen container can be received in the interior volume, cavity, and/or compartment of the rotor 152 for centrifugation, and/or removed from the interior volume, cavity, and/or compartment of the rotor 152 after the sample specimen container has been centrifuged. In some instances, the positioning component 140 can engage and/or interact with the rotor 152 and the transferring component 120 automatically (without human intervention) to transport and/or transfer a sample specimen container from the transferring component 120 to the interior volume, cavity, and/or compartment of the rotor 152 for centrifugation. In other instances, the sample positioning component 140 can engage and/or interact with the rotor 152 and the transferring component 120 automatically after the centrifuge 150 has completed a centrifugation cycle (e.g., a predetermined set of centrifugation steps and/or conditions used to separate components of a biological sample), to position the interior volume, cavity and/or compartment of the rotor 152 in alignment with the positioning component 120 to transfer a sample specimen container containing the centrifuged biological sample, from the interior volume, cavity, and/or compartment of the rotor 152 to the transferring component 120 and then to the storage compartment 130.

As described above, the positioning component 140 overcomes the limitations of the prior art by allowing the accurate and reproducible movement of the rotor 152 of the centrifuge 150 to a predetermined position for loading/unloading of sample specimen containers, without the need for motors capable of operating at low torque output (and thus unable to operate at high torque outputs required to separate components via centrifugation) and/or motors coupled to expensive high resolution VFDs.

In some implementations, the positioning component 140 can include a magnetic device (not shown in FIG. 1) configured to interact and/or engage with a component and/or a portion of the rotor 152 to direct and/or move the rotor 152 of the centrifuge 150 to a predetermined position for loading/unloading of sample specimen containers. For example, in some implementations the positioning component 140 can include a magnetic device and a motor and/or an actuator coupled to the magnetic device. The positioning component 140 can be configured to assume a first configuration in which the motor and/or actuator moves the magnetic device to a first position in which the magnetic device is located at a first distance and/or height from the rotor 150 such that a magnetic field of the magnetic component cannot interact with the rotor 150. The positioning component 140 can be transitioned from the first configuration to a second configuration. In the second configuration the motor and/or actuator moves the magnetic device from the first position to a second position. In the second position the magnetic device is located at a second distance and/or height. In some implementations the motor and/or actuator coupled to the magnetic device can be configured to receive one or more signals to move and/or transport the magnetic device between the first position and the second position. At the second position, the magnetic device is disposed at a relatively short distance and/or height from a component and/or a portion of the rotor 150 which contains and/or is made of a ferromagnetic material (e.g., a ferromagnetic component of the rotor 150). At the second position the magnetic device can interact with the ferromagnetic component of the rotor 150, inducing a magnetic flux on a surface of the rotor 150. The induced magnetic flux and the magnetic field resulting from the interaction of the ferromagnetic component and the magnetic device can cause movement of the rotor 150 such that the ferromagnetic component and/or a predetermined portion of the rotor 150 becomes aligned with the magnetic device for loading/unloading of sample specimen containers. For example, in some implementations the magnetic device can include an axially magnetized magnet configured to interact and/or engage a ferromagnetic component of the rotor 152 such as a swing bucket. In such implementations, the axially magnetized magnet of the positioning component 140 can be mechanically coupled with a motor and/or an actuator to control and/or change the relative distance of the axially magnetized magnet and the ferromagnetic component of the rotor 152. In that way, by changing the distance between the axially magnetized magnet of the positioning component 140 and the ferromagnetic component of the rotor 152, a magnetic field of the axially magnetized magnet can induce magnetic flux over the surface of the ferromagnetic portion of the rotor 152, causing the rotor 152 to be engaged and moved (e.g., driven by the magnetic force) under the influence of a toroidal magnetic field generated, effectively positioning the rotor 152 at a predetermined position for loading and/unloading of sample specimen containers, as further described herein. Alternatively or additionally, in some implementations, the positioning component 140 can include a first magnet configured to interact and/or engage a second magnet included in the rotor 152. In such implementations, the first magnet of the positioning component 140 can be a radially magnetized magnet mechanically coupled to a first motor and/or actuator, and the second magnet of the rotor 152 can be a cylindrical axially magnetized magnet mechanically coupled to a second motor and/or actuator different from the first motor and/or actuator. In use, the distance and/or relative position of the first magnet with respect to the second magnet can be changed via the first and the second actuator so that the rotor 152 can be engaged and moved under the influence of a resulting toroidal magnetic field generated from the interaction of the first magnet and the second magnet, positioning the rotor 152 at a predetermined position for loading and/unloading of sample specimen containers.

The centrifuge 150 can be any suitable device configured to apply a centrifugal force to separate the contents of a biological sample contained in a sample specimen container. As shown in FIG. 1, the centrifuge 150 can include a rotor 152 and a motor 154. The rotor 152 can be any suitable rotor that includes an interior volume, cavity, and/or compartment configured to receive and hold in place a sample specimen container during centrifugation. For example, in some implementations the rotor 152 can be a horizontal rotor including at least one swing bucket (not shown in FIG. 1) configured to receive and hold in place a sample specimen container during centrifugation. In some implementations, the rotor 152 can include a single swing bucket (e.g., the centrifuge only includes one swing bucket), with the swing bucket including at least a portion made of a ferromagnetic material, and a counterweight disposed and configured to balance the weight distribution of the rotor 152. In such implementations, the centrifuge 150 is selected to have only one single swing bucket to reduce the overall size and/or footprint of the centrifuge 150 and the processing unit 100, such that the processing unit 100 can be operated in a retail environment. Additionally, the use of a single bucket centrifuge facilitates the tracing of the sample processing time, including, for example, the time required to adequately mix an additive and/or reagent, or the time require to allow a sample to clot. In some implementations, the rotor 152 can include two swing buckets (e.g., a first swing bucket and a second swing bucket) configured to receive and hold sample specimen containers during centrifugation (e.g., the first swing bucket can be configured to receive and hold a first sample specimen container, and the second swing bucket can be configured to receive and hold a second and/or an additional sample specimen container). In some implementations, the first swing bucket can include at least a portion made of a ferromagnetic material, and the second swing bucket can be made of, or include a portion made of a diamagnetic or a non-magnetic material. The first and the second swing buckets can be disposed on the rotor 152 to balance the weight distribution of the rotor 152. For example, the first and the second swing bucket can be disposed on opposite sides of the rotor 152 with respect to the center of the rotor 152 (e.g., the point on the rotor 152 that intersects the axis of rotation of the centrifuge), at a predetermined distance from the center of the rotor 152. In that way, when the first and the second swing bucket hold sample specimen containers during centrifugation, the weight of the first swing bucket is balanced by the weight of the second swing bucket (e.g., each swing bucket acts as a counterweight to the other swing bucket). In some implementations, the rotor 152 can include multiple swing buckets (e.g., any suitable number, such as two or more) disposed along the rotor 152 of the centrifuge 150. The swing buckets can be disposed symmetrically with respect to the center of the rotor 152 and at opposite sides from the center of the rotor 152 such that swing buckets disposed on a first side of the rotor 152 can act as counterweights to the swing buckets disposed on a second side of the rotor 152 (e.g., the opposite side with respect to the center of the rotor 152).

For example, in some implementations the rotor 152 can include 3 swing buckets, including a first and a second swing bucket that can be disposed on a first side of the rotor 152; the first side of the rotor 152 being defined as a portion of the rotor 152 between the center of the rotor 152 and a first end of the rotor 152. A third swing bucket and a counterweight can be disposed on a second side of the rotor 152 opposite to the first side of the rotor 152 (e.g., the second side of the rotor 152 being defined as a portion of the rotor 152 between the center of the rotor 152 and the second end of the rotor 152 opposite to the first end of the rotor 152). The three swing buckets and the counterweight can be disposed symmetrically with respect to the center of the rotor 152 such that swing buckets disposed on the first side of the rotor 152 can act as counterweights to the swing buckets and the counterweight disposed on the second side of the rotor 152. In other implementations, the rotor 152 can include 8 swing buckets. A first group and/or plurality of swing buckets (e.g., swing buckets 1, 2, 3 and 4) can be disposed on a first side of the rotor 152. The first side of the rotor 152 being defined as a portion of the rotor 152 between the center of the rotor 152 and a first end of the rotor 152. A second group and/or plurality of swing buckets (e.g., swing buckets 5, 6, 7, and 8) can be disposed on a second side of the rotor 152 opposite to the first side of the rotor 152 (e.g., the second side of the rotor 152 being defined as a portion of the rotor 152 between the center of the rotor 152 and the second end of the rotor 152 opposite to the first end of the rotor 152). The first group of swing buckets and the second group of swing buckets can be disposed symmetrically with respect to the center of the rotor 152 such that swing buckets disposed on the first side of the rotor 152 can act as counterweights to the swing buckets disposed on the second side of the rotor 152. In some implementations, the rotor 152 can include multiple swing buckets and multiple counterweights. The swing buckets and counterweights can be disposed symmetrically on the rotor 152 such that the swing buckets and counterweights balance the weight distribution of the rotor 152.

Alternatively, in some implementations the centrifuge 150 can include multiple rotors 152, with each rotor 152 including one or more swing bucket(s) configured to receive and hold in place a sample specimen container during centrifugation. For example, in some implementations the centrifuge 150 can include a first rotor 152a and a second rotor 152b (not shown in FIG. 1). The first rotor 152a can include two swing buckets disposed symmetrically with respect to the center of the rotor 152a and at opposite sides from the center of the rotor 152a such that the swing bucket disposed on a first side of the rotor 152a can act as counterweight to the swing bucket disposed on a second side of the rotor 152a (e.g., the opposite side with respect to the center of the rotor 152a). Similarly, the second rotor 152b can include two swing buckets disposed symmetrically with respect to the center of the rotor 152b and at opposite sides from the center of the rotor 152b such that the swing bucket disposed on a first side of the rotor 152b can act as counterweight to the swing bucket disposed on a second side of the rotor 152b (e.g., the opposite side with respect to the center of the rotor 152a). In some implementations, the first rotor 152a and the second rotor 152b can be disposed on the centrifuge aligned such that the first rotor 152a and the second rotor 152b have the same axis of rotation (e.g., the center of the rotor 152a and the center of the rotor 152b intersect the axis of rotation). In some implementations, the first rotor 152a and the second rotor 152b can be disposed on the same horizontal plane forming a four-point star structure (e.g., the center of the rotor 152a and the center of the rotor 152b are the same point, with the rotor 152a extending towards a North and a South direction, and the rotor 152b extending towards a West and an East direction. In other implementations, the first rotor 152a and the second rotor 152b can be disposed on different horizontal planes, with the center of the rotor 152a and the center of the rotor 152b intersecting the axis of rotation of the centrifuge (e.g., the first rotor 152a being disposed above or below the second rotor 152b, aligned with respect to their center of rotation). In some implementations, the centrifuge 150 can include multiple rotors 152. Each rotor 152 can include a plurality of swing buckets (e.g., 1, 2, 3, 4, 8, or n) and/or counterweights. The plurality of swing buckets and counterweights can be disposed symmetrically with respect to the center of each rotor 152 such that swing buckets and/or counterweights disposed on a first side of each rotor 152 can act as counterweights to the swing buckets and/or counterweights disposed on the second side of each rotor 152.

The swing buckets accommodate the sample specimen containers in the centrifuge 150 and facilitate disposing the sample specimen containers in different orientations throughout the centrifugation process. That is, the swing buckets can be rotated with respect to the rotor 152 to facilitate orienting the sample specimen containers as needed during the centrifugation process. For example, in some implementations a swing bucket can receive a sample specimen container in a first orientation. In the first orientation the sample specimen container is disposed in the swing buckets such that the major axis of the sample specimen container is parallel to the axis of centrifugation (e.g., the sample specimen container is received in a vertical orientation assuming that the axis of centrifugation is normal to the ground). The swing bucket can transition the sample specimen container from the first orientation to a second orientation during centrifugation. In some implementations the swing bucket can transition the sample specimen container to a second orientation in which the sample specimen container is disposed at an angle $\alpha$ with respect to the axis of centrifugation. In some implementations the angle $\alpha$ can assume any suitable value between 0 and 90° ($0<\alpha<90°$) with the angle $\alpha$ being defined with respect to the axis of centrifugation. For example, in some implementations the swing bucket can transition the sample specimen container from the first orientation to a second orientation, with the second orientation being defined such that the sample specimen container is disposed at an angle of about 45° with respect to the axis of centrifugation. In some implementations the swing bucket can orient the sample specimen container at an angle of about 90° with respect to the axis of centrifugation (e.g., the bucket is oriented horizontally during centrifugation, assuming that the axis of centrifugation is normal with respect to the ground). In other implementations, the rotor 152 can be any suitable type of rotor including a fixed angle rotor, a vertical rotor, a near vertical rotor, and/or a specialty rotor.

The motor 154 of the centrifuge 150 can be any suitable motor configured to cause rotation of the rotor 152. For example, in some embodiments the motor 154 can be a brushed DC motor, a brushed permanent magnet DC motor, a brushless DC motor, a permanent magnet DC brush motor, a synchronous AC motor, an induction AC motor, a servo motor or the like. In some implementations the motor 154 can include an AC motor comprising a low-cost variable frequency drive (VFD) configured to control the operation of the motor 154 by controlling the ration of frequency and voltage supplied to the motor 154. The VFD facilitates adjusting the speed and torque output of the motor, enabling the operation of the centrifuge under different conditions and/or profiles required to separate components of the biological sample disposed on the centrifuge. In some implementations, the motor 154 can be operationally coupled the control unit 160 to control and/or modify its operation, as further described herein.

In some implementations the motor 154 can be configured to exhibit a maximum nominal power of no more than about 500 watts, no more than about 450 watts, no more than about 400 watts, no more than about 350 watts, no more than about 300 watts, no more than about 250 watts, no more than about 200 watts, no more than about 150 watts, no more than about 100 watts, no more than about 50 watts, inclusive of all values and ranges therebetween. In some implementations the motor 154 can be configured to exhibit a maximum nominal power of at least about 40 watts, at least about 80 watts, at least about 120 watts, at least about 160 watts, at least about 200 watts, at least about 300 watts, at least about 400 watts, at least about 500 watts, inclusive of all values and ranges therebetween.

In some implementations the motor 154 can be configured to exhibit a nominal frequency of no more than about 1000 Hz, no more than about 800 Hz, no more than about 600 Hz, no more than about 400 Hz, no more than about 3500 Hz, no more than about 300 Hz, no more than about 250 Hz, no more than about 100 Hz, inclusive of all values and ranges therebetween. In some implementations, the motor 154 can be configured to exhibit a nominal frequency of at least about 80 Hz, of at least about 120 Hz, of at least about 160 Hz, of at least about 200 Hz, of at least about 240 Hz, of at least about 280 Hz, of at least about 300 Hz, of at least about 400 Hz, of at least about 600 Hz, of at least about 800 Hz, of at least about 1000 Hz, inclusive of all values and ranges therebetween.

The control unit 160 can be configured to activate and/or control the operation of one or more components of the processing unit 100, e.g., by receiving electrical signal(s) from and/or sending electrical signal(s) to other components of the processing unit 100. The control unit 160 can include a memory 162, a processor 164, and an input/output (I/O) device 166.

The memory 162 can be, for example, a random-access memory (RAM), a memory buffer, a hard drive, a database, an erasable programmable read-only memory (EPROM), an electrically erasable read-only memory (EEPROM), a read-only memory (ROM), and/or so forth. In some implementations, the memory 162 can store instructions that cause processor 164 to execute modules, processes, and/or functions associated with operating one or more components of the processing unit 100. Such instructions can be designed to integrate specialized functions into the control unit 160.

The processor 164 of control unit 160 can be any suitable processing device configured to run and/or execute functions associated the processing unit 100. For example, processor 164 can be configured to process and/or analyze sensor data received from one or more sensor(s) disposed in the processing unit 100 to measure and/or detect, for example, a temperature of the storage compartment 230, the positions of various components of the processing unit 100 such as the rotor 152, and/or any of the gates coupled to the ports that communicate the transferring component 120 with the storage compartment 130, the positioning component 140, and/or the sample preparation unit 170, as described above. The processor 164 can receive and analyze the sensor data and generate one or more signals for activating the one or more gates to facilitate transporting and/or transferring of sample specimen containers between components of the processing unit 100, and/or adjust one or more parameters of the motor 154 (e.g., rotational speed, torque, time of centrifugation, etc.). In some implementations the processor 164 can be a general-purpose processor, a Field Programmable Gate Array (FPGA), an Application Specific Integrated Circuit (ASIC), a Digital Signal Processor (DSP), and/or the like.

The input/output (I/O) device 166 include one or more components for receiving information and/or sending information to other components of processing unit 100. In some implementations, the I/O device 166 can optionally include or be operatively coupled to a display, audio device, or other output device for presenting information to a technician and/or user. In some implementations, the I/O device 166 can include a communication interface that can enable communication between control unit 160 and one or more sensor(s), the centrifuge 150, the positioning component 140, the transferring component 120 etc. In some implementations, the I/O device 166 can include a network interface that can enable communication between control unit 160 and one or more external devices, including, for example, the sample preparation component 170, an external user device (e.g., a mobile phone, a tablet, a laptop) and/or other compute device (e.g., a local or remote compute, a server, etc.). The network interface can be configured to provide a wired connection with the external device, e.g., via a port or firewall interface, can be configured to communicate with the external device via a wireless network (e.g., Wi-Fi, Bluetooth®, low powered Bluetooth®, Zigbee and the like.

In some implementations, the control unit 160 can be or form part of an integrated circuit. For example, the control unit 160 can be an integrated chip that integrates components including a memory (e.g., memory 162), a central processing unit (e.g., processor 164), and one or more ports and/or interfaces for communication (e.g., I/O device 166).

The control unit 160 can generate electrical signals to control one or more components of the processing unit 100, e.g., based on instructions stored in the memory 162. These electrical signals may be communicated between the control unit 160 and other components of the processing unit 100 via a communication interface of the I/O device 166. In some implementations, the control unit 160 can generate one or more signals to drive the centrifuge 150. For example, the control unit 160 can generate one or more signals which can be used to provide electric power to the centrifuge 150 so that the motor 154 can move the rotor 152 and centrifuge a sample specimen container according to a predetermined centrifugation profile (e.g., centrifuging at one or more specific rotational speeds for specific periods of time, and/or under specific conditions). In some implementations, the control unit 160 can control the adjust one or more electrical signal to control the operation of the centrifuge (e.g., cause rotation of the rotor at a lower torque and/or other conditions) based on signals or data received from sensors disposed in the processing unit 100. For example, one or more sensor(s) can be configured to measure a position, voltage, current, impedance, movement, acceleration, or other data associated with the components of the processing unit 100, and the control unit 160 can control the operation of those components e.g., by sending electrical signals based on the data received from the sensors.

The sample preparation component 170 can be any suitable device configured to receive biological samples contained in sample specimen containers, conduct one or more sample processing steps, and/or transfer sample specimen containers to the transferring component 120 for sample centrifugation and/or storage at a predetermined temperature. As described above, the sample preparation component 170 can be configured to receive and accommodate sample specimen containers. The received sample specimen containers can then be directed to one or more subcomponents of the sample preparation component 170 configured to, for example, (1) scan and/or read a label of the sample specimen containers to identify information associated with the biological sample contained in each sample specimen container, (2) conduct any suitable procedure to adequately mix reagents and/or additives included in the sample specimen container such as, for example, shaking, rocking, inverting, stirring, agitating, vortexing, sonicating, vibrating or the like, (3) hold the sample specimen containers for a predetermined period of time, and/or (4) transfer the sample specimen container to the transferring component 120 such that the sample transferring component 120 can direct the sample specimen container to the storage compartment 130 and/or to the centrifuge 150. In some instances, the sample preparation component 170 can receive sample specimen containers when the sample preparation component 170 is not mechanically coupled, attached and/or docked to the processing unit 100. In such instances, the sample preparation component 170 can receive the sample specimen containers, conduct one or more sample processing steps such as those described above, and then transfer the sample specimen containers to the transferring component 120. The transferring component 120 can then direct the sample specimen containers to the centrifuge 150 for centrifugation and/or to the storage compartment 130 for storage at a predetermined temperature when the sample preparation component 170 is and/or becomes coupled to the processing unit 100. In other instances, the sample preparation component 170 can receive sample specimen containers when the sample preparation component 170 is mechanically coupled, attached and/or docked to the processing unit 100. In such instances, the sample preparation component 170 can receive the sample specimen containers, conduct the one or more sample processing steps, and then transfer the sample specimen containers to the transferring component 120 immediately after completing the processing steps, as further described herein.

The sample preparation component 170 can include one or more subcomponents (not shown in FIG. 1) such as a scanner, a mixer, and/or a transferer. As described above, in some implementations the sample preparation component 170 can be configured to be a separate standalone device, and/or unit that can be operatively and/or mechanically coupleable to the processing unit 100. In such implementations, the sample preparation component 170 can also include an enclosure, casing, and/or housing, and an optional controller (not shown in FIG. 1) which allows operating the sample component 170 either independently from the processing unit 100 and/or operatively coupled to the processing unit 100, as further described herein.

The enclosure, casing, and/or housing of the sample preparation component 170 can be any suitable structure configured to provide a protective enclosure that defines one or more interior volumes, compartments, and/or chambers suitable for accommodating (e.g., housing, containing, supporting, etc.) the one or more subcomponents of the sample preparation component 170. The enclosure, casing, and/or housing of the sample preparation component 170 can also define one or more interfaces that provide mechanical support and allow coupling the sample preparation component 170 to other devices such as the processing unit 100. The enclosure, casing, and/or housing of the sample preparation component 170 can be any suitable shape or configuration. For example, in some implementations the enclosure, casing, and/or housing of the sample preparation component 170 can be a cubic, cuboid, polyhedral and/or any other suitable geometrical shape. In some implementations, the shape of the enclosure, casing, and/or housing is configured such that the sample preparation component 170 can be manually carried by a user and/or a technician. For example, in some implementations the enclosure, casing, and/or housing of the sample preparation component 170 can be a rectangular shape that includes one or more handles that can be used by a technician and/or user to lift, carry, and/or transport the sample preparation component 170 (when the sample preparation component 170 is not coupled to the processing unit 100) to and/from a site where sample specimen containers are being collected and/or processed (e.g., a retail ample collection point). In some implementations the enclosure, casing, and/or housing of the sample preparation component 170 can be a shape selected to maximize the interior volume for storing sample specimen containers and accommodating the one or more subcomponents, while minimizing the footprint (e.g., the area and/or volume occupied by the processing unit 100) of the sample preparation component 170. In some implementations, the enclosure, casing, and/or housing of the sample preparation component 170 can include multiple portions that can be coupled and/or assembled together to form one or more chambers and/or compartments for receiving the one or more subcomponents of the sample preparation component 170. That is, in some implementations, the enclosure, casing, and/or housing of the sample preparation component 170 can be modular. Alternatively, in other implementations, the enclosure, casing, and/or housing of the sample preparation component 170 can be made of a monolithic structure.

The sample preparation component 170 can include at least one inlet opening, aperture, slot, and/or port (not shown) disposed on one or more external surfaces of the enclosure, casing, and/or housing of the sample preparation component 170. The inlet port can be sized and configured to receive and/or load sample specimen containers comprising biological samples into the sample preparation unit 170. In some implementations, the inlet port can be disposed on a surface of the enclosure, casing, and/or housing of the sample preparation unit 170 such the sample specimen containers are received and/or introduced in the enclosure, casing, and/or housing according to a vertical upright orientation. In the vertical upright orientation, the sample specimen containers are received with their axial axis aligned perpendicular to the ground and/or surface in which the sample preparation component 170 and/or the processing unit 100 is disposed on, with the cap being disposed above the closed end of the tube (e.g., upright). Alternatively, in other embodiments the inlet port can be disposed on a surface of the enclosure, casing, and/or housing of the sample preparation unit 170 such the sample specimen containers are received and/or introduced in the enclosure, casing, and/or housing according to any suitable orientation (e.g., horizontally, diagonally, inverted, etc.). The sample preparation component 170 can be configured to receive sample specimen containers via the inlet port of the enclosure, casing, and/or housing when the sample preparation component 170 is not mechanically coupled, attached and/or docked to the processing unit 100. In other instances, the inlet port can receive the sample specimen containers in the vertical upright orientation when the sample preparation component 170 is mechanically coupled, attached and/or docked to the processing unit 100.

The sample preparation component 170 can also include at least one outlet port disposed on an external surface of the sample preparation component 170. The outlet port can be configured to be aligned and coupled with an equally sized port of the processing unit 200 such that when the sample preparation component 170 is coupled to the processing unit 100, sample specimen containers can be transferred and/or transported from the sample preparation component 170, through the outlet port and into the processing unit 100. In some implementations the outlet port can be aligned and/or overlapped with a port of the processing unit 100 such that sample specimen containers can be directed automatically (e.g., without human intervention) via the outlet port from the sample preparation component 170 and into the processing unit 100. In some implementations, the outlet port can be configured to facilitate directing the sample specimen containers from the sample preparation component 170 to the processing unit 100 in an inverted orientation in which the cap of the containers is being disposed below the closed end of the tube, as further described herein.

The sample preparation component 170 can include a scanner configured to scan a label and or identifier of the sample specimen container. The scanner can include any electronic device configured to scan and/or read a machine-readable code. For example, in some implementations the scanner can include a bar code reader with a scanning unit (not shown) and a communications unit (not shown). The identifier can be disposed along the sidewall of the sample specimen container. The identifier can contain information encoded therein related to the sample specimen container and/or the capillary blood sample contained therein. For example, in some implementations the information encoded can include a shape, color, material, and/or other characteristic of the sample specimen container, a volume of biological sample contained in the sample specimen container, or an amount of specific reagents and/or additives included in the sample specimen container. In other implementations, the information encoded in the identifier can be a "type of sample". In such implementations, each "type of sample" can be associated with a predetermined set of processing steps and/or instructions stored in the control unit 160 (or the controller of the sample preparation component 170) that a sample specimen container need to be subjected to by the sample preparation component 170 and/or other components of the processing unit 100. These predetermined set of processing steps and/or instructions can be executed by the control unit 160 (or the controller) on the sample specimen container once the scanner has read and/or identified the "type of sample" information encoded in the identifier. For example, in some implementations the "type of sample" can be associated with a number and/or set of instructions to (1) mix reagents and/or additives included in the sample specimen container by shaking, rocking, inverting, vortexing, agitating, stirring, sonicating, and/or vibrating the sample specimen container for a period of time and/or a number of times; (2) hold the sample specimen container stationary in a particular orientation for a predetermined amount of prior to centrifugation to allow the one or more physical and/or chemical transformations to be completed (e.g., a sample conditioning time, as further described herein), (3) centrifuge the sample specimen container (e.g., according to a specific centrifugation time, speed, centripetal force, rotational speed, etc.) and/or (4) store the sample specimen container under one or more sample storing conditions such as temperature, humidity, etc. Alternatively, in some implementations the information encoded in the identifier can directly include a predetermined set of processing steps and/or instructions, just as those described above (e.g., mixing, holding, centrifuging and/or storing the sample).

The communications unit can transmit the scanned label and/or identifier to the control unit 160 and/or to the controller of the sample preparation component 170, as further described herein. The scanner can also record a time that a sample specimen container is being held by the sample preparation component 170. In some implementations the scanner can be operably coupled and/or integrated with the control unit 160 of the processing unit 100. In such implementations, the control unit 160 can control the operation of the scanner to identify information of the label and/or identifier and implement a set of instructions to process the sample based on the information associated with the scanned label and/or identifier. As previously described, in some implementations the sample preparation component 170 can be an optional separate standalone device, and/or unit. In such implementations, the scanner can be a separate handheld computing device, such as a smartphone or some other handheld reader. The handheld computing device may include a camera that captures an image of the identifier, and software that can associate the captured information from the scanned sample specimen container with the stored information or a reference. Alternatively, in some implementations the scanner can be a subcomponent of the sample preparation component 170 that can be controlled by the controller of the sample preparation component 170, as further described herein.

The mixer of the sample preparation component 170 can be any suitable device configured to conduct one or more procedure(s) to adequately mix reagents and/or additives included in the sample specimen containers. In some embodiments, the mixer of the sample preparation component 170 can be configured to actuate a sample specimen container to mix the reagents and/or additives included in the sample specimen container. For example, in some implementations, the mixer can be configured to shake, rock, invert, vortex, agitate, stir, sonicate, and/or vibrate a sample specimen container to mix chemical additives and/or reagents with the biological sample included in the sample specimen container. In some instances, the mixer can be configured to invert a sample container and hold the sample specimen container in a predetermined orientation for a predetermined amount of time to ensure that the biological sample contained in the sample specimen container can undergo one or more desired chemical and/or physical changes. In some implementations, the mixer can include one or more parts configured to move the sample specimen containers to facilitate mixing of the chemical additives and/or reagents included with the biological sample. For example, in some implementations the mixer can include a holder configured to hold one or more sample specimen containers and an actuator mechanically coupled to the holder and configured to move the holder into different positions in order ensure adequate mixing of chemical reagents and/or additives with the biological sample contained in the sample specimen container.

The sample preparation component 170 can also include a transferrer configured to receive sample specimen containers which have been scanned and/or mixed as described above. The transferrer can receive one or more sample specimen containers from the mixer, temporarily store the received sample specimen containers, and/or transfer, direct, or transport the received sample specimen containers to the transferring component 120 of the processing unit 100 for centrifugation and/or storage at a predetermined temperature. In some implementations the transferrer can include a conveyor, a carousel, and/or a rack configured to receive sample specimen containers from the transferrer, store the received sample specimen containers for a period of time, and then transport the received sample specimen containers to the transferring component 120. In some embodiments, the transferrer can receive one or more signals from the control unit 160 and/or the controller of the sample preparation component 170, and in response to receiving the one or more signals, transfer one or more sample specimen containers to the transferring component 120 of the processing unit 100. The transferrer can be similar to and substantially the same as the transferring component 120, and thus features and aspects of the transferrer will not be further described herein.

As described above, in some implementations the sample preparation component 170 can be configured to be a separate standalone device, and/or unit that can be operatively and/or mechanically coupleable to a processing unit 100. In such implementations, the sample preparation component includes a controller. The controller can be configured to activate and/or control the operation of one or more subcomponents of the sample processing unit 170, e.g., by receiving electrical signal(s) from and/or sending electrical signal(s) to other subcomponents of the sample processing unit 170. The controller can be similar to and/or substantially the same as the control unit 160 described above. Consequently, the controller of the optional sample preparation component 170 will not be described in further detail herein.

In use, the processing unit 100 can be employed to receive biological samples (e.g., capillary blood samples) and conduct one or more processing steps such as mixing reagents, holding the samples for a period of time after mixing reagents and prior to centrifugation to allow physical and/or chemical transformations to take place, centrifuging the sample, and/or storing the samples under controlled conditions while monitoring of the environmental temperature until they are transferred to a laboratory for further analysis. For example, in some instances, a medical professional can collect a biological sample using a sample specimen container, and transfer and/or load the sample specimen container on the sample preparation component 170 of the processing unit 100.

In some instances, the sample specimen container can be received by the sample preparation component 170 when the sample preparation component 170 is mechanically coupled to the processing unit 100 (e.g., the sample preparation component 170 is docketed to the processing unit 100). The sample specimen container can be received via the inlet port and be transported to the scanner of the sample preparation component 170 such that the scanner can be used to scan and/or read the identifier of the sample specimen container (e.g., by rotating the sample specimen container to read an identifier disposed on the side wall of the sample specimen container). The communications unit can then transmit the information encoded in the identifier to the control unit 160 (e.g., a "type of sample," and/or a set of instructions for processing the sample specimen container). The control unit 160 can be configured to receive, store and/or execute the instructions and/or information transmitted by the communications unit. For example, the control unit 160 can send signals to the sample preparation component 170 to direct and/or move the sample specimen container from the scanner to the mixer of the sample preparation component 170. The sample specimen container can be placed in the mixer of the sample preparation component 170 for conducting one or more sample mixing step(s) encoded in the identifier of the sample specimen container (e.g., shaking, rocking, inverting, vortexing, agitating, stirring, sonicating, and/or vibrating the sample specimen container for a period of time or a number of times). The control unit 160 can also send signals to the sample processing unit 170 to place the sample specimen container in the transferrer of the sample preparation component 170 after completing the mixing step(s), such that the transferrer can immediately direct and/or move the sample specimen container to the transferring component 120.

Alternatively, in some implementations the sample preparation component 170 can be configured such that the sample specimen container can be received (e.g., from a medical professional, via the inlet port) directly in the mixer. The scanner of the sample preparation component 170 can be disposed adjacent to and/or in the vicinity of the mixer such that the scanner can scan the identifier of the sample specimen container (e.g., by rotating or otherwise orientating the sample specimen container to read the identifier disposed on the side wall of the sample specimen container) while the sample specimen container is kept on the mixer. The communications unit can then transmit the information encoded in the identifier to the control unit 160 (e.g., a "type of sample," and/or a set of instructions for processing the sample specimen container). The control unit 160 controller can be configured to receive, store and/or execute the instructions and/or information transmitted by the communications unit. For example, the controller can send signals to the mixer for conducting one or more sample mixing step(s) encoded in the identifier of the sample specimen container (e.g., shaking, rocking, inverting, vortexing, agitating, stirring, sonicating, and/or vibrating the sample specimen container for a period of time or a number of times). The control unit 160 can also send signals to place the sample specimen container in the transferrer of the sample preparation component 170 after completing the mixing step(s), such that the transferrer can immediately direct and/or move the sample specimen container to the transferring component 120.

In other instances, the sample specimen container can be received by the sample preparation component 170 when the sample preparation component 170 is not mechanically coupled to the processing unit 100. For example, when the processing unit 100 is kept on a stationary location (e.g., inside a car, an office space, a centralized location, or the like), and the sample preparation component 170 is decoupled from the processing unit 100 and taken by a medical professional to collected multiple samples (e.g., for example at a retail collection environment, a residence of a patient, etc.). In such instances, the sample specimen container can be received in a port of the sample preparation component 170 and then be dispose adjacent to the scanner of the sample preparation component 170 to scan and/or read the identifier of the sample specimen container (e.g., by rotating the sample specimen container to read an identifier disposed on the side wall of the sample specimen container). The communications unit of the sample preparation component 170 can then transmit the information encoded in the identifier to the controller of the sample preparation component 170. The controller can be configured to receive, store, identify, implement and/or execute the instructions and/or information transmitted by the communications unit at least until the sample preparation component 170 becomes coupled to the processing unit 100. For example, the controller can send signals to direct and/or move the sample specimen container from the scanner to the mixer of the sample preparation component 170. The sample specimen container can be placed in the mixer of the sample preparation component 170 for conducting the one or more sample mixing step(s) encoded in the identifier of the sample specimen container, as described above. The controller can also send signals to place the sample specimen container in the transferrer of the sample preparation component 170 after completing the mixing step(s); and keep the sample specimen container stationary in the transferrer until the sample preparation component 170 becomes mechanically coupled to the processing unit 100 (e.g., the sample preparation component 170 is docketed to the processing unit 100). Once, the sample preparation component 170 is docked on the processing unit 100, the transferrer can direct and/or move the sample specimen container to the transferring component 120. As described above, in some implementations the sample preparation component 170 can be configured such that the sample specimen container can be directly received in the mixer. In such implementations, the scanner of the sample preparation component 170 may be disposed adjacent to and/or in the vicinity of the mixer such that the scanner can scan the identifier of the sample specimen container while the sample specimen container remains in the mixer. The mixer can receive instructions from the controller for conducting one or more sample mixing step(s) encoded in the identifier. The controller can also send signals to place the sample specimen container in the transferrer of the sample preparation component 170 after completing the mixing step(s), such that the transferrer can immediately direct and/or move the sample specimen container to the transferring component 120.

The control unit 160 of the processing unit 100 (or the controller of the sample preparation component 170) can be configured to record one or more periods of time that the sample specimen container is kept in the different components of the processing unit 100 and/or while the sample is being processed (e.g., in the scanner, mixer, and/or transferrer of the sample preparation component 170, and in the transferring component 120). For example, the control unit 160 can record the amount of time that a sample specimen container is kept in the processing unit 100 since it is first received by the sample preparation component 170, until it is transferred by the transferring component 120 to the storage compartment 130 for storing. This amount of time can be referred to as the total sample processing time. The control unit 160 can also record the amount of time that a sample specimen container is kept in the sample preparation component 170 and in the transferring component 120 since the sample specimen container is mixed in the mixer until prior to its centrifugation in the centrifuge 150. This period of time can be referred to as the "sample conditioning time." The sample conditioning time includes the time that the sample specimen container is kept in the mixer starting after the mixing of reagents is completed, and any additional time that the sample specimen container needs to be kept stationary in the transferrer (e.g., when the sample preparation component 170 is not coupled to the processing unit 100) and/or in the transferring component 120 to ensure completion of any physical and/or chemical process between the blood sample and chemical reagents and/or additives included in the sample specimen container, prior to transporting and/or transferring the sample specimen container to the centrifuge 150 for centrifugation or the storage compartment 130 for storage.

During the sample conditioning time, the sample specimen container can be held and/or kept stationary in the transferrer and/or in the transferring component 120 following the mixing step(s) and prior to the sample's centrifugation in the centrifuge 150 and/or storage in the storage compartment 130. It is worth noting that the amount of time that a sample specimen container remains stationary in the transferrer of the sample preparation component 170 and/or the transferring component 120 (depending on whether the sample preparation component 170 is coupled or not to the processing unit 100 when first receiving the sample specimen container) can be associated with an amount of time needed to ensure completion of one or more physical and/or chemical transformations between the blood sample and any added reagents and/or additives disposed in the sample specimen container (e.g., sample conditioning). In some implementations, the sample conditioning can be carried out at room and/or ambient temperature. In some implementations, the sample conditioning can be carried out at one or more controlled temperature(s). For example, in some implementations, the sample conditioning can be carried out at temperatures below room temperature (e.g., under refrigeration conditions) such as but not limited to between about 4 and about 8° C. In other implementations the sample conditioning can be carried out at temperatures higher than room temperature (e.g., incubation temperatures) such as but not limited to about 37° C. and/or about 36 to about 38° C.

In some instances, the sample conditioning time can include an amount of time that the sample specimen container is kept stationary in the transferrer of the sample preparation component 170 and/or the transferring component 120 to ensure the blood sample interacts with a coagulant included in the sample specimen container, for clotting of the blood sample. In such instances, the sample conditioning time can also be referred to herein as the sample clotting time. In other instances, the sample conditioning time can include an amount of time that the sample specimen container is kept stationary in the transferrer of the sample preparation component 170 and/or the transferring component 120 to ensure the blood sample interacts with an anticoagulant and stabilizes the blood sample. In yet other instances, the sample conditioning time can include an amount of time that the sample specimen container is kept stationary in the transferrer of the sample preparation component 170 and/or the transferring component 120 to ensure the blood sample interacts with a preservative, preventing degradation of the blood sample.

In some implementations, the identifier of a sample specimen container can include the sample conditioning time required for that particular sample specimen container. In that way, the sample processing unit 170 can scan and/or read the identifier of the sample specimen container and send to the control unit 160 the information and/or instructions encoded in the identifier. The control unit 160, in response to receiving the information and/or instructions encoded in the identifier, can send signals to the transferrer of the sample processing unit 170 and/or the transferring component 120 to keep the sample specimen container stationary for a period of time required to complete and/or match the sample conditioning time encoded in the identifier. It is worth noting that keeping the sample specimen container stationary as described above is intended to signify and/or denote avoid subjecting the sample specimen container to mixing movements such as those described above with reference to the mixer (e.g., shaking, rocking, inverting, vortexing, agitating, stirring, sonicating, and/or vibrating the sample specimen container). In some instances, while the sample specimen container is being kept stationary (e.g., by not subjecting the sample specimen container to mixing movements), the sample specimen container can still be gently moved and/or transported when, for example, a new sample specimen container is loaded and/or received in the transferring component 120 and/or when other samples are transferred into and out of the centrifuge 150. Alternatively, in some implementations, the sample specimen container can be subjected to a predetermined movement (e.g., a rocking movement, an agitating movement, or the like) during the sample conditioning time to prevent settling of components included in the sample specimen container.

In some implementations, the identifier of a sample specimen container can include information that can be used to determine the sample conditioning time for that particular sample specimen container. The sample conditioning time can be determined based on the information encoded on the identifier of the sample specimen container. For example, information encoded in the identifier such as the total volume of blood contained in the sample specimen container, the amount of reagents (e.g., coagulant) added to the sample specimen container, and the instructions to mix the reagents added (e.g., the number of times and/or the period of time the sample specimen container is mixed, stirred, inverted, etc.) can be used to determine the period of time required for the blood in the sample specimen container to complete clotting.

FIGS. 2-16, 18A and 18B illustrate a sample processing unit 200 for the automatic processing of samples, including blood samples, according to an embodiment. The sample processing unit 200 (also referred to herein as "processing unit") can be similar in form and/or function to the sample processing unit 100 described above with reference to FIG. 1. For example, as described above with reference to the sample processing unit 100, the sample processing unit 200 can be configured to receive and process biological samples, including capillary blood samples collected from patients at a traditional collection site or at a retail collection site and contained and/or stored inside sample specimen containers. The processing unit 200 can be configured to process biological samples by conducting and/or executing one or more procedure and/or steps including scanning and reading labels disposed on the sample specimen containers to identify information associated with the biological samples contained therein, stirring, agitating, shaking, and/or inverting the sample specimen containers to facilitate adequate mixing of reagents and/or additives included with the biological samples, holding the sample specimen containers in a predetermined position and/or orientation for a set period of time to allow the biological samples to undergo a desired physical and/or chemical transformation, centrifuging the biological samples disposed within the sample specimen containers, and/or storing the biological samples at a predetermined temperature until the biological samples are transferred to a laboratory for analysis. The processing unit 200 includes a housing 210, a transferring component 220, a storage compartment 230, a positioning component 240, a centrifuge 250, and a control unit 260. The processing unit 200 is operatively and/or mechanically coupled to a separate standalone sample preparation component 270. In some implementations, portions and/or aspects of the processing unit 200 can be similar to and/or substantially the same as portions and/or aspects of the processing unit 100 described above with reference to FIG. 1. Accordingly, such similar portions and/or aspects may not be described in further detail herein.

Figure 2:
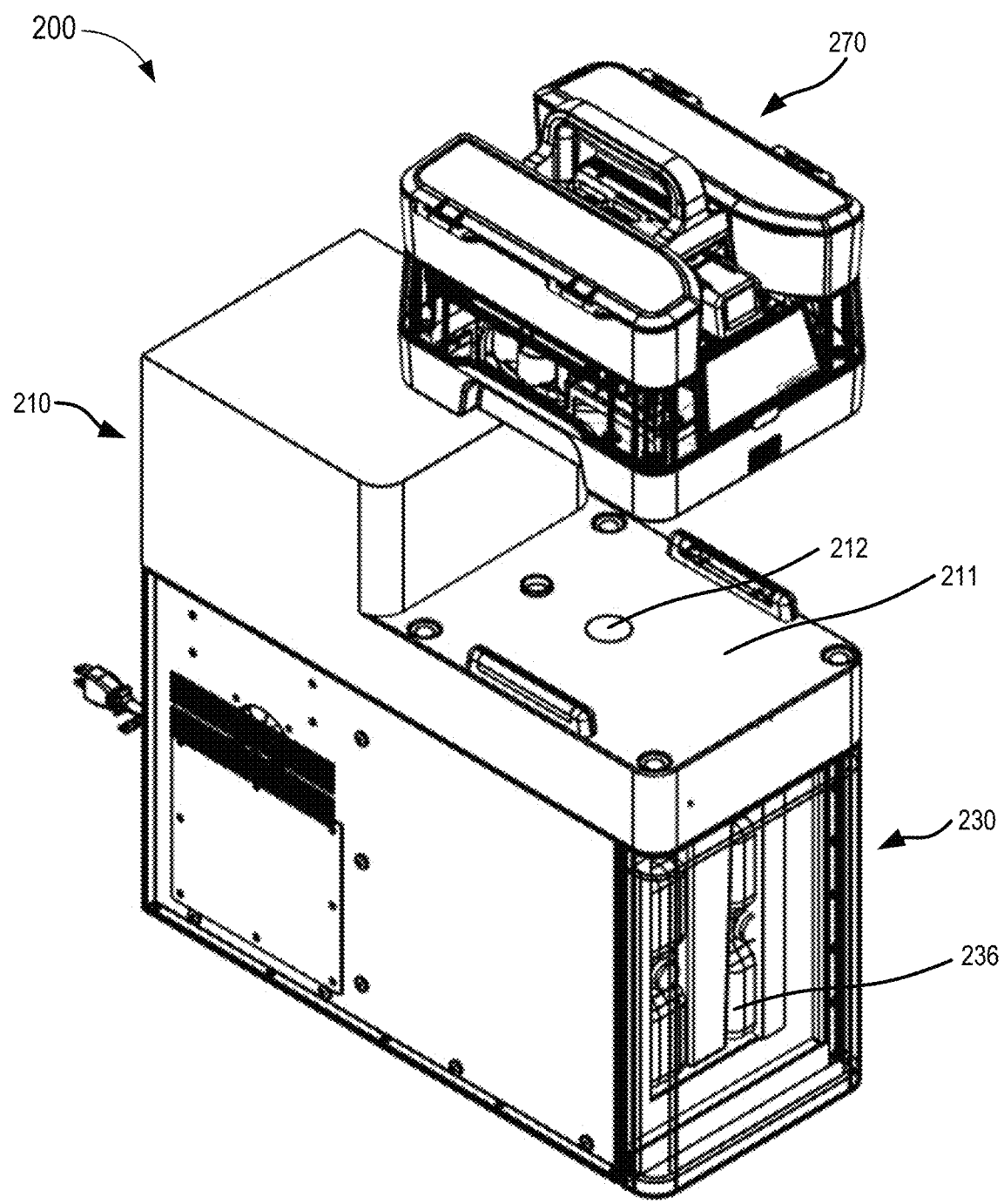
FIG. 2 is a perspective view of a sample processing unit for the automatic processing of biological samples, according to an embodiment.
Figure 3:
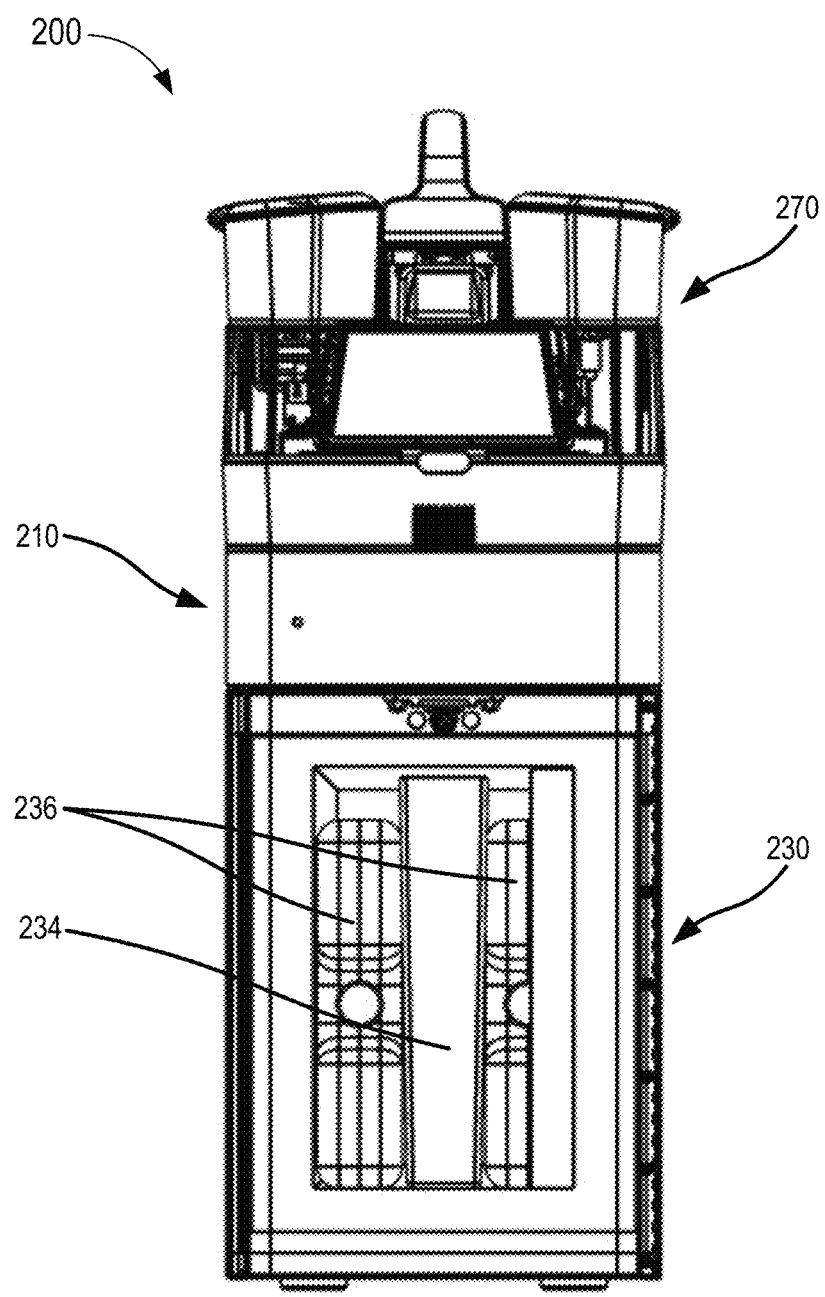
FIG. 3 is a front view of the sample processing unit of FIG. 2.

The housing 210 can be any suitable structure configured to provide a protective enclosure that defines one or more interior volumes, compartments, and/or chambers suitable for accommodating (e.g., housing, containing, supporting, etc.) the components of the sample processing unit 200. For example, in some implementations, the housing 210 can define one or more interior volume, compartment, and/or chambers suitable for accommodating the transferring component 220, the storage compartment 230, the positioning component 240, the centrifuge 250, and/or the control unit 260. The housing 210 also defines an interface wall, panel and/or enclosure 211 that provides mechanical support to the sample preparation component 270 and allows coupling the sample preparation component 270 with the processing unit 200, as shown in FIG. 2. The housing 210 can be any suitable shape or configuration for accommodating, housing, enclosing, and/or supporting the one or more components of the processing unit 200. For example, as shown in FIGS. 2 and 3 the housing 210 is a shape defined by a substantially rectangular cross-sectional area and a suitable height. In some implementations, the housing 210 can include multiple portions that can be coupled and/or assembled together to form one or more chambers and/or compartments for receiving the components of the processing unit 200. That is, in some implementations, the housing 210 can be modular. Alternatively, in other implementations, the housing 210 can be made of a monolithic structure.

Figure 5:
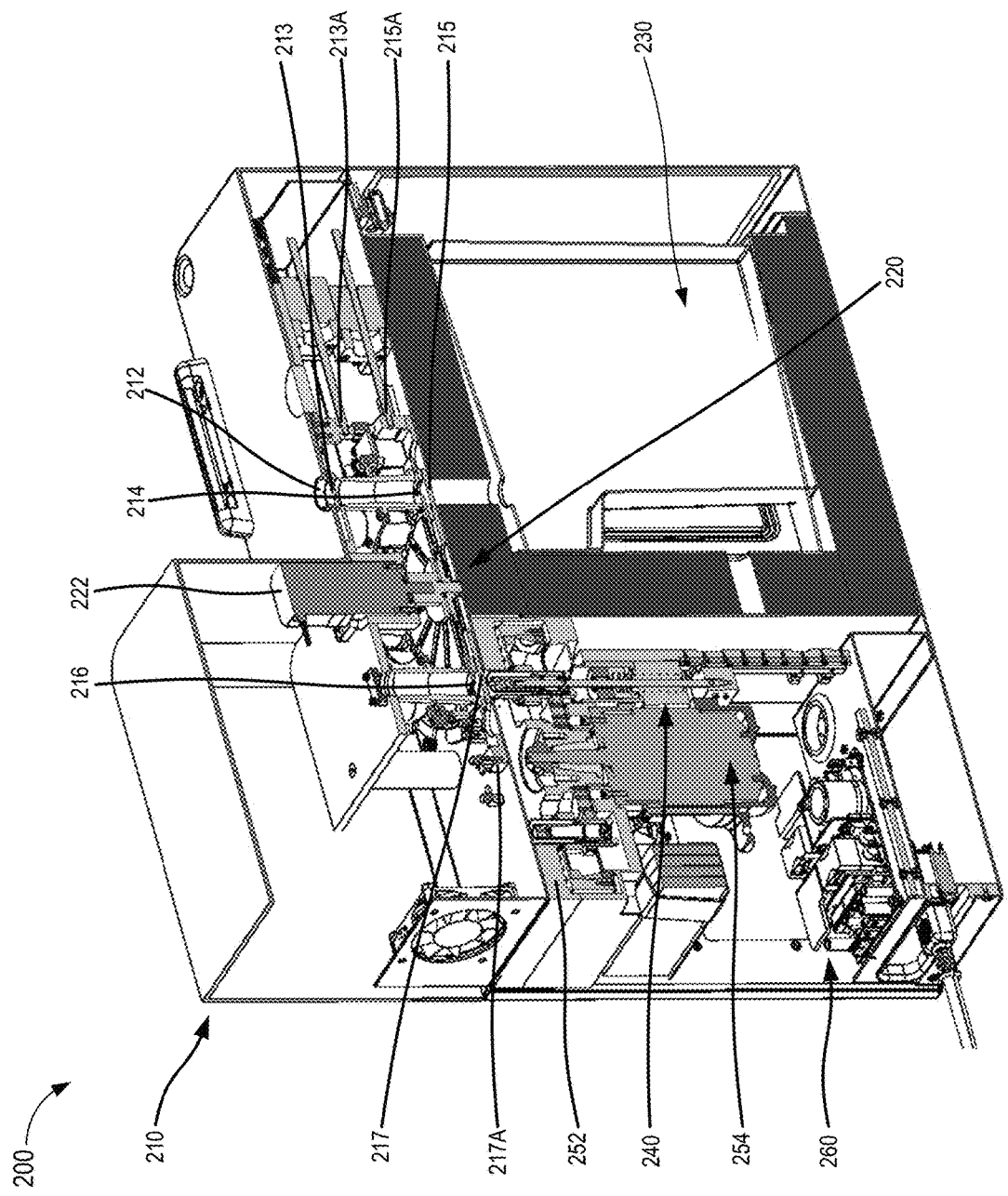
FIG. 5 is a cross-sectional rear perspective view of the sample processing unit of FIG. 2.

The housing 210 includes at least one opening, aperture, slot, and/or port 212 disposed on one or more external surfaces of the housing 210, sized and configured to receive and/or load sample specimen containers comprising biological samples into the processing unit 200. The port 212, which can also be referred to as "loading port 212" is disposed on an external surface of the housing 210, as shown in FIG. 2. The loading port 212 is characterized by a diameter that is slightly larger than a maximum diameter of the sample specimen containers, such that the sample specimen containers can be introduced in the housing 210 according to an orientation parallel to the axial axis of the sample specimen tube (e.g., the tubes are introduced vertically). The loading port 212 is disposed on an external surface of the processing unit 200 such that the loading port 212 can be aligned and/or coupled with an equally sized port of the sample preparation component 270. In that way, the loading port 212 of the housing 210 can facilitate the automatic (e.g., without human intervention) transferring and/or transporting of sample specimen containers from the sample preparation component 270 to the processing unit 200. The loading port 212 can include a gate 213, as shown in FIG. 5. The gate 213 can be coupled to a motor and/or actuator 213A configured to transition between a closed configuration in which the gate 213 obstructs the loading port 212, preventing the transfer of sample specimen containers, and an open configuration in which the gate 213 does not obstruct the loading port 212 and facilitates introducing and/or loading sample specimen containers into the processing unit 200. In some implementations the gate 213 of the housing 210 can be electrically and/or operatively coupled to the control unit 260 such that the control unit 260 can activate and/or control the operation of the gate, as further described herein.

Figure 6:
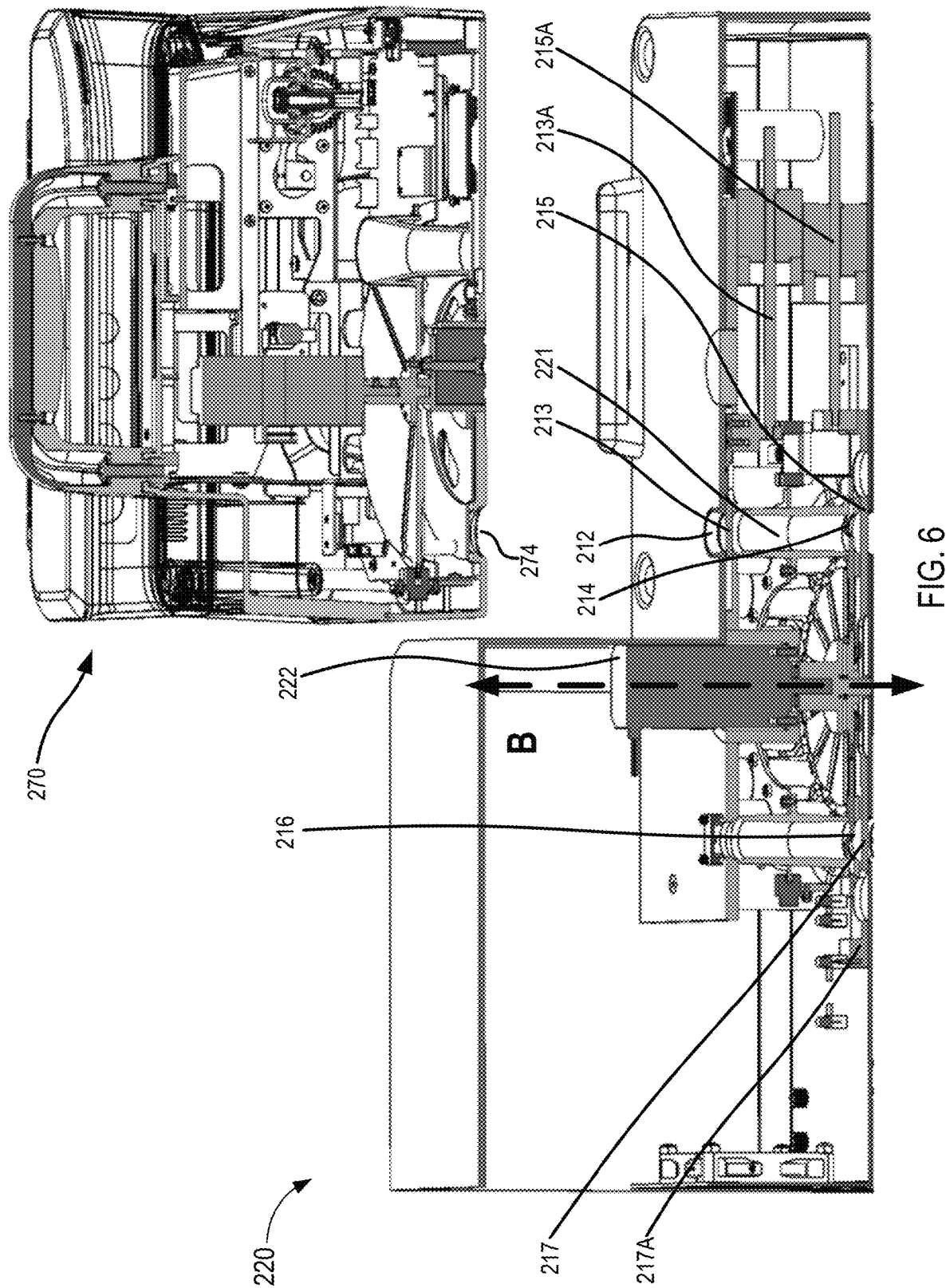
FIG. 6 is a cross sectional view of a transferring component of the sample processing unit of FIG. 2.
Figure 18A:
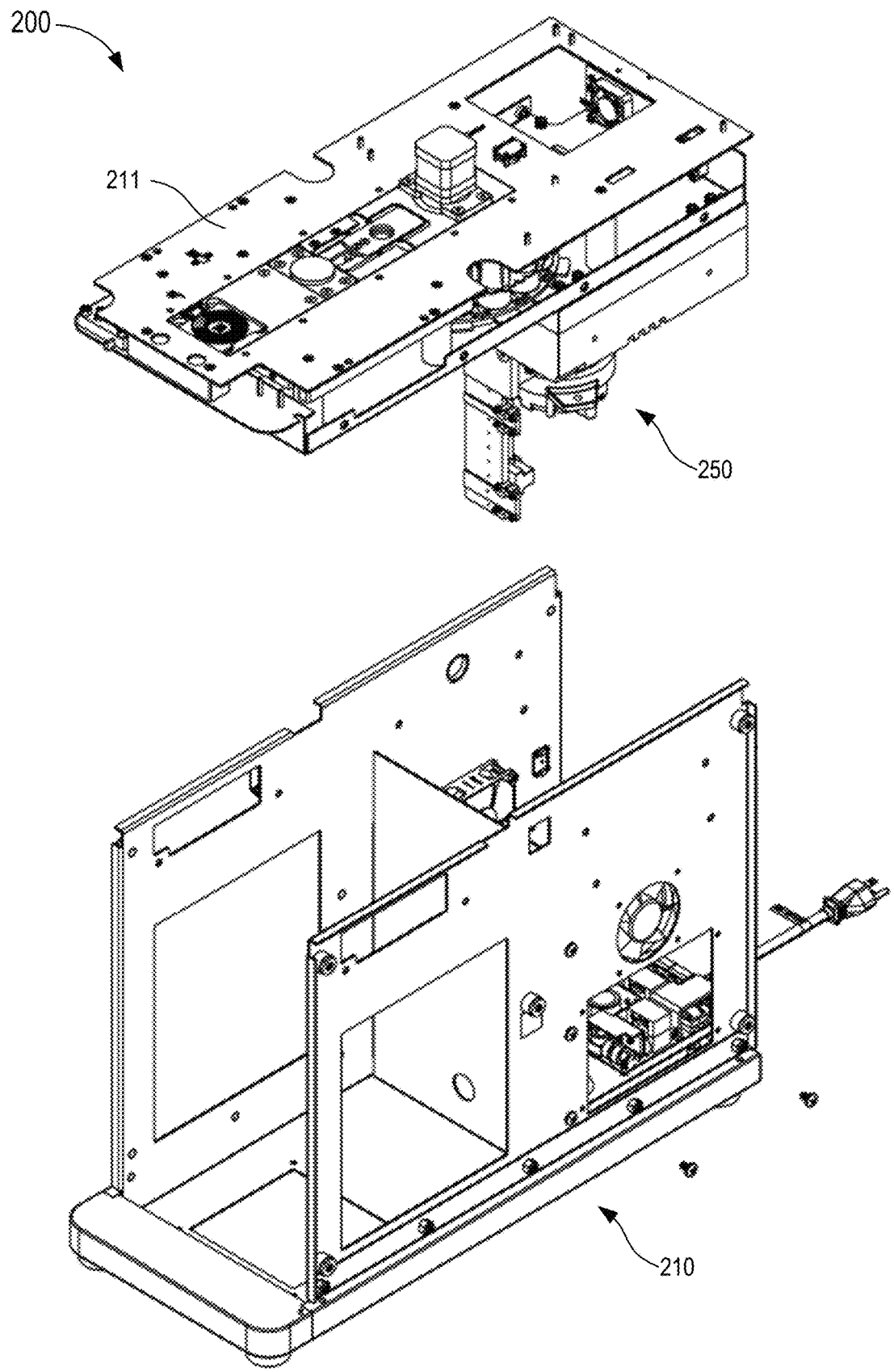
FIG. 18A is a partially exploded perspective view of the housing of the sample processing unit of FIG. 2, showing a panel used to receive and/or support a sample preparation component, according to an embodiment.
Figure 18B:
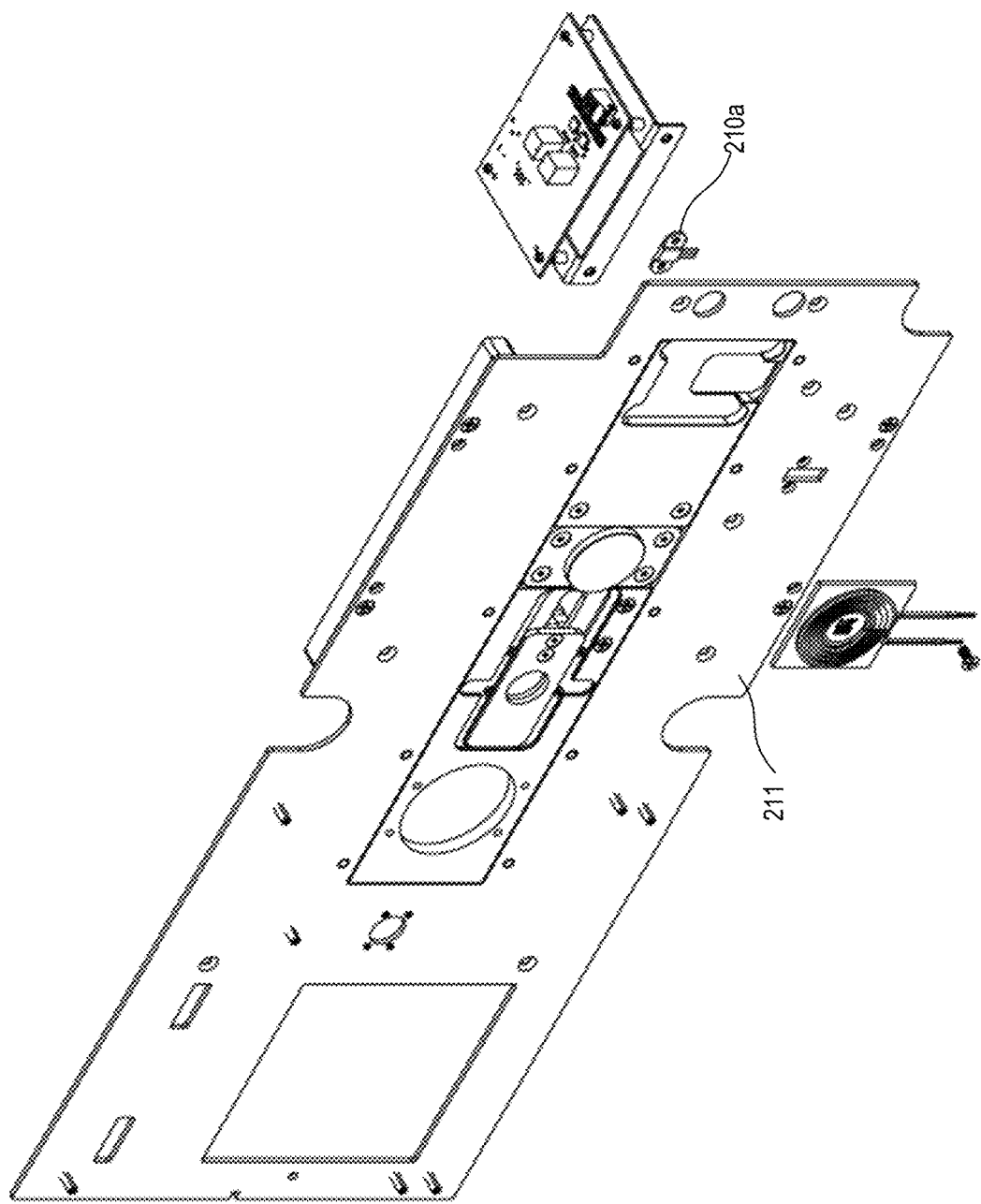
FIG. 18B is a perspective view of the panel shown in FIG. 18A, displaying the position of a proximity sensor used to detect when a sample preparation component is attached to the processing unit.

The enclosures defined by the housing 210 can include one or more openings and/or access ports disposed on one or more walls of the enclosures and configured to facilitate coupling multiple components of the processing unit 200 to transport and/or transfer specimen containers. For example, the housing 210 can include an enclosure configured to house the transferring component 230 and define access ports 214 and 216, shown in FIG. 5. Access port 214 can be configured to facilitate transporting and/or transferring sample specimen containers between the transferring component 220 and the storage compartment 230, while access port 216 can be configured to facilitate transporting and/or transferring sample specimen containers between the transferring component 220 and the positioning component 240, as shown in FIG. 5. The access ports 214 and 216 can be coupled to the gates 215 and 217, respectively. The gate 215 can be configured to transition between a closed configuration in which the gate 215 obstructs the access port 214 preventing the transport and/or transfer of sample specimen containers from the transferring component 220 to the storage compartment 230, and an open configuration in which the gate 215 does not obstruct the access port 214 and facilitates the transport and/or transfer of sample specimen containers from the transferring component 220 to the storage compartment 230. Similarly, the gate 217 can be configured to transition between a closed configuration in which the gate 217 obstructs the access port 216 preventing the transport and/or transfer of sample specimen containers between the transferring component 220 and the positioning component 240, and an open configuration in which the gate 217 does not obstruct the access port 216 and facilitates the transport and/or transfer of sample specimen containers between the transferring component 220 and the positioning component 240. The gates 215 and 217 can be coupled to a motor and/or actuator 215A and 217A, respectively, as shown in FIGS. 5 and 6. The motors and/or actuators 215A and 217A can be electrically and/or operatively coupled to the control unit 260 such that the control unit 260 can activate and/or control the operation of the gates The housing 210 can also include one or more sensor(s) 210a disposed at one or more locations within the housing 210 adjacent to, or near to a surface and/or wall in which the sample preparation component 270 is received when the sample preparation component 270 is mechanically coupled and/or attached to the processing unit 200. The sensor(s) 210a can be configured to detect the when the sample preparation component 270 is coupled or the processing unit 200. In some embodiments, the sensor(s) 210a can be disposed within an enclosure, casing, wall and/or partitioning of the housing 210 configured to receive the sample preparation component 270 when the sample preparation component 270 is mechanically coupled, attached and/or docked the processing unit 200. For example, FIG. 18A shows an interface panel 211 of the housing 210 that receives the sample preparation component 270 when the sample preparation component 270 is coupled to the processing unit 200. FIG. 18B shows the interface panel 211 can provide a location for supporting, coupling and or housing a sensor 210a. The sensor 210a can be a proximity sensors such as a hall effect sensor, a capacitive proximity sensor, an inductive proximity sensor, an optical proximity sensors and the like. The sensor 210a can be operably coupled to the control unit 260 (or the controller 287) such that the control unit 260 (or the controller 287) can receive one or more signals from the sensor 210a, with the signals being associated with the proximity and/or coupling of the sample preparation component 270 to housing 210 of the processing unit 200. Said in other words, the sensor 210a can send one or more signals to the control unit 260 (or the controller 287) when the sample preparation component 270 is mechanically coupled, attached and/or docked to the processing unit 200. The control unit 260 (and/or the controller 287) can receive the one or more signal from the sensor 210a; and execute processing steps in response to the received signals. For example, in some embodiments, the control unit 260 (or the controller 287) can receive the one or more signal from the sensor 210a, and in response to receiving the signals, send a set of instructions to one or more subcomponents of the sample preparation component 270 (e.g., a mixer, and/or a transferrer) to execute processing steps such as mixing a reagent, holding a sample specimen container for a period of time, or transfer a sample specimen container to the transferring component 220, as further described herein.

The transferring component 220 can be any suitable structure configured to receive sample specimen containers and transport, direct and/or transfer the received sample specimen containers to and from one or more components of the processing unit 200. As shown in FIGS. 5 and 6 the transferring component 220 can include a carousel 220 configured to receive sample specimen containers and transport them to the storage compartment 230 and/or the positioning component 240. The carrousel 220 can have one or more chambers, partitions, and/or slots capable of receiving and/or accommodating sample specimen containers. As shown in FIG. 6, the carousel 220 can include at least a chamber 221 configured to receive sample specimen containers via the loading port 212. The chamber 221 can be configured to receive sample specimen containers in a specific orientation and keep the received sample specimen containers in that specific orientation while they are transported and/or transferred to and/from the one or more component of the processing unit 200. For example, in some implementations the chamber 221 can be configured such that the sample specimen containers are received and kept in a vertical orientation, supported on their cap (e.g., the sample specimen containers are received inverted). That is, the sample specimen containers are received and kept with their axial axis aligned perpendicular to the ground and/or surface in which the processing unit 200 is disposed, and supported on their cap.

The carrousel 220 can be configured to receive and/or accommodate one or more sample specimen containers introduced automatically (e.g., without direct human intervention) from an external component such as the sample preparation component 270. In such implementations, the carrousel 220 can be configured to move the chamber 221 (e.g., rotating the carrousel 220) and align the chamber 221 with the loading port 212 of the housing 210. The loading port 212 can then be coupled and/or aligned with the port 274 of the sample preparation component 270, as shown in FIG. 6, to transfer sample specimen containers from the sample preparation component 270 to the carrousel 220. In some instances. the loading port 212 can be configured to assume a first configuration (e.g., a closed configuration) in which the gate 213 obstructs the loading port 212 preventing the transport of sample specimen containers to the carrousel 220. The gate 213 can be transitioned from the first configuration to a second configuration (e.g., an open configuration) in which the gate 213 does not obstructs the loading port 212, allowing transport of sample specimen containers from the sample preparation component 270 to the carrousel 220. In some implementations the gate 213 can be transitioned from the closed configuration to the open configuration with a motor and/or actuator 231A, shown in FIG. 6. In some instances, the motor and/or actuator 213A can receive one or more signals and/or instructions from the control unit 260 to transition the gate 213 from the closed configuration to the open configuration while keeping all the other gates (e.g., gate 215 and gate 217 obstructed and/or closed). In that way, sample specimen containers can be transported and/or transferred from the sample preparation component 270, through the loading port 212, and into the carrousel 220, preventing the transport and/or transfer of the sample specimen containers from the chamber 221 to, for example, the port 214.

Figure 14:
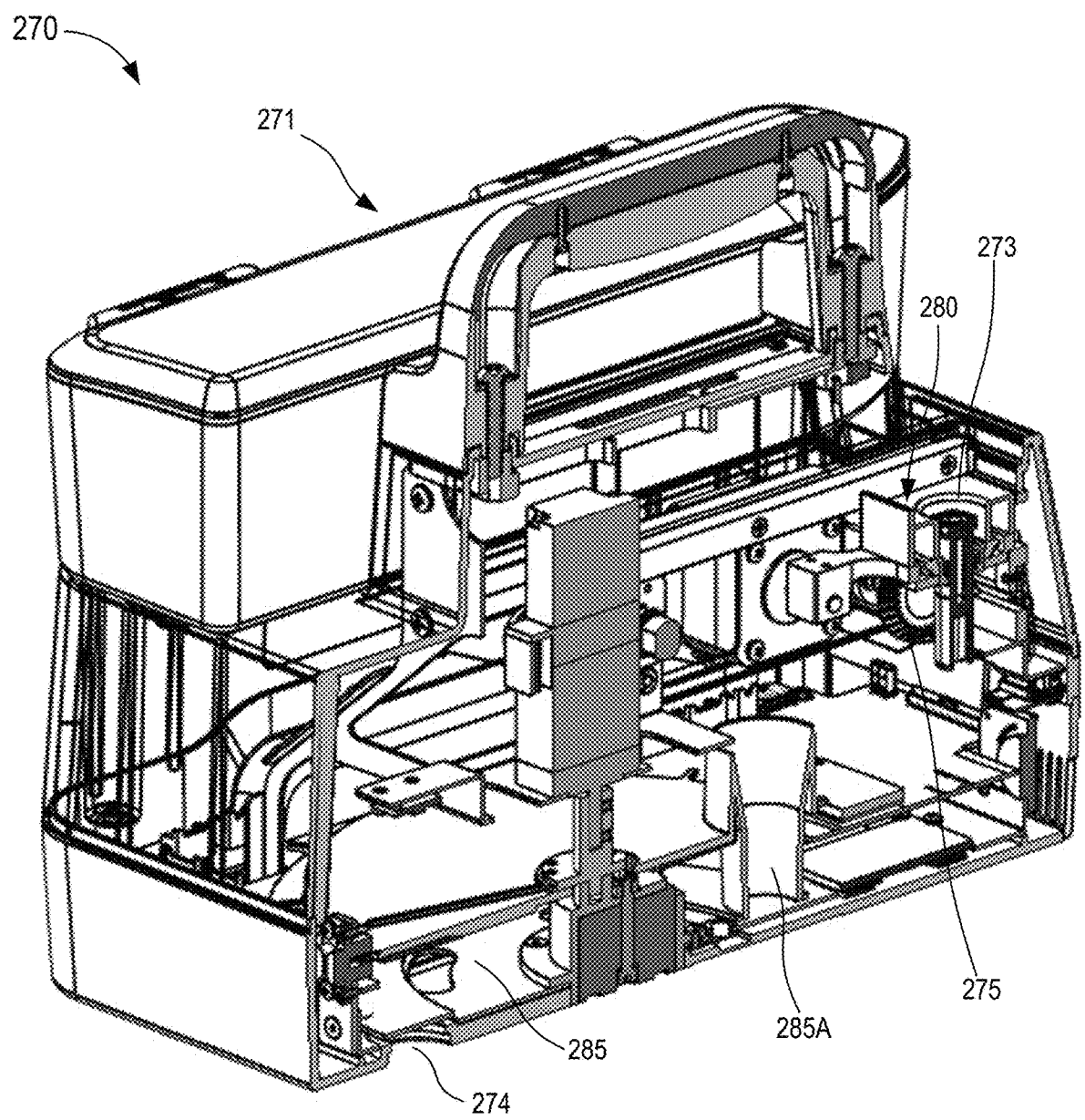
FIG. 14 is a cross-sectional rear perspective view of the sample preparation component of FIG. 13.
Figure 15:
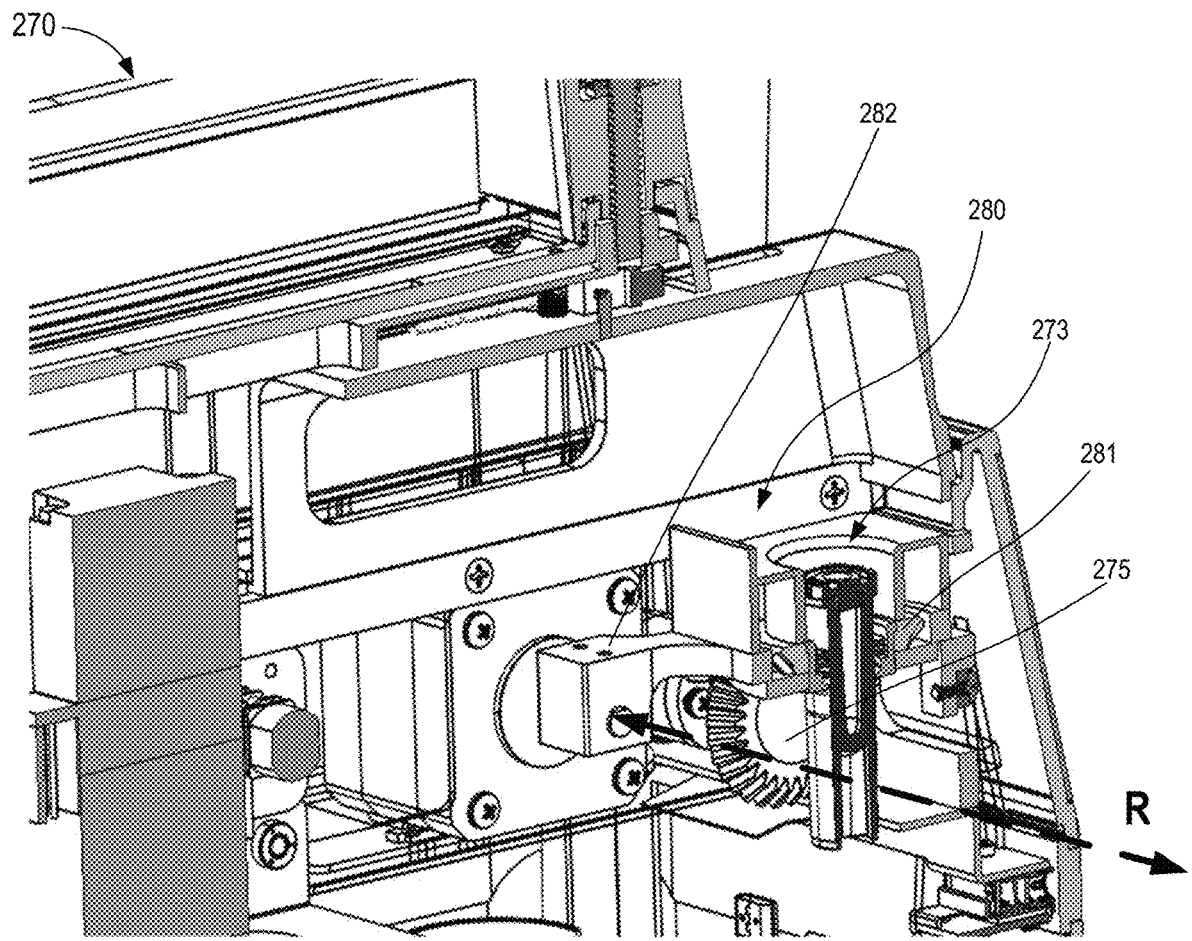
FIG. 15 is a detailed view of the cross-sectional rear perspective view of the sample preparation component shown in FIG. 14
Figure 16:
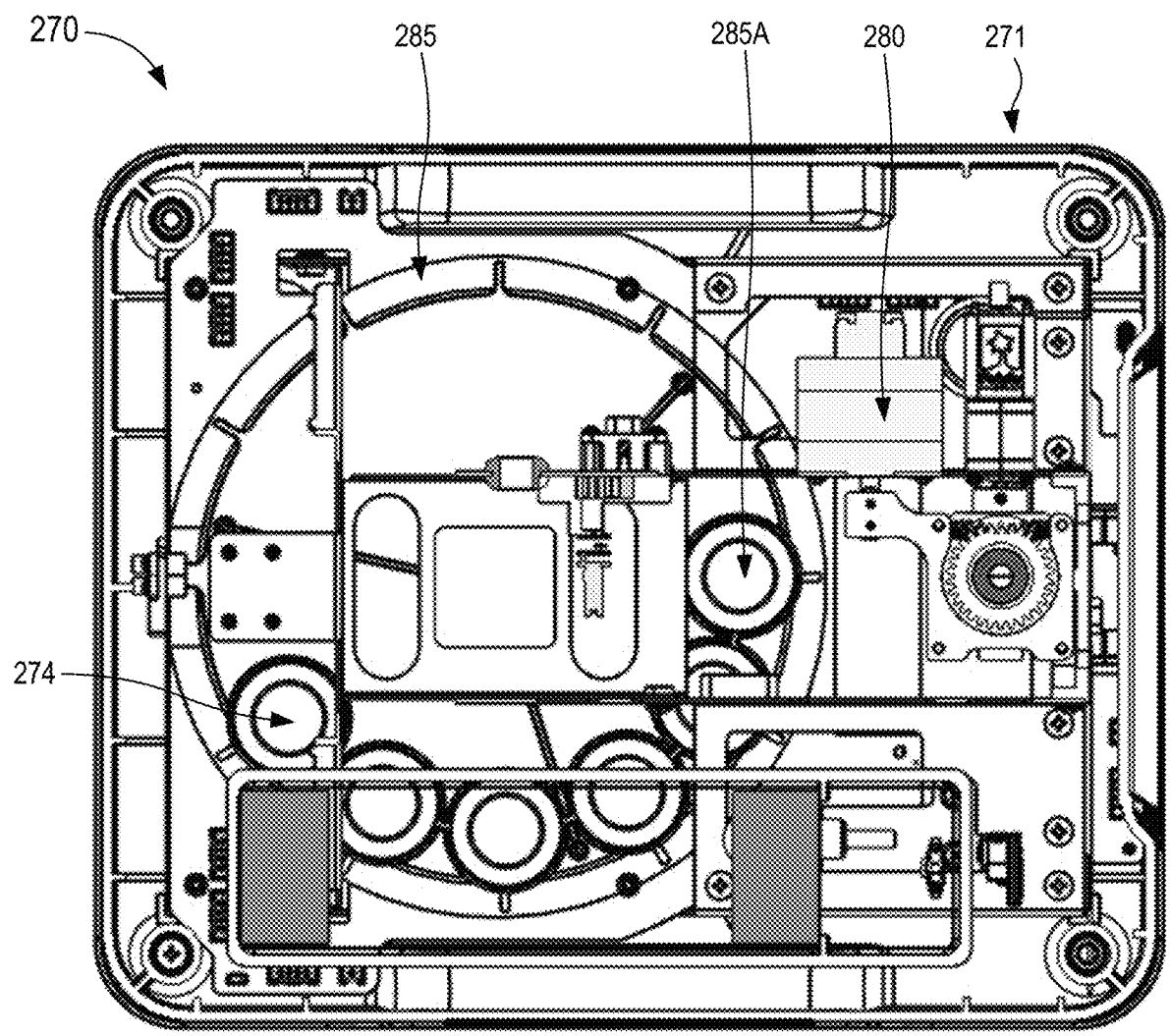
FIG. 16 is a cross-sectional top view of the sample preparation component of the sample processing unit of FIG. 2

In some implementations the transport of sample specimen containers from the sample preparation component 270 to the carrousel 220 can be driven by gravity. In such implementations, a sample specimen container can be initially disposed on the sample preparation component 270, as shown in FIGS. 14 and 15, such that, a portion of the sample specimen container (e.g., the cap region or an upper section of the sample specimen container) is engaged by a holder 281 of the mixer 280. The mixer 280 can also include an actuator 282 configured to move counterclockwise along the axis R shown in FIG. 15. In use, the actuator 280 can receive a signal to move counterclockwise effectively inverting the sample preparation component and disposing the sample preparation component above the chamber 285 A of the carrousel 285. The holder 281 can be configured to disengage and/or release the sample specimen container upon receiving a signal, such that the sample specimen container is disposed inverted (the cap on the bottom) on the carrousel 285. When a sample specimen container is disposed on the chamber 285A of the carrousel 285, the carrousel 285 can be rotated in a counterclockwise and/or clockwise rotational movement until the chamber 285A aligns with the port 274, which in turn is coupled and/or aligned with the loading port 212 of the processing unit 200, as described above. In that way, when the carrousel 285 is actuated to move the sample specimen container disposed in the chamber 285A towards the port 274 until the chamber 285A, the sample specimen container can be transferred (driven by gravity) from the sample preparation component 270, through the port 274, the loading port 212, and into the chamber 221 of the carrousel 220. Alternatively, in some embodiments, the transport of sample specimen containers from the sample preparation component 270 to the carrousel 220 can be driven by an actuator and/or other component of the sample preparation component 270 (not shown) configured to exert one or more force on a sample specimen container to move and/or displace the sample specimen container through the port 212.

The carrousel 220 includes a motor and/or actuator 222, shown in FIG. 6 configured to move the chamber 221 (and any other chamber included in the carrousel 220) to transport, direct, and/or transfer a received sample specimen container to the storage compartment 230 and/or to the positioning component 240. The motor 222 can include a brushless electric motor, a brushed electric motor, a direct drive motor, a linear motor, a servo motor, an actuator, a voice-coil motor or any suitable motor or actuator. The motor 222 can be configured to move the chamber 221 of the carrousel 220 (e.g., by rotating the carrousel 220 along its rotational axis "B" either in a counterclockwise or a clockwise direction) to a first position in which the chamber 221 is aligned with the port 274 of the sample preparation component. In the first position the chamber 221 can receive a sample specimen container form the sample processing unit 270, as described above. In some instances, the motor 222 can receive one or more signals and/or instructions from the control unit 260 to move chamber 221 (and/or any other predetermined chamber of the carrousel 220) to the first position.

The motor 222 of the carrousel 220 can be further configured to move the chamber 221 which contains a sample specimen container received as described above, between the first position and a second position. In the second position, the chamber 221 of the carrousel 220 is aligned with the port 216. The carrousel 220 can be moved from the first position to the second position by rotating the carrousel 220 along his rotational axis either in a counterclockwise or a clockwise direction) to transport and/or transfer the sample specimen container between the chamber 221 and the positioning component 240, as shown in FIG. 6. The port 216 can facilitate transporting and/or transferring sample specimen containers between the carrousel 220 and the positioning component 240.

Figure 8:
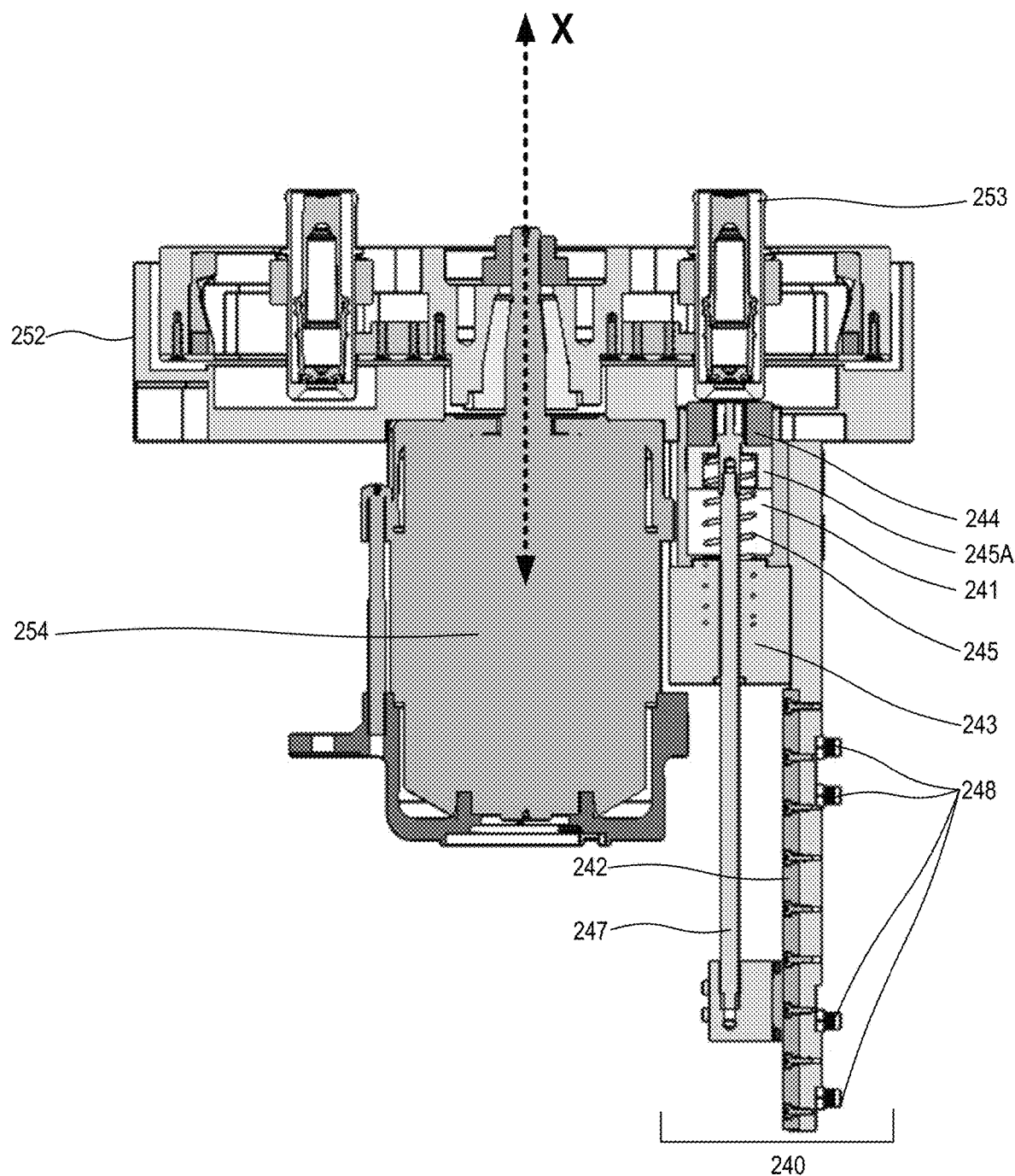
FIG. 8 is a cross sectional front view of a centrifuge and a positioning component of the sample processing unit of FIG. 2.

The positioning component 240 can include a channel 241 configured to accommodate, at least temporarily, a swing bucket 253 included in the rotor 252 of the centrifuge 250, as shown in FIG. 8. In some instances, the chamber of the carrousel 220 can be moved to the second position and the gate 217 can be actuated (with the actuator 217A) via the control unit 260 to open and/or unobstruct the port 216 so that the sample specimen container disposed on the chamber 221 can be transported and/or transferred to the swing bucket 253, effectively loading the sample specimen container in the rotor 252 of the centrifuge 250. In other instances, the chamber 221 can be moved to the second position so that a sample specimen container disposed on the swing bucket 253 can be transported and/or transferred back to the chamber 221 of the carrousel 220 after the sample specimen container has been centrifuged in the centrifuge 250. In such instances, the sample specimen container can be disposed on the swing bucket 253 and be centrifuged according to a predetermined set of instructions and/or centrifugation procedures. After centrifugation the swing bucket 253 can be engaged by the positioning component 240 such that the swing bucket 253 can be disposed, at least temporarily, in the channel 241 of the positioning component 140, as further described herein.

The motor 222 of the carrousel 220 can be further configured to move the chamber 221 to a third position. In the third position, the chamber 221 can be coupled and/or communicated with at least a portion of the storage compartment 230 to transport and/or transfer a sample specimen container disposed on the chamber 221 to the storage compartment 230 for its storage at a predetermined temperature. For example, in some implementations the chamber 221 can be moved by the motor 222 to a third position in which the chamber 221 is aligned with the port 214 for transferring sample specimen containers to the storage compartment 230. In some instances, the chamber 221 can be moved to the first position to receive a sample specimen container form from the sample processing unit 270, and then, the chamber 221 with the received sample specimen container, can be moved from the first position to the third position such that carrousel 220 can be coupled to the storage compartment 230 via the port 214 for transferring and/or directing the received sample specimen container. In some implementations, as shown in FIG. 6, the first position can be substantially the same as the third position. In such implementations the chamber 221 can be moved to the first position and the gate 213 can be transitioned from the closed configuration to the open configuration to transfer a sample specimen container from the sample preparation component 270 into the chamber 221. Subsequently, the gate 215 can be actuated to transition from a first configuration (e.g., a closed configuration) in which the port 214 is obstructed to a second configuration (e.g., an open configuration) in which the port 214 is not obstructed so that the sample specimen container can be transferred from the chamber 221 to the storage compartment 230. In other instances, the chamber 221 can be first moved to the second position to receive a sample specimen container from the sample positioning component 240 after the sample specimen container has been centrifuged. The chamber 221 containing the centrifuged sample specimen container can then be moved to the third position such that the carrousel 220 can be coupled and/or communicated with the storage compartment 230 for transferring and/or directing the centrifuged sample specimen container to the storage compartment 230 for storage.

In some implementations, the gate 215 can be transitioned between a first configuration in which the gate 215 closed and/or obstructs the port 214 preventing the transfer of sample specimen containers, and an open configuration in which the gate 215 does not obstruct the port 214 and does facilitate introducing and/or loading sample specimen containers into the storage compartment 230. In some implementations that gate 215 can be electrically and/or operatively coupled to the control unit 260 such that the control unit 260 can activate and/or control the operation of the gate, as further described herein.

Figure 7A:
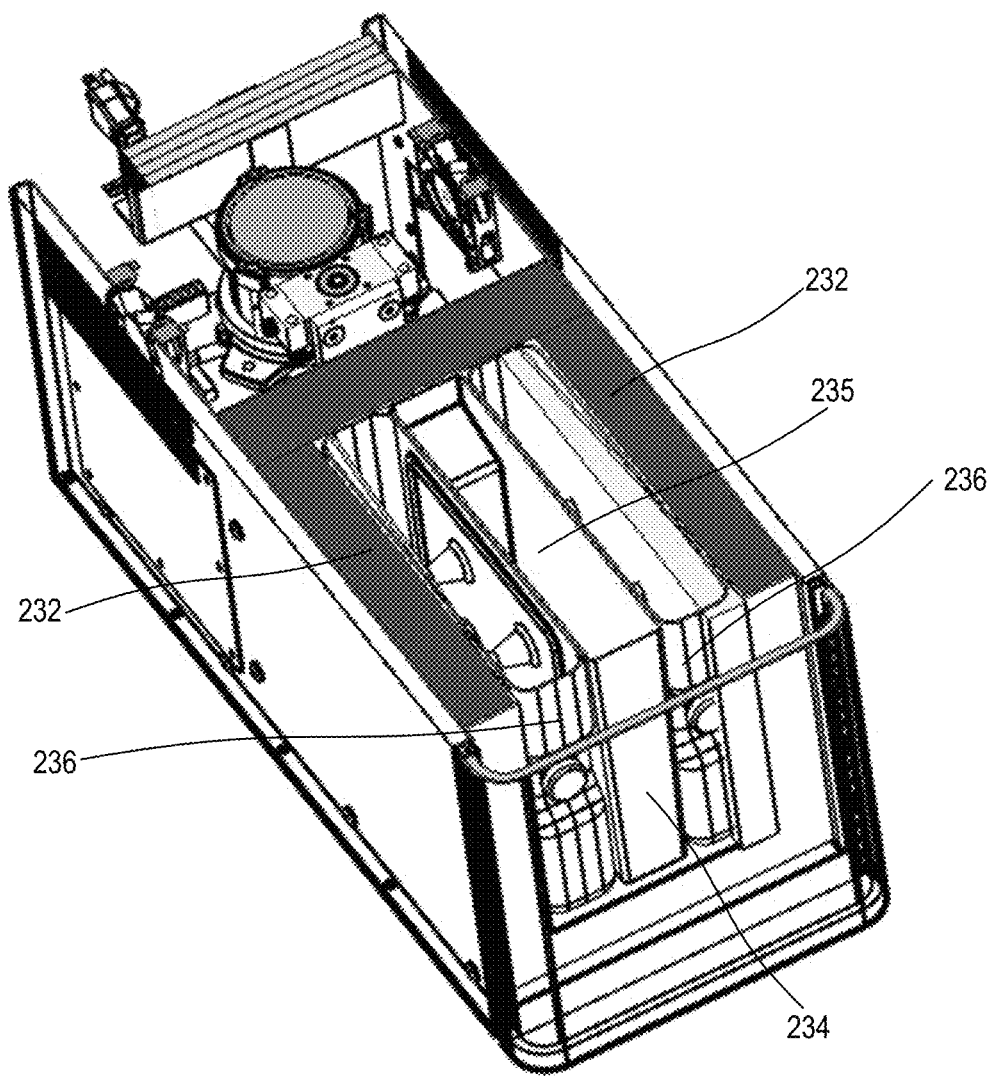
FIG. 7A is a cross sectional perspective view of a storage compartment of the sample processing unit of FIG. 2.

The storage compartment 230 is configured to store sample specimen containers containing biological samples including capillary blood samples. In some implementations, the storage compartment 230 can be configured to be removably coupleable to a sample processing unit 200. In such implementations, the storage compartment 230 can include a temperature sensor 231 and/or a communication module 238 configured to measure and transmit data associated with the storage compartment 230 such as a temperature, a geographical location, and/or a particular sample processing unit 200 to which the storage compartment 230 is coupled to, as further described herein. The storage compartment 230 includes an outer shell 232, an inner shell 234, and a one or more PCM packs 236, as shown in FIG. 7A. The outer shell 232 defines interior space and/or volume for accommodating the inner shell 234 and the PCM packs 236, while providing a thermal barrier that limits and/or significantly reduces heat transfer from the external environment surrounding the processing unit 200 to the interior space and/or volume defined by the outer shell 232 (e.g., the outer shell is configured to be thermally insulated). In some implementations, the outer shell 232 can be made of one or more layers of thermally insulating materials (e.g., materials having a low thermal conductivity coefficient) stacked together to form and/or provide a continuous barrier that reduces and/or minimizes the rate of heat transfer between one or more exterior surfaces of the outer shell 232 (e.g., the surfaces disposed outside the outer shell and exposed to air and/or other environments surrounding the processing unit 200 and the housing 210) and one or more areas disposed inside the outer shell 232.

Figure 7B:
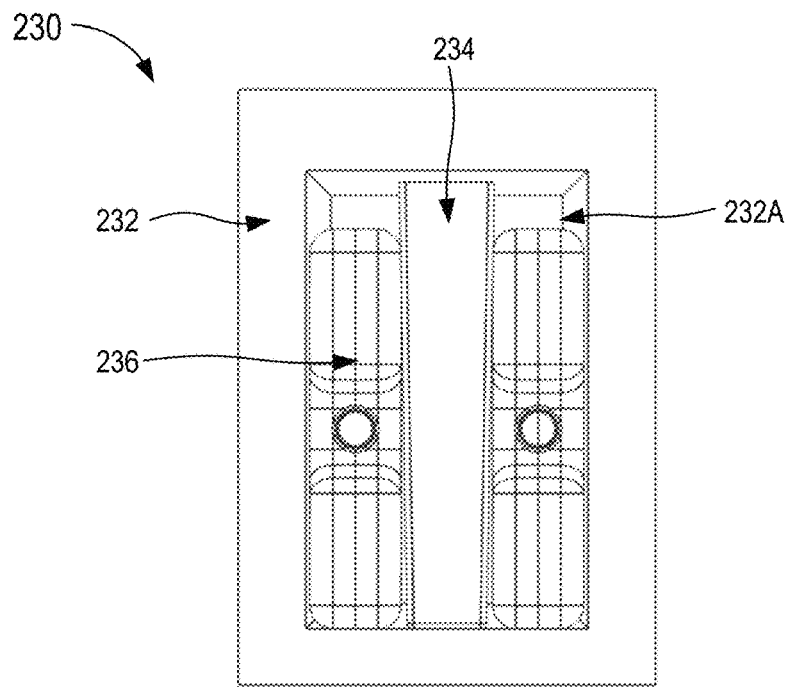
FIG. 7B is a front view of the storage compartment of FIG. 7A.

The inner shell 234 occupies a fraction of the interior space of the outer shell 232 and defines a region 232A located inside the outer shell 232 and outside the inner shell 234 (i.e., between the inner shell 234 and outer shell 232) in which one or more phase change material (PCM) packs 236 can be accommodated, as shown in FIG. 7B. The inner shell 234 can be made of a thermally conductive material and can be define a storage volume and/or storage chamber 235 for storing biological samples. The PCM packs 236 can be disposed in the region 232A generated between the outer shell 232 and the inner shell 234, surrounding the inner shell 234, and/or adjacent to the inner shell, as shown in FIGS. 7A and 7B. The storage chamber 235 can accommodate sample specimen containers and keep them refrigerated by removing heat from the sample specimen containers, through the thermally conductive inner shell 234, and to the PCM packs 236 surrounding the inner shell 234.

Figure 7C:
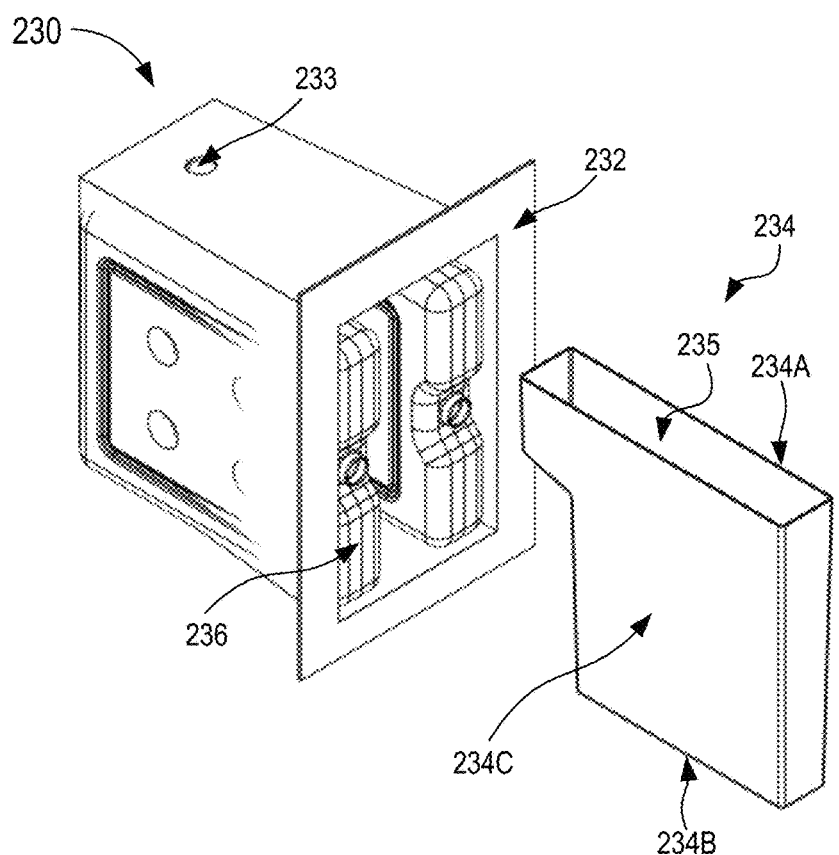
FIG. 7C is a partially exploded perspective view of the storage compartment of FIG. 7A, displaying an inner shell, an outer shell and two containers including a phase change (PCM) material.

The outer shell 232 can be any suitable structure that surrounds a portion of interior volume of the housing 210 and defines an interior volume for accommodating the subcomponents of the storage compartment 230. FIG. 7C shows the outer shell 232 can also include an opening 233. FIG. 7A shows the outer shell 232 is a three-dimensional shape defined by a rectangular cross-sectional area and a suitable height. The outer shell 232 can be formed of any suitable insulating material or insulating structure configured to enhance and/or improve the thermal insulating properties of the storage compartment 230. That is, the outer shell 232 can be configured to reduce the rate of heat transfer between the one or more surfaces of the storage compartment 230 that are in contact with, or adjacent the exterior surfaces of the housing 210. In other words, the outer shell 232 may be configured to function as a thermal barrier to heat transfer between the interior and the exterior of the storage compartment 230

In some implementations the outer shell 232 can incorporate any suitable material and/or structure configured to reduce heat transfer. For example, the outer shell 232 may include one or more materials that have inherently low heat transfer characteristics including polyurethanes, polyisocyanurates, polyesters, polystyrene, polyethylene, polypropylene, cellulose, fiberglass and others. In some implementations the outer shell 232 can include materials having low heat transfer characteristics as well as suitable mechanical properties, such as being easy to form and/or machine. For example, in some implementations the outer shell 232 can include thermosetting or thermoplastics polymers and polymer formulations. The outer shell 232 can also be formed or shaped into a structure that itself provides additional thermal insulating properties. For example, in some implementations the outer shell 232 can be shaped as an open cell foam, a closed cell foam or combination thereof. The foam provides a plurality of internal voids and/or volumes filled with low heat transfer coefficient air, which reduces the thermal conductivity of the outer shell 232. Moreover, in some instances, the internal voids and/or volumes can be filed with a gas such as nitrogen, carbon dioxide, and/or argon among others. Alternatively, in some implementations, the internal voids can be evacuated (e.g., under vacuum) to enhance the thermal insulating properties of the outer shell 232. In some implementations, the internal voids and/or volumes can be arranged and/or organized forming any suitable configuration. For example, the voids can specific geometries such as spherical, cylindrical, hexagonal, cubical, ellipsoidal, and the like.

Figure 7D:
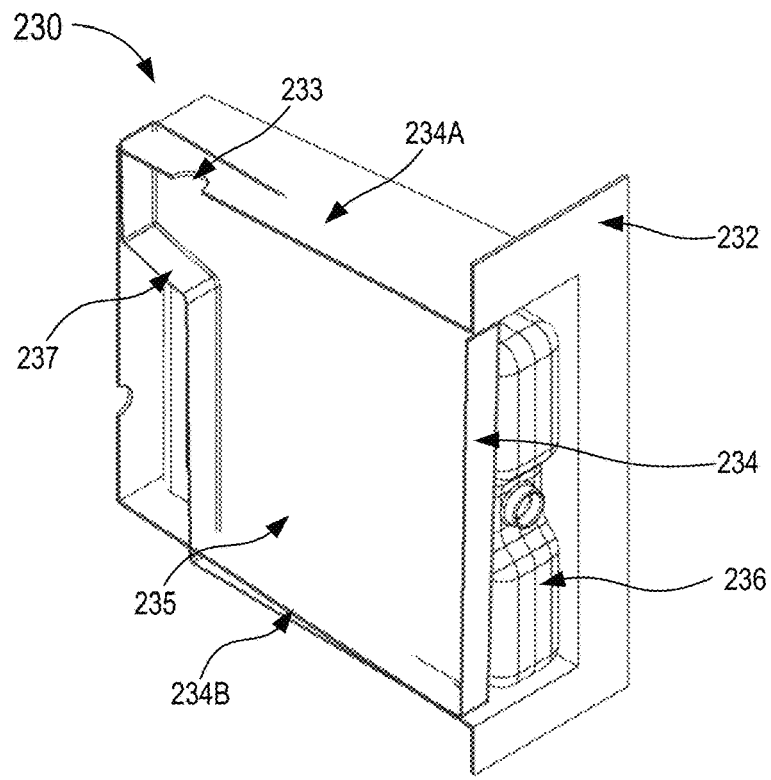
FIG. 7D is a cross-sectional perspective view of the storage compartment of FIG. 7A.
Figure 7E:
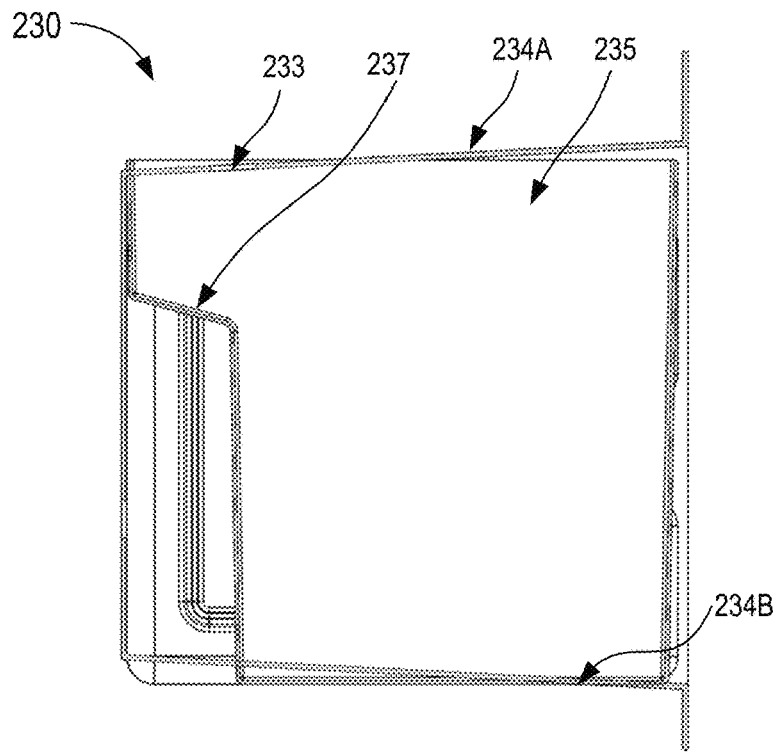
FIG. 7E is a cross-sectional side view of the storage compartment of FIG. 7A.

The inner shell 234 of the storage compartment 230 can be any suitable structure configured to be disposed inside the outer shell 232 to receive and store sample specimen containers at a predetermined temperature. The inner shell 234 can be any suitable shape, form and/or configuration. FIGS. 7C-7E show the inner shell 234 can be a polyhedral three-dimensional shape that includes a top side 234A as well as a bottom closed end 234B, and one or more lateral walls 234C, which collectively define a storage volume and/or storage chamber 235 suitable for storing the sample specimen containers. The opening 233 of the outer shell 234 can be mechanically coupled and/or aligned with the port 214 (shown in FIG. 6) such that sample specimen containers can be transported and/or transferred into the storage volume and/or storage chamber 235 of the inner shell 234. The opening 233 of the outer shell 234 can have any suitable shape characterized by dimensions large enough for receiving and/or facilitating transfer of sample specimen containers in and out of the storage component 230.

In some implementations the inner shell 234 can include multiple portions that can be coupled and/or assembled together to form the opening and the storage volume. That is, in some implementations, the inner shell 234 can be modular. Alternatively, in other implementations, the inner shell 234 can be made of a monolithic structure. The inner shell 234 can be made of any suitable materials having sufficient structural strength and rigidity and high thermal conductivity including, metals, metal alloys, and/or selective metal oxides. For example, in some implementations, the inner shell 234 can be made of silver, copper, aluminum, nickel, tungsten, zinc, silicon carbide, beryllium oxide, aluminum-bronze alloys, Nickel-chromium alloys and the like.

As described above, the outer shell 232 can house and/or contain include one or more PCM packs 236 configured to absorb thermal energy at phase transition to provide cooling to the inner shell 234 and the sample specimen containers disposed on the storage volume. The PCM packs 236 can include a PCM configured to absorb heat by transitioning from a solid phase to a liquid phase. In other implementations, the PCM can be configured to absorb heat by transitioning from a first crystalline structure to a second crystalline structure different from the first crystalline structure. In some implementations, the PCM can be an organic (carbon-containing material) including chemical compounds derived from petroleum, plants, and/or animals. In some embodiments, the PCM can be an inorganic salt hydrate derived from mineral deposits. In some implementations the PCM can be an alkane hydrocarbon or a paraffin including, but not limited to n-decane, n-dodecane, n-tetradecane, n-hexadecane, n-octadecane, n-eicosane, n-docosane or a combination thereof. In some embodiments, the PCM can be a commercially available product such as BioPCM, PlusICE, RT-2HC, RT-3HC, RT-4, RT-5 and others FIGS. 7D and 7E show the storage volume and/or storage chamber 235 includes a biasing member 237. The biasing member 237 can be any suitable structure configured to convey, encourage, urge, or otherwise direct (or re-direct) a sample specimen container as it enters the storage chamber 235 (via the opening 233) to a particular location within the storage chamber 235 to maximize the usable storage capacity of the storage chamber 235. The biasing member 237 is a ledge (also referred to as a kick ledge) or ramp that causes a sample specimen container to move towards a front side or corner of the storage chamber 235 (e.g., in cases in which the opening 233 to the storage chamber 235 is on its back side or corner), so that the storage chamber 235 fills from the front side or corner, and as additional sample specimen containers are added, they stack on one another beginning from that front side or corner, thereby increasing, maximizing, and/or optimizing the usable volume of the storage chamber 235.

Figure 7F:
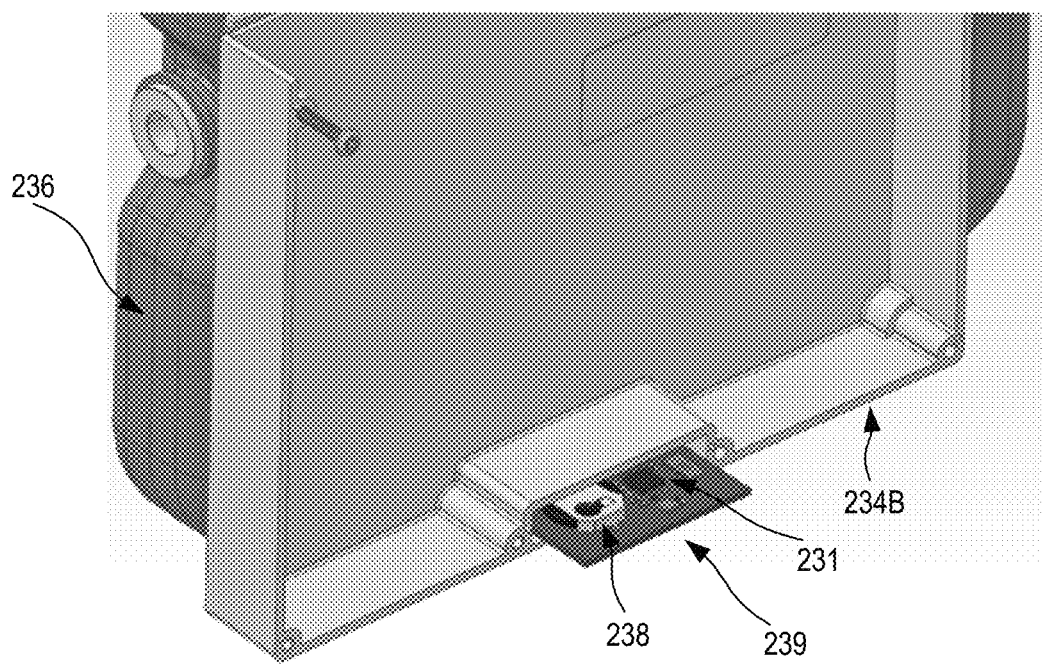
FIG. 7F is a cross-sectional perspective view of the storage compartment of FIG. 7A displaying a communications module and a temperature sensor disposed on a cartridge.

FIG. 7F shows the storage compartment 230 includes a temperature sensor 231 configured to sense and quantify a temperature representative of the storage chamber 235. The temperature sensor 231 can include and/or be a thermocouple, a resistance temperature detector (RTD), a thermistor, and/or a semiconductor based integrated circuit, disposed on the bottom closed end 234B of the inner shell 234 such that the temperature sensor 231 can be in close proximity and thermal communication with the storage chamber 235 of the storage compartment 230. In some implementations, the temperature sensor 231 can include one or more thermocouples including for example an E-type, J-Type, K-type, N-type, T-type, and/or R/S-type thermocouple. In some implementations, the thermocouple(s) 231 can be disposed on the inner shell 234 near to or adjacent to the lateral walls 234C, or the bottom closed end 234B of the inner shell 234, such that the thermocouple(s) can be in thermal communication with at least a portion of the storage chamber 235 defined by the inner shell 234.

FIG. 7F also shows the storage compartment 230 includes a communications module 238 disposed on the bottom closed end 234B of the inner shell 234. The communications module 238 can be any suitable device configured to receive signals representative of a temperature sensed and/or measured by the temperature sensor 231, and transmit signals, including the signals received from the temperature sensor 231 to the control unit 260 of the sample processing unit 200, and/or to one or more external devices. In some implementations the communications module 238 can be disposed on the inner shell 234 in close physical proximity to the temperature sensor 231, such that the communications module 238 and the temperature sensor 231 of the storage compartment 230 can be electrically coupled without requiring long wires and/or lines connecting the two components.

As shown in FIG. 7F, in some implementations the storage compartment 230 can include a communications module 238 and a temperature sensor 231 disposed on a cartridge 239 that facilitates rapidly replacing and/or exchanging either component in case of a malfunction. The communications module 238 can include a transducer (e.g., an RF antenna) configured to convert an electrical signal (e.g., a voltage) received from a transmitter such as the temperature sensor 231 of the storage compartment 230 into a radio signal. The RF antenna can also be configured to pick up radio signals emitted by one or more external devices and convert them into a voltage that can be stored and/or transmitted to one or more components of the storage compartment 230. In that way, the communications module 238 can receive signals (for example a voltage) representative of the temperature sensed and/or measured by the probe of the temperature sensor 231 and convert those signals into a high frequency radio signal that can be transmitted and received by one or more external devices, and/or the control unit 260 of the sample processing unit 200. In some implementations, the communications module 238 of the storage compartment 230 can include an RF antenna configured to produce radio signals at a predetermined frequency specifically selected to overcome interferences caused by materials surrounding the communication module 238, such as for example, an insulating component of the storage compartment 230. For example, in some implementations the communication module 238 of the storage compartment 230 can be configured to produce radio signals of suitable frequencies (e.g., a frequency of at least about 300 Hz to no more than about 850 Hz, or at least about 860 Hz to no more than about 930 Hz).

The positioning component 240 is configured to facilitate automatic loading and unloading of biological samples contained in sample specimen containers to and from the centrifuge 250. The positioning component 240 can be configured to position a swing bucket 253 included in the rotor 252 of the centrifuge 250 in a predetermined position such that a sample specimen container can be received in the swing bucket 253 for centrifugation, and/or removed from the swing bucket 253 after the sample specimen container has been centrifuged. In some instances, the positioning component 240 can engage and/or interact with the carrousel 220 to transport and/or transfer a sample specimen container from the carrousel 220 to the swing bucket 253 of the centrifuge 250 for centrifugation of the biological sample contained in the sample specimen container. In other instances, the sample positioning component 240 can engage and/or interact with the swing bucket 253 of the centrifuge 250 after the centrifuge 250 has completed a centrifugation cycle (e.g., a predetermined set of centrifugation steps and/or conditions used to separate components of a biological sample), to transfer a sample specimen container containing the centrifuged biological sample, from the swing bucket 253 of the rotor 252 to the carrousel 220 and then to the storage compartment 230.

Figure 9B:
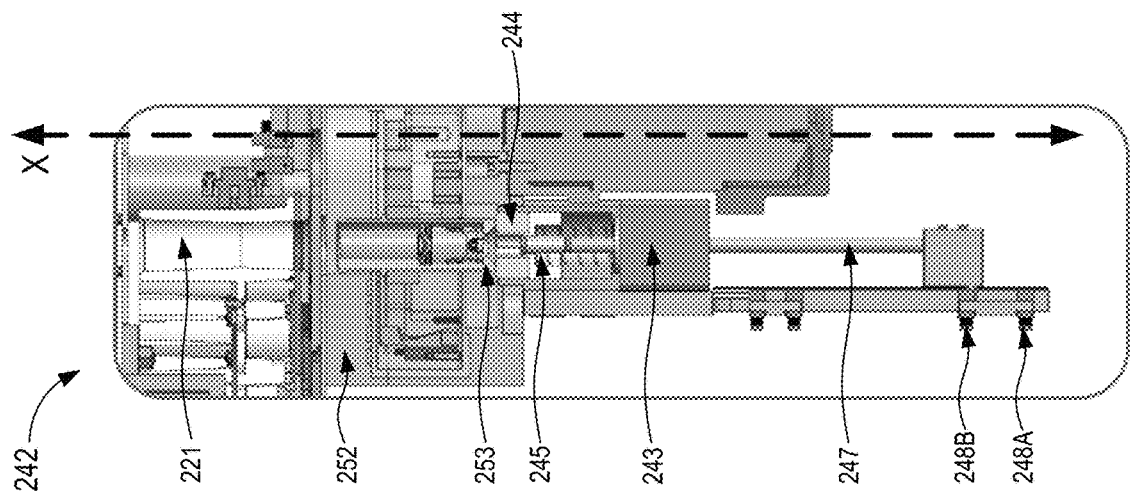
FIGS. 9A-9D are detailed cross-sectional illustrations of a lift mechanism of the sample processing unit of FIG. 2, displaying the lift mechanism disposed in (A) a home configuration, (B), a catch configuration, (C) a transfer to rotor configuration, and (D) a transfer from rotor configuration
Figure 9C:
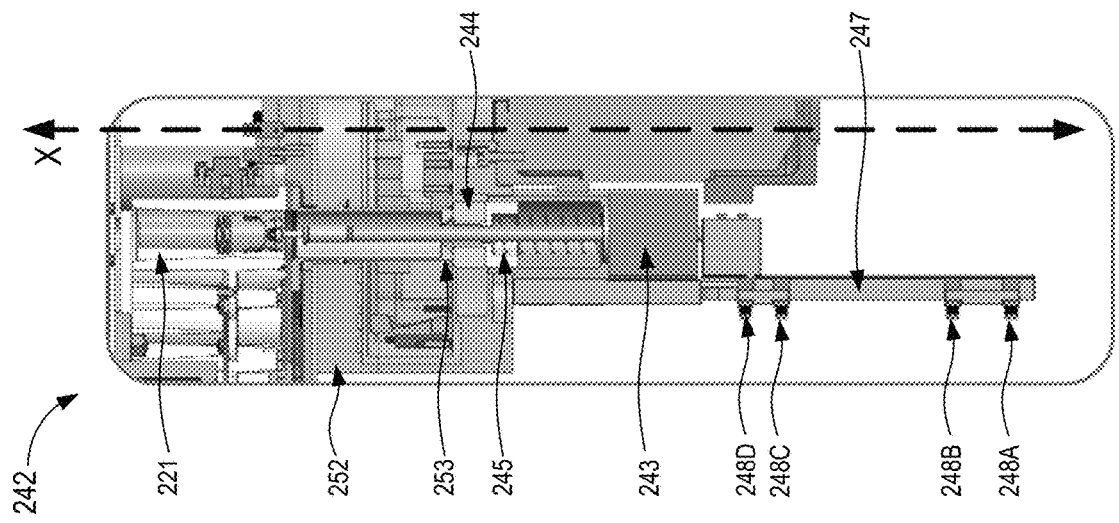
Figure 10:
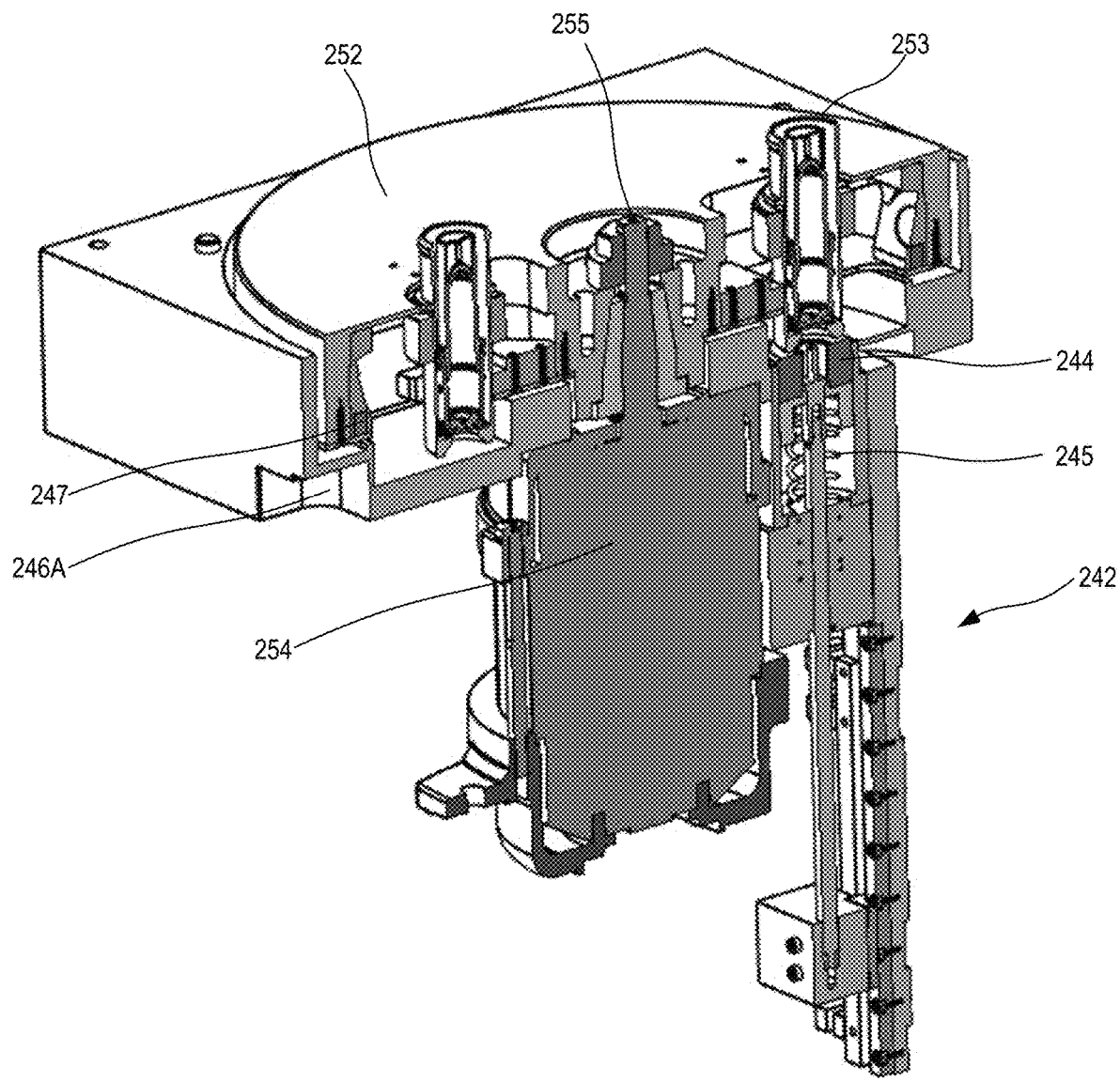
FIG. 10 is a cross-sectional perspective view of a centrifuge and a positioning component of the sample processing unit of FIG. 2.
Figure 11:
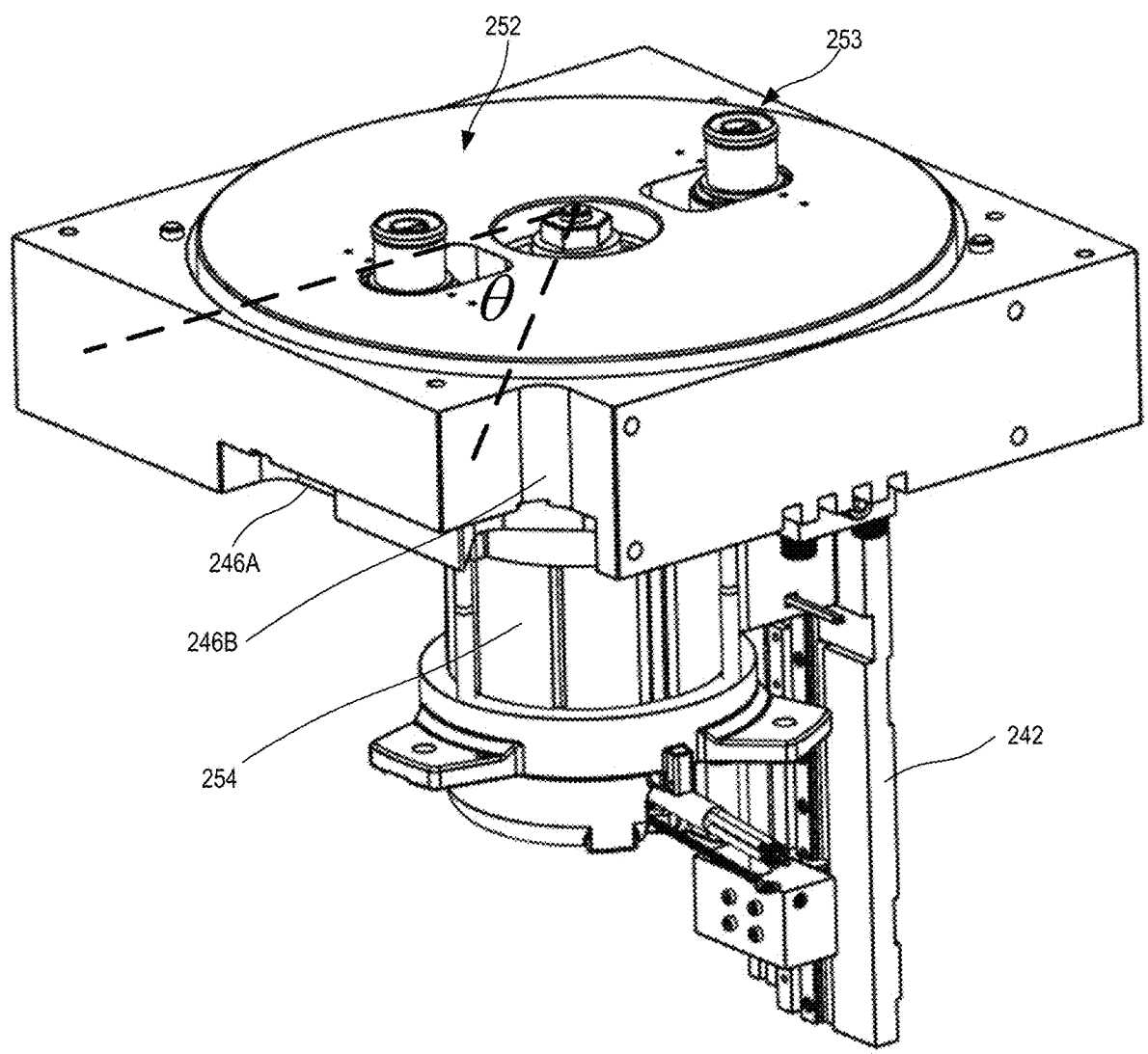
FIG. 11 is a perspective view of the centrifuge and the positioning component shown in FIG. 10.

FIGS. 8 and 11 show the positioning component 240 can include a lift mechanism 242, an alignment magnet 244, and two position sensors 246. The lift mechanism 242 can be combination of a motor, an actuator, an/or energy storage element coupled to the alignment magnet 244. The lift mechanism 242 can be configured to (a) cause movement of the alignment magnet 244 along a direction parallel to the axis of centrifugation of the centrifuge 250, such that the alignment magnet 244 can be brought into contact with a low end portion of the swing bucket 253 as shown in FIG. 9C, and (b) include a portion and/or subcomponent that can engage and/or interact with an end portion of a sample specimen container disposed within the swing bucket 253 of the centrifuge 250 to move the sample specimen container along the direction parallel to the axis of centrifugation to either load or unload the sample specimen container to and from the swing bucket 253. The alignment magnet 244 can be an axially magnetized magnet having an annular shape (e.g., a ring magnet) and being configured to interact with a low-end portion of the swing bucket 253, which is made of a ferromagnetic material, as further described herein. The alignment magnet 244 can be disposed at a position slightly below that of the swing bucket 253, as shown in FIG. 10, such that the lift mechanism can move the alignment magnet 244 into close proximity with the low-end portion of the swing bucket 253. When the alignment magnet 244 is in close proximity with the low-end portion of the swing bucket 253, the alignment magnet 244 can interact with the ferromagnetic material inducing a magnetic flux on the surface of the low-end portion of the swing bucket. The magnetic field generated between the alignment magnet 244 and the lower portion of the swing bucket 253 exerts a magnetic force on the swing bucket 253 that causes the rotor 252 to move such that the swing bucket 253 becomes aligned with the alignment magnet 244. Said in other words, the movement of the swing bucket 253 under the effect of the generated magnetic field guides the swing bucket 253 to assume a position in which the swing bucket 253 is symmetrically aligned with the alignment magnet 244 at a stable position, as further described herein. The two position sensors 246 can be coupled to the control unit 260 and configured to detect the position of the swing bucket 253 along its circular trajectory defined by the rotor 252 and the axis of centrifugation. In some implementations, the positioning component 240 can include more or less sensors 246 configured to detect the position of the swing bucket 253 along its circular trajectory. The sensors 246 can detect the passage of the swing bucket 253 along predetermined positions on the circular trajectory of the swing bucket 253 and send a signal to the control unit 260 to communicate to the control unit 260 the relative position of the swing bucket 253. The signals generated by the two sensors 246 can be used by the control unit 260 to operate the lift mechanism 242 and/or the motor 254 of the centrifuge 250 to facilitate positioning the swing bucket 253 at a position in which the swing bucket 253 is in symmetrical alignment with the alignment magnet 244, as further described herein The lift mechanism 242 can include one or more motors, actuators, energy storage elements, and/or mechanical elements configured to move the alignment magnet 244 along a direction parallel to the axis of centrifugation of the centrifuge 250 to adjust a distance and/or height separating the alignment magnet 244 and the ferromagnetic low-end portion of the swing bucket 253. By adjusting that distance, the swing bucket can become symmetrically aligned with the alignment magnet 244 as described above. The lift mechanism 242 can also be configured to move a sample specimen container disposed in the swing bucket 253 along the direction parallel to the axis of centrifugation of the centrifuge 250, when the alignment magnet 244 is symmetrically aligned with the swing bucket 253. For example, in some implementations the lift mechanism 242 can include a linear electric motor 243, a spring 245, and a contact element 245A coupled to the spring 245 (e.g., forming an energy storage element 245) and configured to cause movement of the alignment magnet 244 along a direction parallel to the axis of centrifugation X of the centrifuge 250, as shown in FIG. 8. In some implementations, the axis of centrifugation X of the centrifuge 250 can be normal and/or perpendicular to the ground or surface in which the processing unit 200 is disposed on, and thus the direction parallel to the axis of centrifugation is a vertical direction. In such implementations, the linear electric motor 243 and the energy storage element 245 of the lift mechanism 242 can be configured to perform a compound movement to change the position of the alignment magnet 244 and the position of a sample specimen container disposed in the swing bucket along the vertical direction. Said in other words, the linear electric motor 243 and the energy storage element 245 of the lift mechanism 242 can move the alignment magnet 244 to change the relative height of the alignment magnet 244 with respect to the ground and/or a reference point until the swing bucket 253 is symmetrically aligned with the alignment magnet 244. Then, when swing bucket 253 is symmetrically aligned with the alignment magnet 244, the energy storage element 245 can engage a sample specimen container disposed in the swing bucket 253 to move the sample specimen container along the vertical direction such that the sample specimen container can be transferred to and/or from the rotor 252, as further described herein. The use of a motor and/or actuator and an energy storage element 245 eliminates the need for a separate coaxial motor to move the sample specimen container disposed in the swing bucket 253 and limits the amount of force exerted by the swing bucket 253 on the carrousel 220 as the bucket 253 is pushed upwards, thereby protecting the carrousel 220 structure and components such as bearings.

Figure 9A:
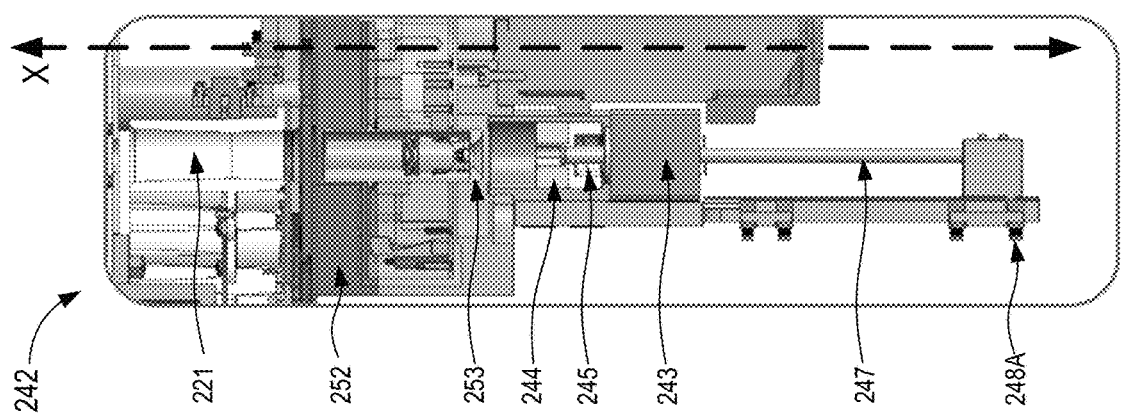

In some instances, the lift mechanism 242 can be configured to assume a first configuration, also referred to as the home configuration, as shown in FIG. 9A. In the home configuration, the alignment magnet 244 is located at a first position and/or height. In the first position and/or height the alignment magnet 244 is disposed sufficiently far from the rotor 252 of the centrifuge 250, such that the magnetic field of the alignment magnet 244 cannot interact with a lower portion of swing bucket 253 and/or any other component of the centrifuge 250. When the lift mechanism 242 is in the home configuration, the centrifuge 250 can be operated normally to spin sample specimen containers and separate components of the biological samples contained in the sample specimen containers. In some implementations, the lift mechanism 242 can include a sensor 248A, shown in FIG. 9A, configured to detect the presence of the alignment magnet 244 at the first position and/or height.

The lift mechanism 242 can be transitioned from the first configuration to a second configuration, also referred to as the catch configuration. In the catch configuration the alignment magnet 244 is located at a second position and/or height, as shown in FIG. 9B. The linear electric motor 243 and/or the energy storage element 245 of can be configured to move the alignment magnet 244 from the first position to the second position. In some implementations, the motion of the alignment magnet 244 from the first position to the second position can be detected and/or controlled with the aid of one or more position and/or height sensor(s). For example, in some implementations the linear electric motor 243 can move the alignment magnet 244 along the vertical axis X until a sensor 248B detects the presence of the alignment magnet 244 and sends a signal to the control unit 260 that can cause the motor 243 to stop. The sensor 248B can be configured to send the signal when the sensor detects that the alignment magnet 244 has reached a predetermined position and/or height corresponding to the second position described above.

At the second position and/or height, the alignment magnet 244 is disposed at a relatively short distance from the lower portion of the swing bucket 253 of the centrifuge 250, such that, an external surface of the alignment magnet 244 is separated by a small distance and/or gap from the lower portion of the swing bucket 253$p$, and the alignment magnet 244 can interact with the lower portion of the swing bucket 253 made of a ferromagnetic material inducing a magnetic flux on a surface of the swing bucket 253. The induced magnetic flux and the magnetic field resulting from the interaction of the ferromagnetic material and the alignment magnet 244 can cause movement of the rotor 252 such that the swing bucket 253 assumes a stable position in which the swing bucket 253 becomes symmetrically aligned with the alignment magnet 244 (e.g., the axial axis of the swing bucket 253 becomes aligned and overlapped with the axial axis of the alignment magnet 244). It is worth noting that the geometry of the lower portion of the swing bucket 253 and the alignment magnet 244 (e.g., the mass and the shape of the lower portion of the swing bucket 253, and the dimensions of the annularly-shaped alignment magnet 244) is selected such that interaction between the low-end portion of the swing bucket 253 and the alignment magnet 244 results in an magnetic field that displays a maximum axial attractive force at when the swing bucket 253 assumes a position in which the swing bucket 253 is symmetrically aligned with the alignment magnet 244 (e.g., the axial axis of the swing bucket 253 aligns and overlaps with the axial axis of the alignment magnet 244). At the position of maximum axial attractive force, the low-end portion of the swing bucket 253 becomes stabilized and does not move under the influence of the magnetic field, and the swing bucket 253 becomes symmetrically aligned with the alignment magnet 244.

Figure 12:
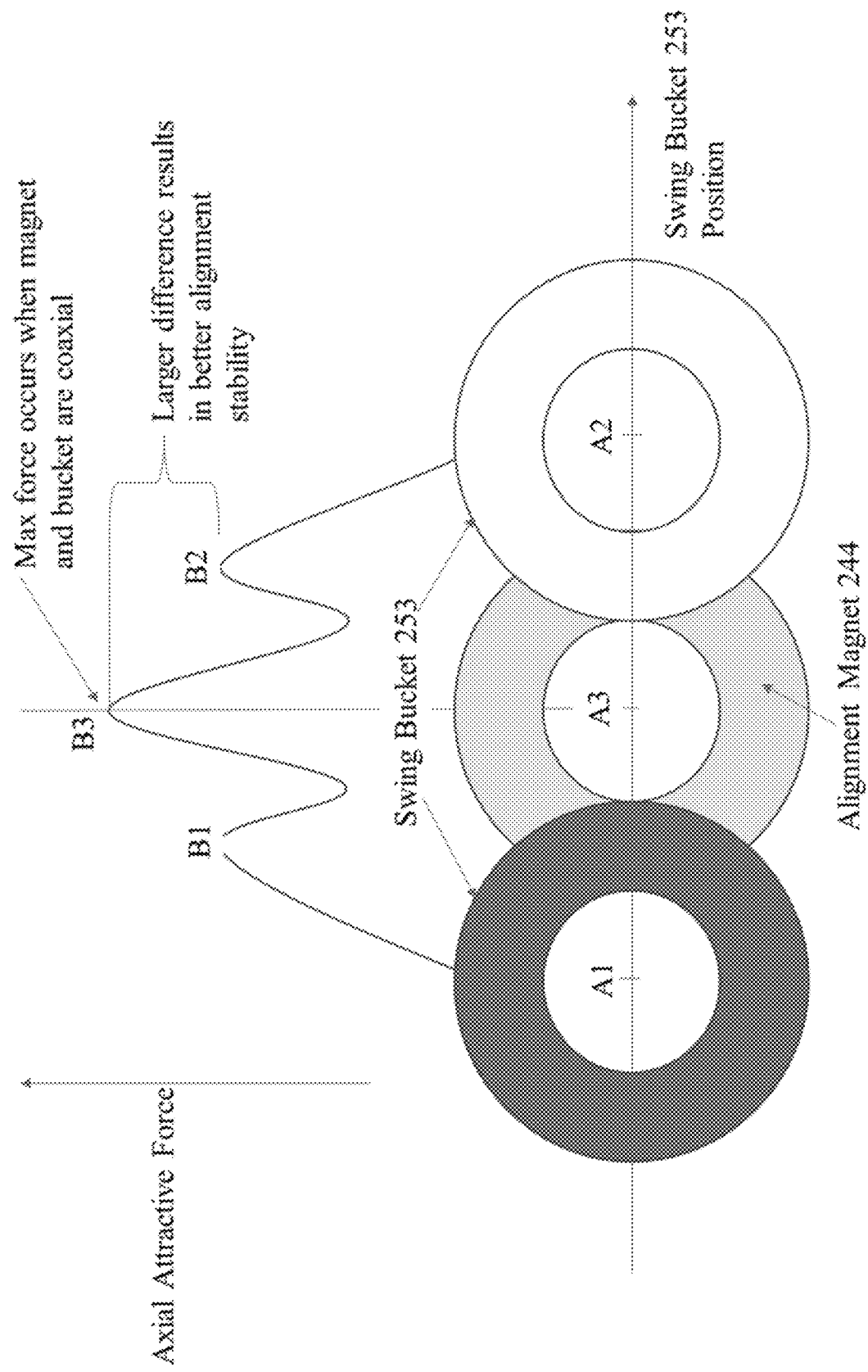
FIG. 12 shows a top view schematic representation of a centrifuge swing bucket and an alignment magnet, illustrating qualitatively the position of equilibrium assumed by the swing bucket under the effect of a magnetic field induced by the alignment magnet.

FIG. 12 shows a top view schematic representation of a swing bucket 253 and an alignment magnet 244, illustrating qualitatively the effect of the geometry of the alignment magnet 244 and the swing bucket 253 on the position of equilibrium of the swing bucket 253 under the effect of the magnetic field induced by the alignment magnet 244. FIG. 12 shows a first scenario in which the magnetic field of the alignment magnet 244 causes the swing bucket 253 to move towards the alignment magnet 244 until reaching one of two possible equilibrium positions, which are marked on the swing bucket 253 position Axis as position A1 or A2. At the positions A1 and A2, the axial attractive magnetic force acting on the swing bucket 253 reaches a local maximum B1 or B2, respectively, as shown in FIG. 12. The radial attractive magnetic force acting on the swing bucket (not shown in FIG. 12), being a function of the axial attractive force, also reaches a local maximum at the positions A1 and A2. The axial attractive forces B1 and B2 (an the radial attractive forces) cause the swing bucket 253 to assume a resting position in which the swing bucket 523 is partially aligned with the alignment magnet 244. The annular geometry of the axially magnetized alignment magnet 244 and the annular shape of the ferromagnetic low-end portion of the swing bucket 253, shown in FIGS. 8-10, can collectively cause the magnetic field to display a third position A3 in which the axial attractive force reaches a maximum B3 higher than the local maximum B1 and B2. The maximum attractive force B3 stems from the flux induced by the alignment magnet 244 on the surface of the ferromagnetic material of the low-end portion of the swing bucket 253, which reaches a maximum flux value when the annular alignment magnet 244 is symmetrically aligned with the swing bucket 253. In some implementations, the geometry of the low-end portion of the swing bucket 253 can be adjusted such that the difference between the axial attractive force B3 and the axial attractive forces B1 and B2 is increased, resulting in a more stable and reproducible alignment of the swing bucket 253 and the alignment magnet 244. The position along the x axis (e.g., positions A1 and A2 in the case represented in FIG. 12) can be determined by considering the mass, the strength, and the dimensions of the alignment magnet 244, as well as the geometry of portion of the swing bucket 253 made of a ferromagnetic material, as well as other factors such as the distance and/or orientation between the alignment magnet 244 and the swing bucket 253.

The lift mechanism 242 can be transitioned from the second configuration to a third configuration, also referred to as the transfer to rotor configuration. In the transfer to rotor configuration the alignment magnet 244 is located at a third position and/or height, and a component, element, and/or part of the lift mechanism 242 such as a push pin 247 is disposed at a contact position and/or height in which the push pin 274 can contact a sample specimen container disposed on the swing bucket 253, as shown in FIG. 9C and further described herein. The transition of the lift mechanism 242 from the catch configuration to the transfer to rotor configuration can take place after the positioning component 240 has caused the swing bucket 253 to become symmetrically aligned with the alignment magnet 244 as described above. In some implementations, the positioning component 240 can determine that the swing bucket 253 has become symmetrically aligned with the alignment magnet 244 with the aid of the position sensor(s) 264 and the motor 254 of the centrifuge, as further described in detail herein. Once the swing bucket 253 has become symmetrically aligned with the alignment magnet 244, the lift mechanism 242 can be transitioned from the catch configuration to the transfer to rotor configuration. To do so, the linear electrical motor 243 can move the alignment magnet 244 in the vertical direction from the second position to the third position, and then the energy storage element can extend the push pin 247 in the vertical direction X to the contact position or height in which and end portion of the push pin 247 touches and/or contacts a sample specimen container disposed in the swing bucket 253, allowing the lift mechanism 242 to move the sample specimen container in the vertical direction X. During the transition from the catch configuration to the transfer to rotor configuration a surface of the alignment magnet 244 makes contact with a surface of the lower portion of the swing bucket 253 while the alignment magnet 244 is being moved from the second position to the third position. Moreover, the energy storage element 245 and/or the linear electric motor 243 can move the alignment magnet 244 further in the vertical direction X beyond the point in which the magnet 244 first makes contact with the lower portion of the swing bucket 253, effectively moving the swing bucket 253 vertically along its axial axis until reaching the third position. At the third position at least a portion of the swing bucket 253 has been moved away from the plane of rotation of the rotor 252, as shown in FIG. 9C. In some implementations, the energy storage element 245 and/or the linear electric motor 243 of the lift mechanism 242 can individually or collectively move the alignment magnet 244 while the alignment magnet 244 is in contact with the swing bucket 253 in the vertical direction until a sensor 248C (shown in FIG. 9C) detects the presence of the alignment magnet 244 and/or the swing bucket 253 at the third position.

As described above, when the lift mechanism 242 is in the transfer to rotor configuration the alignment magnet 244 is disposed in the third position, and an element, and/or part of the lift mechanism 242 such as a push pin 247 is located at a contact position and/or height. The push pin 247 can be directed and/or moved through the annular section of the alignment magnet 244 by the energy storage element 245 in the vertical direction X until the top portion of the push pin 247 reaches the contact position and/or contact height, as shown in FIG. 9C. In the contact position, the end portion of the push pin 247 is disposed partially penetrating the interior volume of the swing bucket 253 and becomes in contact with an end portion of a sample specimen container, when the sample specimen container is disposed inside the swing bucket 253. In some implementations, the contact position can be selected and/or predetermined such that a sample specimen container disposed inside the carrousel 220 can be moved along the vertical direction X a distance that is sufficient to cause the sample specimen container to be transferred from the chamber 221 of the carrousel 220 into the swing bucket 253. In some implementations, the linear electric motor 243 can move the alignment magnet 244 along the axis X until the sensor 248 C detects the presence of the alignment magnet 244 at the third position and sends a signal to the control unit 260 that causes the energy storage element 245 to extend the push pin 247 such that the push pin 247 assumes the contact position suitable to receive a sample specimen container from the carrousel 220. The sensor can be further configured to send a signal when the sensor detects that the push pin 247 has reached a predetermined position and/or height corresponding to the contact position described above. In some instances, the processing unit 200 can send a signal to open the gate 217 via the actuator 217A (shown in FIG. 5) to allow a sample specimen container to be transferred from the chamber 221 of the carrousel 220, placing an end portion of the sample specimen container in contact with the push pin 247 when the push pin 247 is in the contact position described above. After that, the lift mechanism 242 can be transitioned from the transfer to rotor position to the catch position with the purpose of loading the received sample specimen container into the centrifuge 250.

Figure 9D:
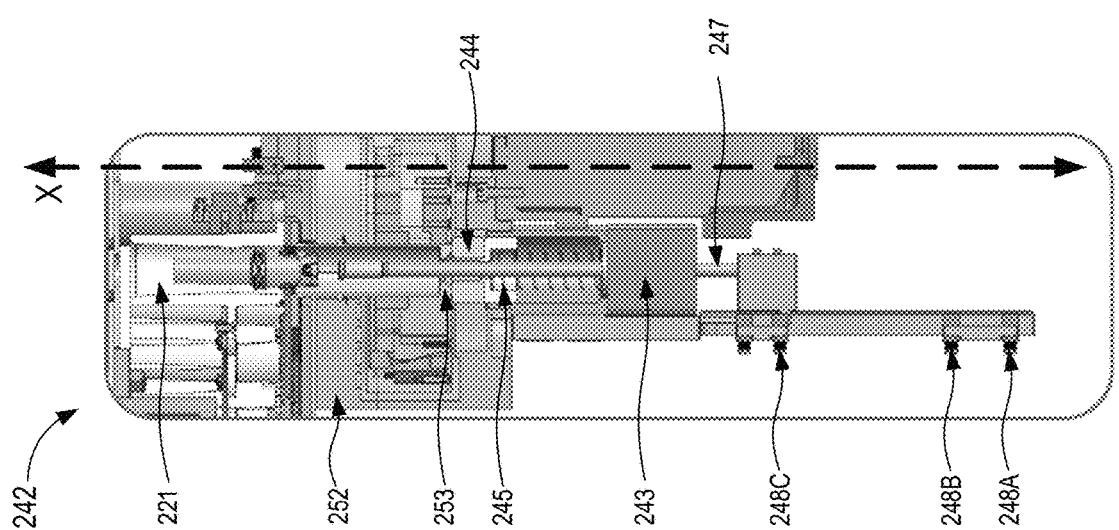

The lift mechanism can be transitioned from the third configuration to a fourth configuration, also referred to herein as the transfer from rotor configuration. In the transfer from rotor configuration, shown in FIG. 9D, the alignment magnet 244 remains in the third position described above, and the push pin 274 is disposed at a transfer position and/or height, as described herein. The energy storage component 245 can be configured to move the push pin 247 from the contact position to the transfer position. In the transfer position the push pin 247 has been further moved along the vertical axis X until penetrating a portion of the chamber 221 to facilitate transferring a sample specimen container from the chamber 221 of the carrousel 220 into the swing bucket 253. In some implementations, the movement of the push pin 247 from the contact position to the transfer position can be detected and/or controlled with the aid of a sensor 248D, shown in FIG. 9D. For example, in some implementations the energy storage element 245 can move and/or extend the push pin 247 along the vertical axis until the sensor 248D detects the presence of the end portion of the push pin 247 and sends a signal to the control unit 260. The sensor 248D can be configured to send the signal when the sensor 248D detects that the end portion of the push pin 247 has reached the transfer position and/or height described above, and the lower end portion of the sample specimen container is positioned above the port 216, as shown in FIG. 9D. In some implementations, the control unit 260 can send a signal to actuate and/or partially close the gate 217, such that the sample specimen container cannot be returned to the positioning component 240, while the push pin 247 remains in the transfer position. The control unit 260 can be further configured to send a signal to transition the lift mechanism 242 from the transfer portion back to the home position and then send a second signal to close the transferring component access gate 217 such that the sample specimen container is now disposed inside the transferring component and can be then moved to the storage compartment for storage.

The positioning component 240 can also include one or more sensor(s) 246. The sensor(s) 246 can be operably coupled to the rotor 252 of the centrifuge 250 and configured to detect and report the presence and/or the passage of the swing bucket 253 through a specific point or points along the circular trajectory defined by the rotor 252 of the centrifuge. As shown in FIG. 11, in some implementations, the positioning component 240 can include two sensors (e.g., sensor 246A and sensor 246B) disposed along the perimeter of the rotor 252. The sensors 246A and 246B can be configured to determine the resting position of the swing bucket 253 along the circular trajectory of the rotor 252 either after a centrifugation procedure, or prior to one centrifugation procedure, as further described herein. The sensors 246A and 246B can also be referred to as catch sensor 246A and trigger sensor 246B, in accordance with their intended functionality. In some implementations the catch sensor 246A can be disposed adjacent to the perimeter of the rotor 252, at a position that is diametrically opposite to the position of the lift mechanism 242, and more specifically the position of the alignment magnet 244, as shown in FIG. 10. Said in other words, the catch sensor 246A can be disposed at a position adjacent to the perimeter of the rotor 252, with the position being connected to the position of the alignment magnet 244 by a straight line that passes through the center 255 of the centrifuge (e.g., the center of the alignment magnet 244, the center 255 of the centrifuge 250, and the catch sensor 246A are connected by a straight diameter line). The trigger sensor 246B can be disposed at any suitable position adjacent to the perimeter of the rotor 252. In some implementations, the trigger sensor 246B can be disposed at a position adjacent to the perimeter of the rotor 252 defining a short angular distance θ as shown in FIG. 11. The angular distance θ can be defined such that if the swing bucket 253 is disposed within the space defined by the angular distance θ, the alignment magnet 244 has sufficient strength to interact with the low portion of the swing bucket 253 and drive the swing bucket 253 into symmetric alignment with the alignment magnet 244, as described above. In some implementations, the angular distance θ between the catch sensor 246A and the trigger sensor 246B can be at least about 20°, at least about 30°, at least about 40°, at least about 50°, at least about 60°, at least about 70°, at least about 80°, inclusive of all values and ranges therebetween. In some implementations, the angular distance θ between the catch sensor 246A and the trigger sensor 246B can be no more than 15°, no more than 20°, no more than 25°, no more than 35°, no more than 40°, no more than 45°, no more than 50°, no more than 55°, no more than 60°, no more than 65°, no more than 70°, no more than 75°, no more than 80°, no more than 90°, no more than 350 inclusive of all values and ranges therebetween.

The catch sensor 246A and the trigger sensor 246B can be any suitable type of sensor, including, but not limited to hall effect sensor, capacitive displacement sensor, eddy-current sensor, inductive sensor, laser doppler vibrometer optical sensor, linear variable differential transformer (LCDT) sensors, photodiode array sensors, piezoelectric transducer sensors, and the like. For example, in some implementations the catch sensor 246A and trigger sensor 246B can be Hall effect sensors, configured to detect a signal initiated by a small signal magnet 247. The magnet 247 can be disposed on the perimeter of the rotor 252 at a position defined by a diameter line that connects the catch sensor 246A, the center 255 of the centrifuge and the center of the alignment magnet 244, as shown in FIG. 10. The Hall effect catch sensor 246A and trigger sensor 246B can detect the position of the swing bucket 253 by detecting the magnetic field of the signal magnet 247 as the signal magnet spins with the rotor and passes in close proximity of the catch sensor 246A and the trigger sensor 246B.

The resting position of the swing bucket 253 either before and/or after a centrifugation procedure can be described as corresponding to one of two possible scenarios: a first scenario or a second scenario. In the first scenario, the resting position of the swing bucket is in very close or sufficient proximity to the position in which the signal magnet 247 interacts with catch sensor 246A (as shown in FIG. 10). In that first scenario, the position of the swing bucket becomes known, and the control unit 260 can send signals to position of the alignment magnet 244 can be changed and/or adjusted accordingly with the purpose of drawing the swing bucket into symmetric alignment due to the interaction of the alignment magnet 244 with the paramagnetic and/or ferromagnetic low-end portion of the swing bucket 253.

In the second scenario the resting position of the swing bucket may be far or outside a sufficient proximity from the position in which the signal magnet 247 interacts with the catch sensor 246A and/or the trigger sensor 246B. In that second scenario, the motor 254 of the centrifuge 250 can be activated to move the rotor 252 of the centrifuge 250 at the lowest possible speed until the trigger sensor 246B detects the signal of the signal magnet 247. When the trigger sensor 246B detects the signal of the signal magnet 247, a signal can be sent to the control unit 260, and in response the control unit can cut power to the motor 254 of the centrifuge 250, letting the rotor 252 of the centrifuge 250 to simply coast within the space defined by the angular distance θ. As described above, when the swing bucket 253 is disposed within the space defined by the angular distance θ, the alignment magnet 244 can be raised and the resulting magnetic field is strong enough to drive and/or move the swing bucket 253 into symmetric alignment, enabling the loading and unloading of sample specimen containers.

The centrifuge 250 can be any suitable device configured to apply a centrifugal force to separate the contents of a biological sample contained in a sample specimen container. As shown in FIGS. 8, 10 and 11, the centrifuge 250 can include a rotor 252 and a motor 254. The rotor 252 can be configured to receive and/or hold a sample specimen container during centrifugation. More specifically, in some implementations the rotor 252 can include at least one swing bucket 253 that can accommodate sample specimen containers. The swing buckets 253 allow accommodating the sample specimen containers in the centrifuge and facilitate disposing the sample specimen containers in different orientations throughout the centrifugation process. That is, the swing bucket 253 can be rotated with respect to the rotor 252 to facilitate orienting the sample specimen containers as needed during the centrifugation process. For example, in some implementations the swing buckets 253 can receive a sample specimen container in a first orientation. In the first orientation the sample specimen container is disposed in the swing bucket 253 such that the major axis of the sample specimen container is parallel to the axis of centrifugation (e.g., the sample specimen container is received in a vertical orientation assuming that the axis of centrifugation is normal to the ground). The swing bucket can transition the sample specimen container from the first orientation to a second orientation during centrifugation. In some implementations the swing bucket can transition the sample specimen container to a second orientation in which the sample specimen container is disposed at an angle $\alpha$ with respect to the axis of centrifugation. In some implementations the angle $\alpha$ can assume any suitable value between 0 and 90° ($0<\alpha<90°$) with the angle $\alpha$ being defined with respect to the axis of centrifugation. For example, in some implementations the swing bucket 253 can transition the sample specimen container from the first orientation to a second orientation, with the second orientation being defined such that the sample specimen container is disposed at an angle of about 45° with respect to the axis of centrifugation. In other implementations the swing bucket 253 can orient the sample specimen container at an angle of about 90° with respect to the axis of centrifugation (e.g., the swing bucket 253 is oriented horizontally during centrifugation, assuming that the axis of centrifugation is normal with respect to the ground).

The motor 254 of the centrifuge 250 can be any suitable motor configured to cause rotation of the rotor 252. For example, in some embodiments the motor 254 can be a brushed DC motor, a brushed permanent magnet DC motor, a brushless DC motor, a permanent magnet DC brush motor, a synchronous AC motor, an induction AC motor, a servo motor or the like. In some implementations the motor 254 can include an AC motor comprising a variable frequency drive (VFD) configured to control the operation of the motor 254 by controlling the ration of frequency and voltage supplied to the motor 254. The VFD facilitates adjusting the speed and torque output of the motor, enabling the operation of the centrifuge under different conditions and/or profiles required to separate components of the biological sample disposed on the centrifuge. In some implementations, the motor 254 can be operationally coupled the control unit 260 to control and/or modify its operation, as further described herein.

Figure 4:
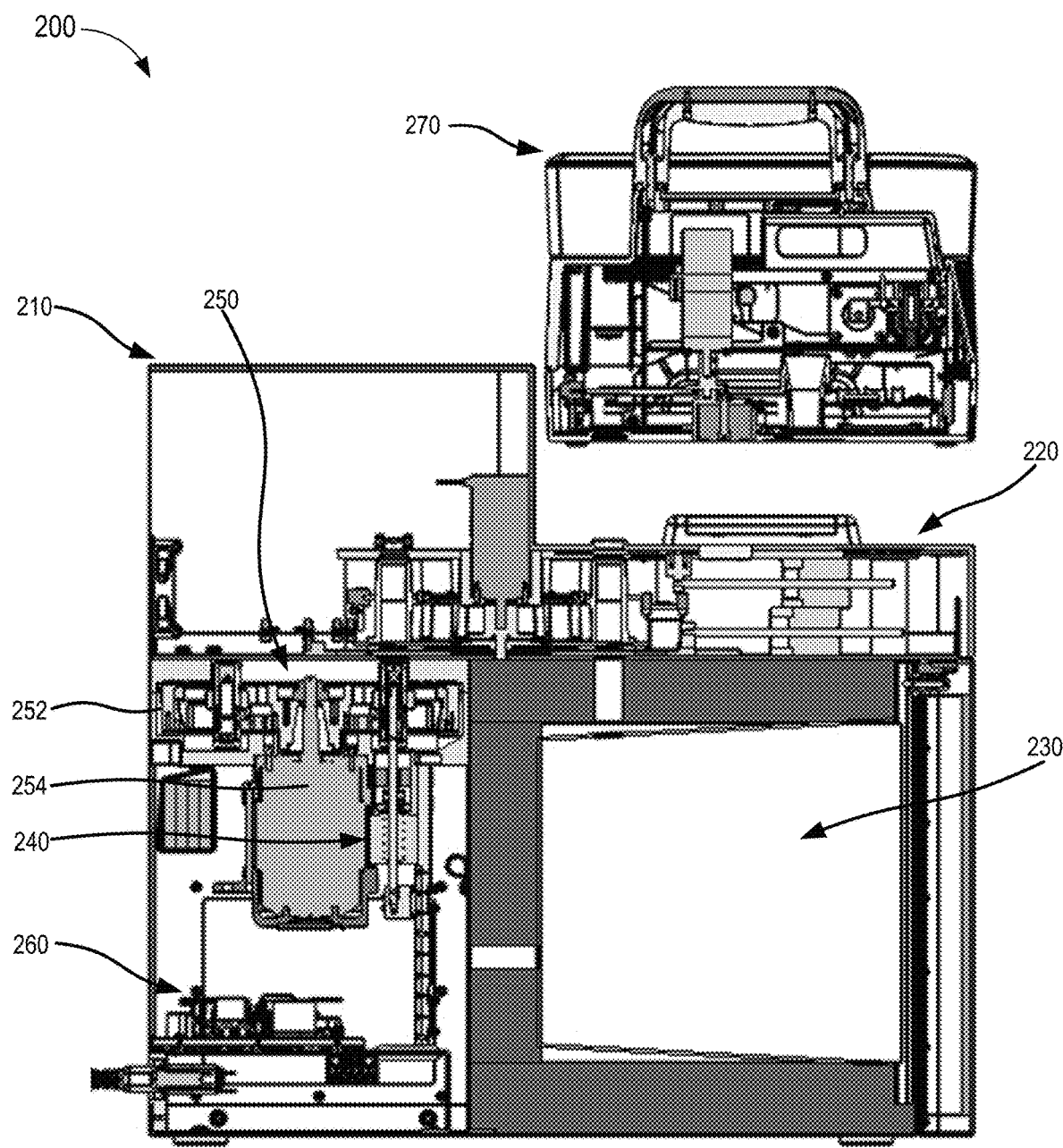
FIG. 4 is a cross-sectional side view of the sample processing unit of FIG. 2.

The control unit 260 can be configured to activate and/or control the operation of one or more components of the processing unit 200, e.g., by receiving electrical signal(s) from and/or sending electrical signal(s) to other components of the processing unit 200. In some implementations, the control unit 260 can be disposed and/or contained within the housing 210 of the processing unit 200, as shown in FIG. 4. The control unit 260 can include a memory 262, a processor 264, and an input/output (I/O) device 266.

The memory 262 can be, for example, a random-access memory (RAM), a memory buffer, a hard drive, a database, an erasable programmable read-only memory (EPROM), an electrically erasable read-only memory (EEPROM), a read-only memory (ROM), and/or so forth. In some implementations, the memory 262 can store instructions that cause processor 264 to execute modules, processes, and/or functions associated with operating one or more components of the processing unit 200. Such instructions can be designed to integrate specialized functions into the control unit 260.

The processor 264 of control unit 260 can be any suitable processing device configured to run and/or execute functions associated the processing unit 200. For example, processor 264 can be configured to process and/or analyze sensor data received from one or more sensor(s) disposed in the processing unit 200 to measure and/or detect, for example, the positions of various components of the processing unit 200 such as the rotor 252, a swing bucket 253 of the centrifuge 250, and/or any of the gates coupled to the ports that communicate the carrousel 220 with the storage compartment 230, and/or the positioning component 240. The processor 264 can receive and analyze the sensor data and generate one or more signals for activating the one or more gates to facilitate transporting and/or transferring of sample specimen containers between components of the processing unit 200, and/or adjust one or more parameters of the motor 254 (e.g., rotational speed, torque, time of centrifugation, etc.). In some implementations, the processor 264 can be a general-purpose processor, a Field Programmable Gate Array (FPGA), an Application Specific Integrated Circuit (ASIC), a Digital Signal Processor (DSP), and/or the like. The control unit 260 can be similar to and/or substantially similar to the control unit 160. Consequently, the control unit 260 will not be described in further detail herein.

Figure 13:
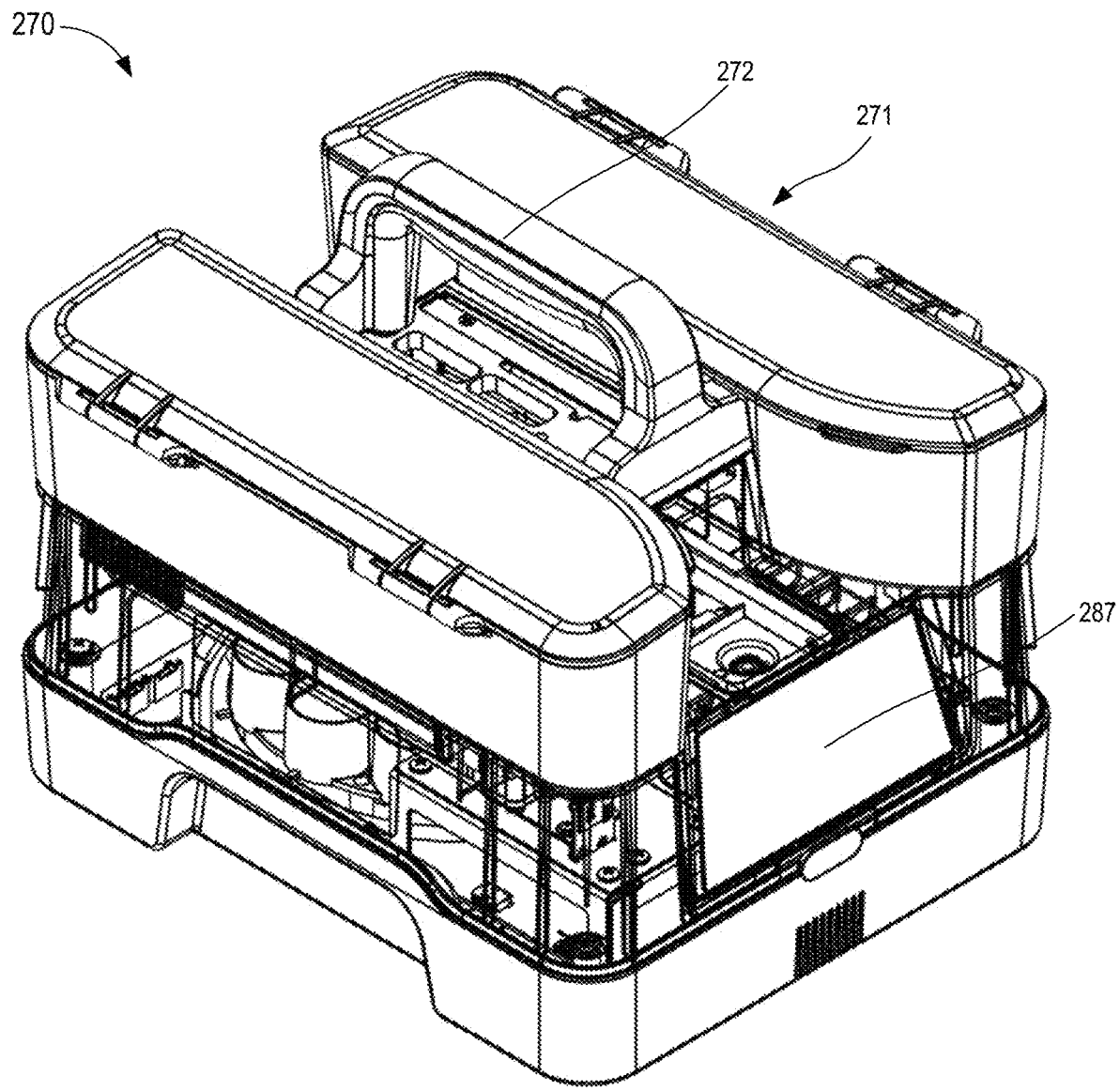
FIG. 13 is a perspective view of a sample preparation component of the sample processing unit of FIG. 2.

FIG. 13 shows the sample preparation component 270 as a standalone device, and/or unit that can be removably coupleable to the processing unit 200. The sample preparation component 270 can be configured to receive biological samples contained in sample specimen containers, conduct one or more sample processing steps, and/or transfer the sample specimen containers to the carrousel 220 for sample centrifugation and/or storage at a predetermined temperature. The sample preparation component 270 can be configured to receive and accommodate sample specimen containers from a user and/or technician and then direct the received sample specimen containers to one or more subcomponents of the sample preparation component 270 configured to, for example, (1) scan and/or read a label (or any other suitable identifier) of the sample specimen containers to identify information associated with the biological sample contained in each sample specimen container, (2) conduct any suitable processing step to adequately mix reagents and/or additives included in the sample specimen container including, for example, shaking, rocking, inverting, stirring, vibrating or the like, (3) hold the sample specimen containers for a predetermined period of time, and/or (4) transfer the sample specimen container to the carrousel 220 such that the carrousel 220 can direct the sample specimen container to the storage compartment 230 and/or to the centrifuge 250. In some instances, the sample preparation component 270 can receive sample specimen containers when the sample preparation component 270 is not mechanically coupled, attached and/or docked to the processing unit 200. In such instances, the sample preparation component 270 can receive the sample specimen containers, conduct one or more sample processing steps such as those described above, and then transfer the sample specimen containers to the carrousel 220. The carrousel 220 can then direct the sample specimen containers to the centrifuge for centrifugation and/or to the storage compartment 230 for storage at a predetermined temperature when the sample preparation component 270 is and/or becomes coupled to the housing 210 of the processing unit 200. In other instances, the sample preparation component 270 can receive sample specimen containers when the sample preparation component 270 is mechanically coupled, attached and/or docked to the housing 210 of the processing unit 200. In such instances, the sample preparation component 270 can receive the sample specimen containers, conduct the one or more sample processing steps, and then transfer the sample specimen containers to the carrousel 220 immediately after completing the processing steps.

The sample preparation component 270 includes multiple subcomponents including a and enclosure, casing, and/or housing 271, a scanner 275, a mixer 280, a transferrer 285, also referred to herein as a carrousel 285, and controller 287, as shown in FIGS. 13-16. The enclosure, casing, and/or housing 271 can define one or more interior volumes, enclosures, and/or compartments suitable for accommodating (e.g., housing, containing, supporting, etc.) the subcomponents of the sample preparation component 270. The enclosure, casing, and/or housing 271 can define one or more interfaces that provide mechanical support and allow coupling the sample preparation component 270 to other devices such as the processing unit 200. In some implementations the enclosure, casing, and/or housing 271 can be any suitable shape or configuration. For example, the enclosure, casing, and/or housing 271 can be a shape defined by a square and/or rectangular cross-sectional area and suitable length and/or height. The enclosure, casing, and/or housing 271 can include one or more features that enable a user and/or technician to manually carry the sample preparation component 270. For example, as shown in FIG. 13, the enclosure, casing, and/or housing 271 can include one or more handles 272 disposed on an external surface of the enclosure, casing, and/or housing 271 such that a technician and/or user can use them to lift, carry, and/or transport to and/from a site where sample specimen containers are being collected and/or processed (e.g., a retail ample collection point).

The enclosure, casing, and/or housing 271 can include at least one opening, aperture, slot, and/or port 273 disposed on one or more external surfaces of the enclosure, casing, and/or housing 271, and sized and configured to receive and/or load sample specimen containers comprising biological samples into the sample preparation unit 270. FIG. 14 shows a cross-sectional view of the enclosure, casing, and/or housing 271 including a round and/or circular port 273 disposed on an external surface of the enclosure, casing, and/or housing 271 and characterized by a diameter that is slightly larger than a maximum diameter of the sample specimen containers, such that the sample specimen containers are received and/or introduced in the enclosure, casing, and/or housing 271 according to a vertical upright orientation. In the vertical upright orientation, the sample specimen containers are received with their axial axis aligned perpendicular to the ground and/or surface in which the sample preparation component 270 and/or the processing unit 200 is disposed on, with the cap being disposed above the closed end of the tube (e.g., upright). In some instances, the port 273 can receive the sample specimen containers in the vertical upright orientation when the sample preparation component 270 is not mechanically coupled, attached and/or docked to the housing 210 of the processing unit 200. In other instances, the port 273 can receive the sample specimen containers in the vertical upright orientation when the sample preparation component 270 is mechanically coupled, attached and/or docked to the housing 210 of the processing unit 200. In some embodiments, the port 273 can be disposed above a holder 281 of the mixer 280 configured to hold and/or secure the sample specimen containers in the vertical upright orientation when the sample specimen containers are loaded into the sample preparation component 270, as further described herein.

FIG. 14 also shows that the enclosure, casing, and/or housing 271 includes at least one port 274 disposed on an external surface of the sample preparation component 270. The port 274 can be configured to be aligned and coupled with an equally sized port of the processing unit 200 such that when the sample preparation component 270 is coupled to the processing unit 200, sample specimen containers can be transferred and/or transported from the sample preparation component 270, through the port 274 and into the processing unit 200. In some implementations the port 274 can be aligned and/or overlapped with the port 212 of the processing unit 200, as shown in FIG. 2, such that sample specimen containers can be directed automatically (e.g., without human intervention) via the port 274 from the sample preparation component 270 and into the processing unit 200. In some implementations, the port 274 can be configured to facilitate directing the sample specimen containers from the sample preparation component 270 to the processing unit 200 in an inverted orientation in which the cap of the containers is being disposed below the closed end of the tube, as further described herein. In some implementations the port 274 can include a gate configured to transition between a closed configuration in which the gate obstructs the port 274, preventing the transfer of sample specimen containers, and an open configuration in which the gate does not obstructs the port 274 and facilitates introducing and/or loading sample specimen containers into the processing unit 200. In some implementations the gate of the port 274 can be electrically and/or operatively coupled to the control unit 260 of the processing unit 200 and/or the controller 287 of the sample preparation component 270 such that the control unit 260 and/or the controller 287 can activate and/or control the operation of the gate.

The scanner 275, shown in FIGS. 14 and 15 can include any electronic device configured to scan, read, or otherwise identify a machine-readable code. For example, in some implementations the scanner 275 can include a barcode reader with a scanning unit and a communications unit (not shown). The scanning unit can be configured to scan and/or read a label and/or identifier of the specimen container. The communications unit can be configured to transmit the scanned label and/or identifier to the control unit 260. Alternatively and/or additionally, in some embodiments the communications unit can transmit the scanned label and/or identifier to the controller 287 of the sample preparation component 270, when the sample preparation component 270 is not mechanically coupled to the processing unit 200. The controller 287 can record a time that a sample specimen container is being held by the sample preparation component 270, as further described herein. In some implementations the scanner 275 can be operably coupled and/or integrated with the control unit 260 of the processing unit 200. In such implementations, the control unit 260 can control the operation of the scanner 275 to identify information of the label and/or identifier and implement a set of instructions to process the sample based on the information associated with the scanned label and/or identifier. Alternatively, and/or complementary, in some implementations the scanner 275 can be operably coupled and/or integrated with the controller 287 to identify information of the label and/or identifier and implement a set of instructions to process the sample based on the information of the label and/or identifier. Additionally, the controller 287 can also send a set of instructions to the processor 264 of the control unit 260 to process the sample based on the information associated with the scanned label and/or identifier. As previously described with respect to the sample preparation component 170, the identifier can contain information encoded therein related to the sample specimen container and/or the capillary blood sample contained therein. For example, in some implementations the information encoded can include a shape, color, material, and/or other characteristic of the sample specimen container, a volume of biological sample contained in the sample specimen container, or an amount of specific reagents and/or additives included in the sample specimen container. In other implementations, the information encoded in the identifier can be a "type of sample". In such implementations, each "type of sample" can be associated with a predetermined set of processing steps and/or instructions stored in the controller 287 that a sample specimen container need to be subjected to. In some implementations, the sample preparation component 270 can also be configured to be operationally coupled to a separate handheld computing device (not shown), such as a smartphone or some other handheld reader. The handheld computing device may include a camera that captures an image of the identifier, and software that can associate the captured information from the scanned sample specimen container with the stored information or a reference.

The mixer 280 of the sample preparation component 270 can be any suitable device configured to actuate the specimen containers to adequately mix reagents and/or additives included in the sample specimen containers. In some implementations, the mixer 280 can be configured to, for example, shake, rock, inverting, stir, vibrate a sample specimen container to mix chemical additives and/or reagents with the biological sample included in the sample specimen container. In some instances, the mixer 280 can be configured to invert a sample container and hold the sample specimen container in a predetermined orientation for a predetermined amount of time to ensure that the biological sample contained in the sample specimen container can undergo one or more desired chemical and/or physical changes.

As shown in FIG. 15, the mixer 280 can include a holder 281 configured to hold a sample specimen container and an actuator 282 mechanically coupled to the holder 281 and configured to move and/or actuate the holder 281 into different positions in order ensure adequate mixing of chemical reagents and/or additives with the biological sample contained in the sample specimen container. In some implementations the holder 281 and the actuator 282 can be configured to move the sample specimen to mix chemical additives and/or reagents contained in the sample preparation component 270 according to a predetermined procedure. For example, in some implementations the actuator 282 can cause the holder 281 to repeatedly change a position of a sample specimen container a set number of times or for a set period of time, such as by inverting the sample specimen container about the rotation axis R, as shown in FIG. 15. The inversion of the sample specimen container containing a biological sample such as a blood sample, may be performed for several purposes including: (1) initiating clotting by encouraging mixing of blood with a coagulant, (2) preventing clotting by encouraging mixing of blood with an anticoagulant, or (3) improving preservation by encouraging mixing of blood with a preservative. It is worth noticing that although the mixer 280 can be configured to invert a sample specimen container, the mixer 280 can be configured to execute multiple procedures for mixing reagents and/or additives included with a biological sample, including, but not, limited to sonication, ultrasonication, vortexing, vibration mixing, rocking, shaking, stirring and the like.

The transferrer 285 can be configured to receive sample specimen containers which have been scanned and/or mixed as described above. The transferrer 285 can receive one or more sample specimen containers from the mixer 280, temporarily store the received sample specimen containers, and/or transfer, direct, or transport the received sample specimen container to the carrousel 220 for centrifugation and/or storage at a predetermined temperature. FIG. 14 shows the transferrer 285, also referred to as carrousel 285, can be configured to receive at least a sample specimen container from the mixer 280, with the sample specimen container being received inverted (e.g., an inverted orientation in which the cap of the container is being disposed below the closed end of the tube and against the floor of the carrousel 285. The carrousel 285 can be used to hold sample specimen containers for a period of time, prior to transferring the sample specimen containers to the carrousel 220 for further processing. In some embodiments, the period of time can be The carrousel 285 can be similar to the carousel 220 described above with reference to the processing unit 200, Consequently, the carrousel 285 will not be further discussed herein.

The controller 287 can be configured to activate and/or control the operation of one or more subcomponents of the sample processing unit 270, e.g., by receiving electrical signal(s) from and/or sending electrical signal(s) to other subcomponents of the sample processing unit 270. The controller 287 can be similar to and/or substantially the same as the control unit 260 described above. Consequently, the controller 287 will not be described in further detail herein.

In use, the processing unit 200 can be employed to receive biological samples (e.g., capillary blood samples) and conduct one or more processing steps such as mixing reagents, holding the samples for a period of time after mixing reagents and prior to centrifugation to allow physical and/or chemical transformations to take place, centrifuging the sample, and/or storing the samples until they are transferred to a laboratory for further analysis. For example, in some instances, a medical professional can collect a biological sample using a sample specimen container, and transfer and/or load the sample specimen container on the sample preparation component 270 via the port 273 of the processing unit 200.

In some instances, the sample specimen container can be received by the sample preparation component 270 when the sample preparation component 270 is mechanically coupled to the processing unit 200 (e.g., the sample preparation component 270 is docketed to the processing unit 200 as shown in FIG. 3). In such instances, the sample specimen container can be received in the mixer 280 of the sample preparation component 270. The scanner 275 can be disposed adjacent to and/or in the vicinity of the mixer 280 (as shown in FIG. 15) such that the scanner 275 can scan the identifier of the sample specimen container can be (e.g., by rotating the sample specimen container to read an identifier disposed on the side wall of the sample specimen container). The communications unit of the scanner 275 (not shown) can then transmit instructions and/or information encoded in the identifier to the control unit 260 of the processing unit 200 and/or to the controller 287 (e.g., a "type of sample," and/or a set of instructions for processing the sample specimen container as described above with reference to the processing unit 100. The control unit 260 and/or the controller 287 can be configured to receive, store and/or execute the instructions and/or information transmitted by the communications unit. For example, the control unit 260 or the controller 287 can send signals to the mixer 280 of the sample preparation component 270 for conducting one or more sample mixing step(s) encoded in the identifier of the sample specimen container. In some implementations the mixer 280 can be configured to shake, rock, invert, vortex, agitate, stir, sonicate, and/or vibrate a sample specimen container to mix chemical additives and/or reagents with the biological sample included in the sample specimen container, based on the information encoded on the identifier of the sample specimen container. For example, the mixer 280 can be configured to change a position of the sample specimen container a set number of times. The mixer 280 can change a position of the sample specimen container such as by inverting the sample specimen container about a rotation axis R, shown in FIG. 15. Inverting the sample specimen container may be performed for several purposes, which may include: 1) initiate clotting by encouraging mixing of blood with coagulant, 2) prevent clotting by encouraging mixing of blood with anticoagulant, or 3) improve preservation by encouraging mixing of blood with preservative. Inversion is therefore used to encourage the mixing of the blood with an additive that may be present in the sample container. In some instances, the mixer 280 can be configured to agitate the contents of the sample specimen container by changing a position of the sample specimen container without specifically inverting the sample container (e.g., changing the position of the sample specimen container by a fraction of one inversion). More specifically, the mixer 280 can be configured to change a position of the sample specimen container about the rotation axis R from a first position in which the axial axis of the sample specimen container assumes a first orientation, and a second position in which the axial axis of the sample specimen container assumes a second orientation, with the first and the second orientations defining an angle which is smaller than 180 degrees (e.g., performing a fraction of an inversion). The control unit 260 can also send signals to the mixer 280 to release and dispose the sample specimen container on the carrousel 285 after changing the position of the sample specimen container for a set number of times, such that the transferrer can immediately direct and/or move the sample specimen container to the carrousel 220 of the processing unit 200 via the port 274, shown in FIG. 14.

In other instances, the sample specimen container can be received by the sample preparation component 270 when the sample preparation component 270 is not mechanically coupled to the processing unit 200. For example, when the processing unit 200 is kept on a stationary location (e.g., inside a car, an office space, a centralized location, or the like), and the sample preparation component 270 is decoupled from the processing unit 200 and taken by a medical professional to collected multiple samples (e.g., for example at a retail collection environment, a residence of a patient, etc.). In such instances, the sample specimen container can be received in the mixer 280 of the sample preparation component 270. The scanner 275 can be used to scan and/or read the identifier of the sample specimen container (e.g., by rotating the sample specimen container to read an identifier disposed on the side wall of the sample specimen container). The communications unit can then transmit the instructions and/or information encoded in the identifier to the controller 287 of the sample preparation component 270. The controller 287 can be configured to receive, store, and/or execute the instructions and/or information transmitted by the communications module at least until the sample preparation component 270 becomes coupled to the processing unit 200. For example, the controller 287 can send signals to the mixer 280 of the sample preparation component 270 for conducting the one or more sample mixing step(s) encoded in the identifier of the sample specimen container, as described above. The controller 287 can also send signals to place the sample specimen container in the carrousel 285 after completing the mixing step(s); and keep the sample specimen container stationary in the carrousel 285 until the sample preparation component 270 becomes mechanically coupled to the processing unit 200 (e.g., the sample preparation component 270 is docketed to the processing unit 200). Once, the sample preparation component 270 is docketed on the processing unit 200, the carrousel 285 can direct and/or move the sample specimen container to the carrousel 220 of the processing unit 200. It is worth noting that keeping the sample specimen container stationary as described above, is intended to signify and/or denote avoid subjecting the sample specimen container to mixing movements similar to those described above with reference to the mixer 280 (e.g., shaking, rocking, inverting, vortexing, agitating, stirring, sonicating, and/or vibrating the sample specimen container). In some instances, while the sample specimen container is being kept stationary (e.g., by not subjecting the sample specimen container to mixing movements), the sample specimen container can be gently moved and/or transported when, for example, a new sample specimen container is loaded and/or received in the carrousel 285 and/or when other samples are transferred into and out of the centrifuge 150. Alternatively, in some implementations, the sample specimen container can be subjected to a predetermined movement (e.g., a rocking movement, an agitating movement, or the like) during the sample conditioning time to prevent settling of components included in the sample specimen container.

The control unit 260 of the processing unit 200 can be configured to record one or more periods of time that the sample specimen container is kept in the different components of the processing unit 200 and/or while the sample is being processed (e.g., on the scanner 275, the mixer 280, the carrousel 285 and/or the carrousel 220). For example, the control unit 260 can record the amount of time that a sample specimen container is kept in the processing unit 200 since it is first received by the sample preparation component 270, until it is transferred by the carrousel 220 to the storage compartment 230 for storing. This amount of time can be referred to as the total sample processing time. The control unit 260 can also record an amount of time that a sample specimen container is kept in the sample preparation component 270 and in the carrousel 220. This period of time can be referred to as the "sample conditioning time." The sample conditioning time includes the time that the sample specimen container is kept in the mixer 280 starting after the mixing of reagents is completed, the carrousel 285 (e.g., when the sample preparation component 270 is not coupled to the processing unit 200), and any additional time that the sample specimen container may need to be kept stationary in the carrousel 220 to ensure completion of any physical and/or chemical process between the blood sample and chemical reagents and/or additive include in the sample specimen container, prior to transporting and/or transferring the sample specimen container to the centrifuge 250 for centrifugation or to the storage compartment 230 for storage.

During the sample conditioning time, the sample specimen container can be held and/or kept stationary in the carrousel 285 and/or the carrousel 220 following the mixing step(s) and prior to the sample's centrifugation in the centrifuge 250 and/or storage in the storage compartment 230. It is worth noting that the amount of time that a sample specimen container remains stationary in the carrousel 285 of the sample preparation component 270 and/or the carrousel 220 (depending on whether the sample preparation component 270 is coupled or not to the processing unit 200 when first receiving the sample specimen container) can be associated with an amount of time needed to ensure completion of one or more physical and/or chemical transformations between the blood sample and any added reagents and/or additives disposed in the sample specimen container (e.g., sample conditioning). For example, in some instances the sample conditioning time can include an amount of time that the sample specimen container is kept stationary in the carrousel 285 of the sample preparation component 270 and/or the carrousel 220 to ensure the blood sample interacts with a coagulant included in the sample specimen container, for clotting of the blood sample. As described above, in such instances the sample conditioning time can also be referred to herein as the sample clotting time. In other instances, the sample conditioning time can include an amount of time that the sample specimen container is kept stationary in the carrousel 285 of the sample preparation component 270 and/or the carrousel 220 to ensure the blood sample interacts with an anticoagulant and stabilizes the blood sample. In yet other instances, the sample conditioning time can include an amount of time that the sample specimen container is kept stationary in the carrousel 285 of the sample preparation component 270 and/or the carrousel 220 to ensure the blood sample interacts with a preservative, preventing degradation of the blood sample. In some implementations, the processing unit 200 can be configured to adjust the sample conditioning time based on environmental factors being measured and/or monitored the processing unit 200 such as, for example, environmental temperature, and/or intensity of external vibrations exerted on the processing unit 200 (e.g., when the processing unit 200 is kept in a mobile laboratory and/or vehicle). In such implementations, the control unit 260 and/or the controller 287 can be configured to receive signals and/or data representative of environmental factors being monitored such as an environmental temperature and/or intensity of vibrations; and adjust, based on the received data, the sample conditioning time.

In some implementations, the identifier of a sample specimen container can include the sample conditioning time required for that particular sample specimen container. In that way, the sample processing unit 270 can scan and/or read the identifier of the sample specimen container and send to the control unit 260 the information and/or instructions encoded in the identifier. The control unit 260, in response to receiving the information and/or instructions encoded in the identifier, can send signals to the carrousel 285 of the sample processing unit 270 and/or the carrousel 220 to keep the sample specimen container for a period of time required to complete and/or match the sample processing time encoded in the identifier.

In some implementations, the identifier of a sample specimen container can include information that can be used to determine the sample conditioning time for that particular sample specimen container. The sample conditioning time can be determined based on the information encoded on the identifier of the sample specimen container. For example, information encoded in the identifier such as the total volume of blood contained in the sample specimen container, the amount of reagents (e.g., coagulant) added to the sample specimen container, and the instructions to mix the reagents added (e.g., the number of times and/or the period of time the sample specimen container is mixed, stirred, inverted, etc.) can be used to determine the period of time required for the blood in the sample specimen container to complete clotting.

Figure 17:
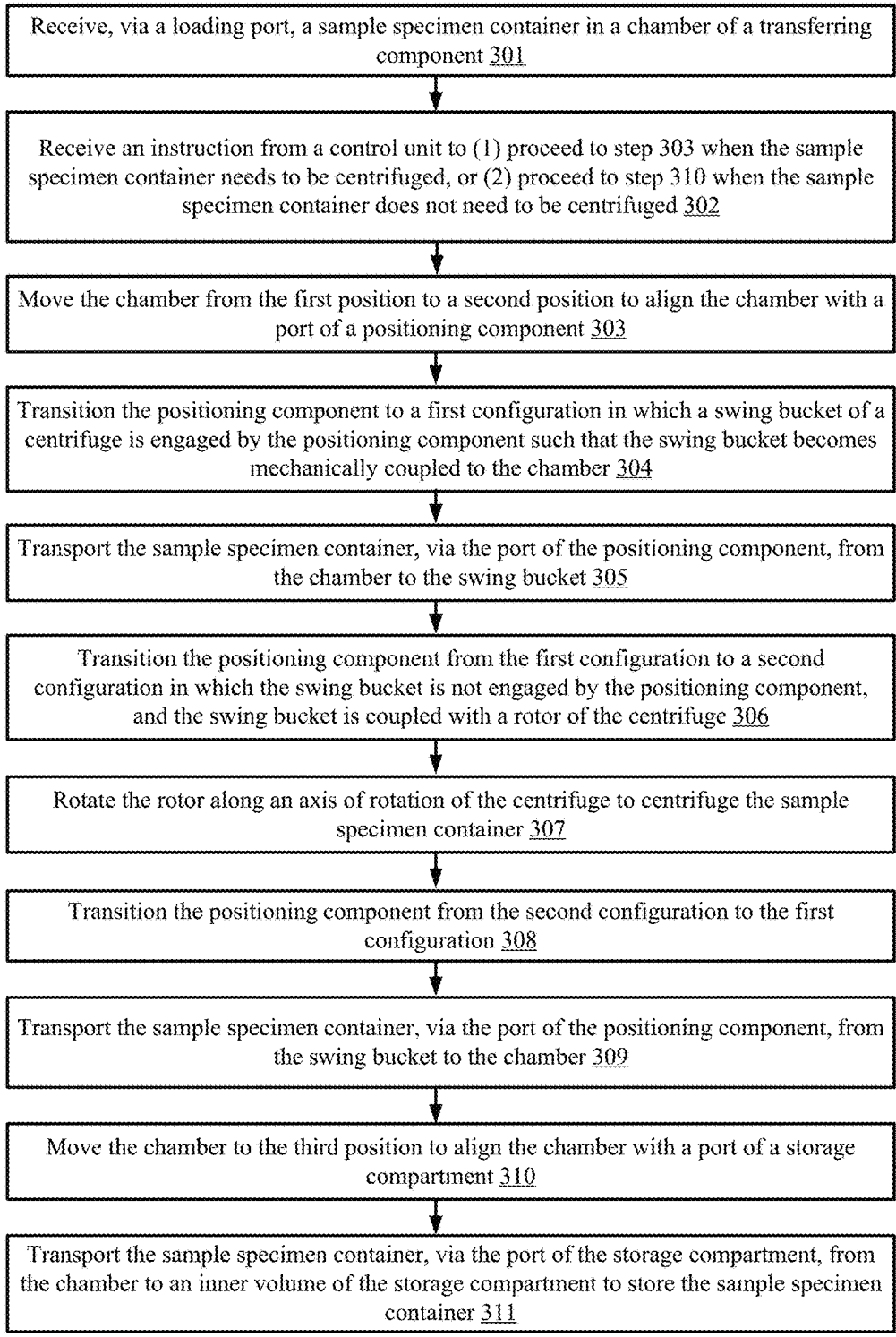
FIG. 17 is a flowchart schematically illustrating an example method of using a sample processing unit to centrifuge and store a biological sample contained in a sample specimen container, according to an embodiment

FIG. 17 is a flowchart schematically illustrating an example method 300 of using a sample processing unit such as those described herein to centrifuge and/or store a sample specimen container. The method 300 includes receiving, via a loading port, a sample specimen container in a chamber of a transferring component at 301. The sample specimen container can include a biological sample including, for example, a capillary blood sample, which requires to be centrifuged and/or stored for further analysis in a laboratory. The method further includes receiving an instruction from a control unit to (1) proceed to step 303 when the sample specimen container needs to be centrifuged, or (2) proceed to step 310 when the sample specimen container does not need to be centrifuged at 302.

At 303, the method includes moving the chamber from the first position to a second position to align the chamber with a port of a positioning component. The method further includes transitioning the positioning component to a first configuration in which a swing bucket of a centrifuge is engaged by the positioning component such that the swing bucket becomes mechanically coupled to the chamber, at 304. At 305, the method includes transporting the sample specimen container, via the port of the positioning component, from the chamber to the swing bucket. At 306, the method includes transitioning the positioning component from the first configuration to a second configuration in which the swing bucket is not engaged by the positioning component, and the swing bucket is coupled with a rotor of the centrifuge.

The method further includes rotating the rotor along an axis of rotation of the centrifuge to centrifuge the sample specimen container at 307. The method further includes transitioning the positioning component from the second configuration to the first configuration at 308. At 309, the method includes transporting the sample specimen container, via the port of the positioning component, from the swing bucket to the chamber. The method further includes moving the chamber to the third position to align the chamber with a port of a storage compartment at 310, and at 311 the method includes transporting the sample specimen container, via the port of the storage compartment, from the chamber to an inner volume of the storage compartment to store the sample specimen container.

While various embodiments have been described above, it should be understood that they have been presented by way of example only, and not limitation. While the embodiments have been particularly shown and described, it will be understood that various changes in form and details may be made. Where schematics and/or embodiments described above indicate certain components arranged in certain orientations or positions, the arrangement of components may be modified. Although various embodiments have been described as having particular features and/or combinations of components, other embodiments are possible having a combination of any features and/or components from any of embodiments as discussed above.

The invention claimed is:
1. A system, comprising:
a processing unit including:
a housing including an access port;
a centrifuge disposed within the housing;

a storage compartment disposed within the housing; and a transferring component coupled to the centrifuge and the storage compartment; and a sample preparation component removably coupleable to the processing unit, the sample preparation component including:

an enclosure including an inlet port configured to receive a specimen container containing a blood sample when the sample preparation component is decoupled from the processing unit, the enclosure further including an outlet port and a gate that is configured to transition across the outlet port between a closed configuration in which the gate prevents transfer of the specimen container through the outlet port, and an open configuration in which transfer of the specimen container through the outlet port is permitted;

a scanner disposed within the enclosure and configured to read an identifier of the specimen container;

a mixer disposed within the enclosure, the mixer configured to actuate the specimen container to mix one of an additive or a reagent included in the specimen container; and a controller operably coupled to the scanner and the mixer, the controller configured to:

receive the identifier read by the scanner and transition the gate to the open configuration in response to the sample preparation component being coupled to the processing unit such that the specimen container drops from the sample preparation component through the access port into the transferring component of the processing unit;

wherein the transferring component of the processing unit is configured to, after receiving the specimen container from the sample preparation component direct the specimen container to the storage compartment for storing the blood sample, or to the centrifuge for centrifuging the blood sample and then to the storage compartment for storing the blood sample based on information encoded in the identifier.

2. The system of claim 1, wherein the inlet port of the sample preparation component is configured to receive the specimen container in a vertical upright orientation.

3. The system of claim 2 wherein the inlet port is disposed on a surface of the enclosure such that at least a portion of the mixer is aligned with the inlet port and the specimen container is directly received in the mixer in the vertical upright orientation.

4. The system of claim 1, wherein the scanner includes:

a bar code reader configured to read the identifier of the specimen container, the identifier disposed on a sidewall of the specimen container; and a communications unit operatively coupled to the bar code reader, the communications unit configured to transmit the identifier to the controller.

5. The system of claim 4, wherein:

the mixer is configured to receive the specimen container via the inlet port and rotate the specimen container to align the identifier with the barcode reader; and the bar code reader is disposed adjacent to the mixer to read the identifier while the specimen container is rotated.

6. The system of claim 1, wherein the controller is further configured to:

identify information included in the identifier, the information associated with the blood sample; and send one or more signals to the mixer such that the mixer actuates the specimen container based on the identified information when the sample preparation component is decoupled from the processing unit.

7. The system of claim 1, wherein the mixer includes:

a holder configured to hold the specimen container; and an actuator mechanically coupled to the holder, the actuator configured to move the holder between a (1) first position in which holder is disposed below and aligned with the inlet port to receive the specimen container therethrough and (2) a second position in which the holder holds the specimen container in a vertical inverted orientation for transferring the specimen container to the processing unit.

8. The system of claim 1, wherein the sample preparation component further includes a transferer, the transferer configured to move between (1) a first configuration in which a chamber of the transferer is alignable with a holder of the mixer to receive the specimen container from the holder and (2) a second configuration in which the chamber of the transferer is aligned with the outlet port of the enclosure.

9. The system of claim 8, wherein the transferer is a carrousel.

10. The system of claim 8, wherein the mixer is configured to transition between (1) a first position in which a holder of the mixer is aligned with the inlet port to receive the specimen container therethrough and (2) a second position in which the holder of the mixer is aligned with the chamber of the transferer when the chamber is in the first configuration to transfer the specimen container from the holder of the mixer to the chamber of the transferrer.

11. The system of claim 10, wherein the holder of the mixer is configured to receive the specimen container in a vertical upright orientation when the mixer is in the first position, and transition the specimen container to a vertical inverted orientation when the mixer is moved to the second position to transfer the specimen container in the vertical inverted orientation to the chamber of the transferer.

12. The system of claim 11, wherein the holder of the mixer is configured to release the specimen container in the vertical inverted orientation such that the specimen container drops via gravity into the chamber of the transferer.

13. The system of claim 10, wherein the controller is further configured to:

receive from a sensor a first signal indicative of the sample preparation component being coupled to the processing unit; and send a second signal to the transferer to move from the first configuration to the second configuration with the specimen container disposed within the chamber based on the first signal.

14. The system of claim 13, wherein the sensor is a proximity sensor.

15. The system of claim 10, wherein the chamber is a first chamber and the specimen container is a first specimen container, the transferer including a second chamber, the transferer configured to move between (1) at least one of the first configuration or the second configuration, and (2) a third configuration in which the second chamber is alignable with the holder of the mixer to receive a second specimen container from the holder while the first specimen container is disposed within the first chamber of the transferer, the transferer further configured to move between (1) at least one of the first, second, or third configuration, and (2) a fourth configuration in which the second chamber is aligned with the outlet port of the enclosure to transfer the second specimen container to the processing unit.

16. The system of claim 8, wherein the transferer is wholly contained within the sample preparation component.

17. The system of claim 1, wherein the sample preparation component includes a transferer having a plurality of chambers configured to receive specimen containers from the mixer and direct the specimen containers to the outlet port of the enclosure to transfer the specimen containers to the processing unit when the sample preparation component is coupled to the processing unit.

18. The system of claim 1, wherein the outlet port is configured to be disposed above and aligned with the access port of the processing unit to transfer the specimen container to the processing unit when the sample preparation component is coupled to the processing unit and the gate is in the open configuration.

19. The system of claim 1, wherein:
the processing unit includes one or more sensors configured to detect when the sample preparation component is coupled to the processing unit and send a first signal to the controller indicative of the sample preparation component being coupled to the processing unit,
the controller being configured to send a second signal instructing the sample preparation component to transfer the specimen container to the processing unit based on the first signal.

20. The system of claim 1, wherein the processing unit includes a gate configured to transition between a closed configuration in which the gate of the processing unit prevents access through the access port, and an open configuration in which the gate of the processing unit allows access through the access port,
the controller further configured to transition the gate of the processing unit to the open configuration when the sample preparation component is coupled to the processing until to allow the specimen container to be transferred from the sample preparation component to the processing unit through the access port.

21. The system of claim 1, wherein the controller is further configured to verify at least one of a donor of the blood sample or a collection site of the blood sample based on the information encoded in the identifier.

22. The system of claim 1, wherein the specimen container drops from the sample preparation component into the transferring component of the processing unit solely by gravity.

23. A system, comprising:
a processing unit including:
a housing;
a centrifuge disposed within the housing;
a storage compartment disposed within the housing; and
a transferring component coupled to the centrifuge and the storage compartment; and
a sample preparation component removably coupleable to the processing unit; the sample preparation component including:
an enclosure including an inlet port and an outlet port, the inlet port configured to receive a specimen container containing a blood sample when the sample preparation component is decoupled from the processing unit;
a scanner disposed within the enclosure and configured to read an identifier of the specimen container;
a mixer disposed within the enclosure, the mixer configured to actuate the specimen container to mix one of an additive or a reagent included in the specimen container;
a carrousel having at least one chamber configured to receive the specimen container from the mixer and direct the specimen container to the outlet port of the enclosure to transfer the specimen container to the processing unit when the sample preparation component is coupled to the processing unit; and
a controller operably coupled to the carrousel, the scanner and the mixer, the controller configured to:
receive the identifier read by the scanner;
receive from a sensor a first signal in response to the sample preparation component being coupled to the processing unit;
send a second signal to the mixer to release the specimen container into the at least one chamber of the carrousel; and
send a third signal to rotate the carrousel to direct the specimen container towards the outlet port of the sample preparation component to transfer the specimen container to the processing unit;
wherein the transferring component of the processing unit is configured to (1) receive the specimen container from the sample preparation component when the sample preparation component is coupled to the processing unit, and (2) direct the specimen container to the storage compartment for storing the blood sample, or to the centrifuge for centrifuging the blood sample and then to the storage compartment for storing the blood sample based on information encoded in the identifier.

24. The system of claim 23, wherein the inlet port of the sample preparation component is configured to receive the specimen container in a vertical upright orientation.

25. The system of claim 23, wherein:
the mixer is configured to receive the specimen container via the inlet port and rotate the specimen container to align the identifier with a barcode reader; and
the bar code reader is disposed adjacent to the mixer to read the identifier while the specimen container is rotated.

26. The system of claim 23, wherein the at least one chamber is a first chamber, the specimen container is a first specimen container, and the first chamber is configured to receive the first specimen container at a first time, the carrousel having a second chamber configured to receive (1) at a second time after the first time, (2) with the sample preparation component decoupled from the processing unit, and (3) with the first specimen container disposed in the first chamber, a second specimen container from the mixer and direct the second specimen container towards the outlet port of the sample preparation component to transfer the second specimen container to the processing unit when the sample preparation component is coupled to the processing unit and after the first specimen container has been transferred to the processing unit from the first chamber.

\* \* \* \* \*